United States Patent

Soga et al.

[11] Patent Number: 5,920,228
[45] Date of Patent: Jul. 6, 1999

[54] DIGITAL DEMODULATION WITH COMPENSATION FOR PHASE AND FREQUENCY OF TENTATIVELY DEMODULATED SIGNAL

[75] Inventors: Shigeru Soga, Matsubara; Daisuke Hayashi, Osaka; Takaya Hayashi, Nagaokakyo; Seiji Sakashita, Hirakata, all of Japan

[73] Assignee: Matsushita Electric Industrial Co., Ltd., Osaka, Japan

[21] Appl. No.: 08/895,093

[22] Filed: Jul. 16, 1997

[30] Foreign Application Priority Data

Jul. 16, 1996 [JP] Japan .................................. 8-185710
Mar. 18, 1997 [JP] Japan .................................. 9-064728

[51] Int. Cl.$^6$ .............................. H04L 27/22; H04L 27/38
[52] U.S. Cl. ........................ 329/304; 329/306; 329/341; 375/324
[58] Field of Search .................................. 329/300, 302, 329/304, 306, 341; 375/324, 325

[56] References Cited

U.S. PATENT DOCUMENTS 4,847,797  7/1989  Picchi et al. ........................... 364/602
5,097,220  3/1992  Shimakata et al. ..................... 329/306
5,287,067  2/1994  Denno et al. .......................... 329/304

FOREIGN PATENT DOCUMENTS 1-93241   4/1989  Japan .
5-244026  9/1993  Japan .
8-274832  10/1996 Japan .

Primary Examiner—Siegfried H. Grimm
Attorney, Agent, or Firm—Ratner & Prestia

[57] ABSTRACT

A demodulation method for tentatively demodulating a modulated input signal by a signal having a fixed frequency to form a tentative complex demodulated signal and then generating a determined complex demodulated signal from the tentative complex demodulated signal. The method includes step (a) of obtaining a determined complex demodulated signal by compensating for the tentative complex demodulated signal based on an optimum phase compensation amount; step (b) of estimating an optimum frequency compensation amount based on a shift in the optimum phase compensation amount during a predetermined cycle; and step (c) of estimating an immediately subsequent optimum phase compensation amount to be used in the steps (a) and (b) performed in repetition, based on the tentative complex demodulated signal, the determined complex demodulated signal, and the optimum frequency compensation amount.

48 Claims, 25 Drawing Sheets

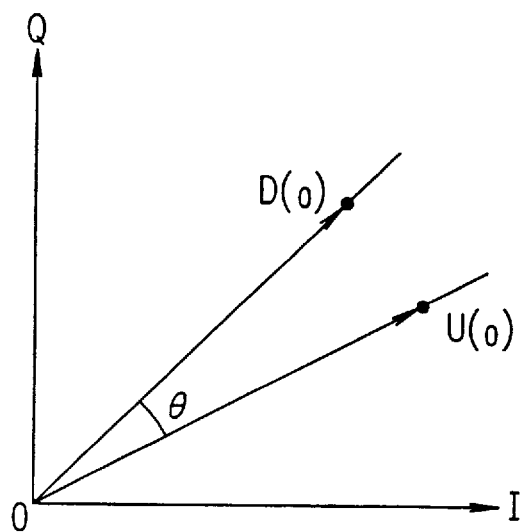
FIG.22A n=0
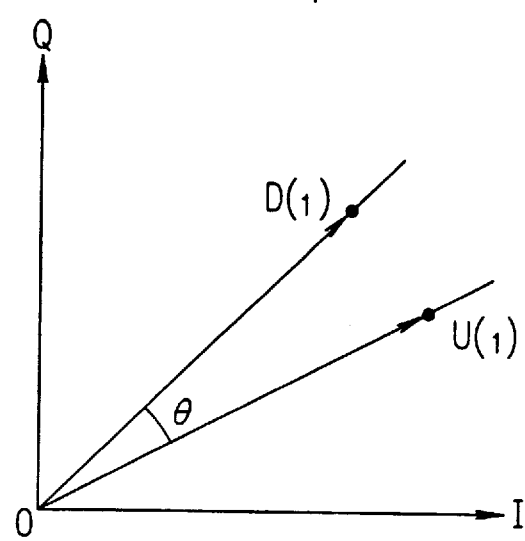
FIG.22B n=1
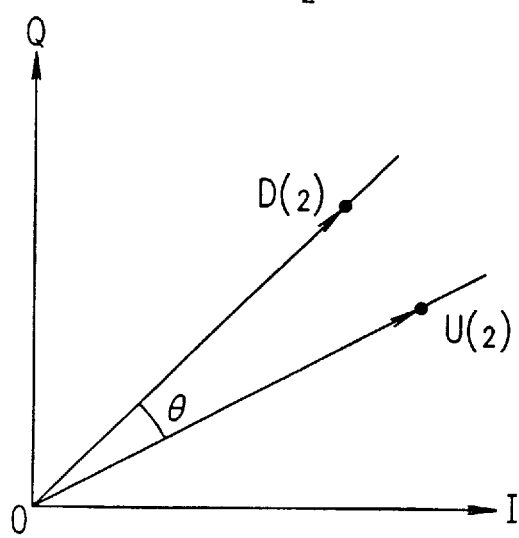
FIG.22C n=2
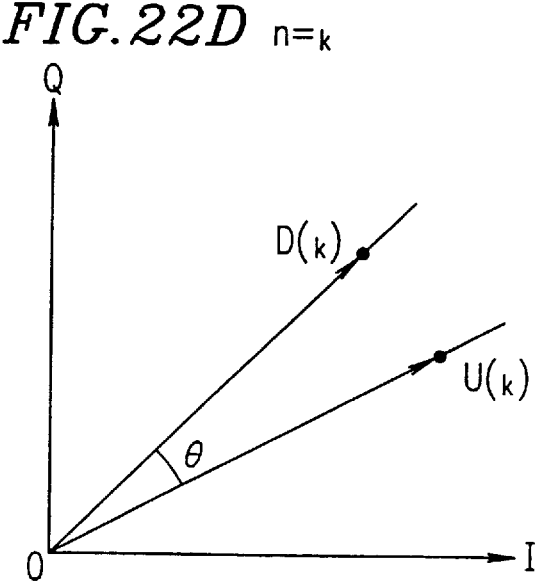
FIG.22D n=k

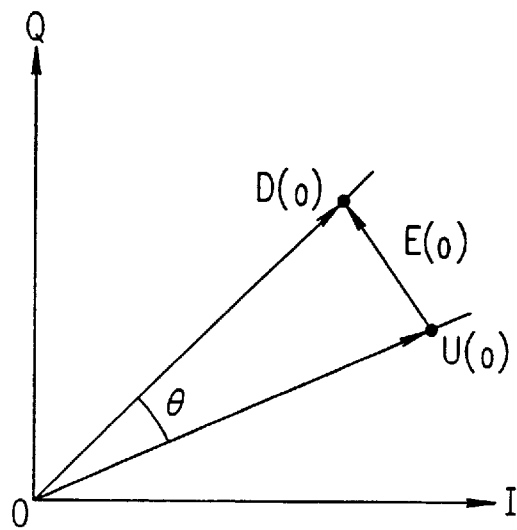
FIG. 23A n=0
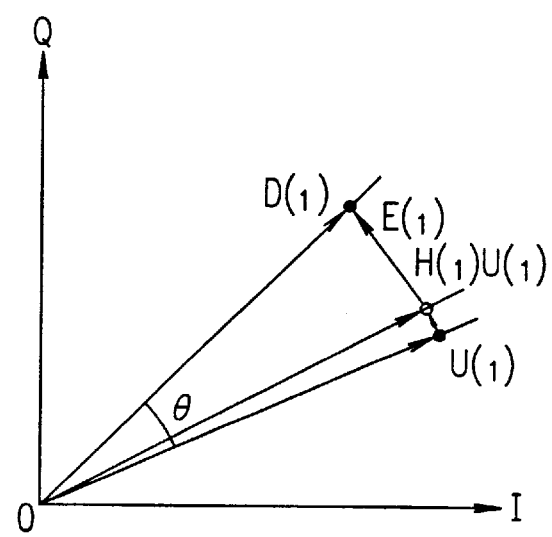
FIG. 23B n=1
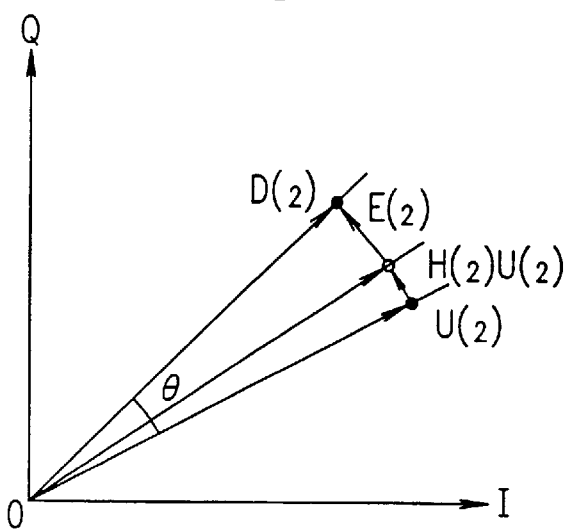
FIG. 23C n=2
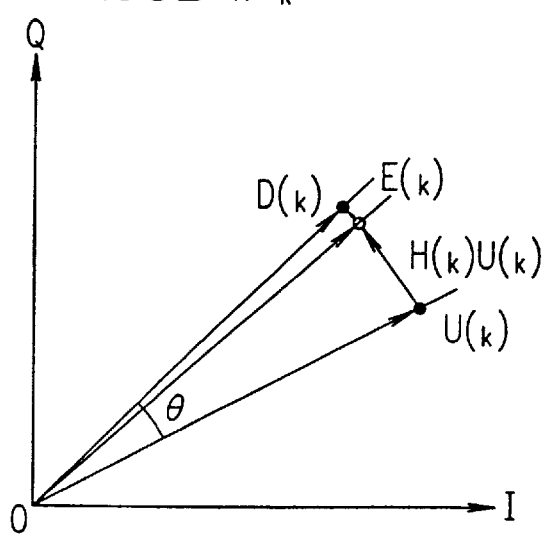
FIG. 23D n=k

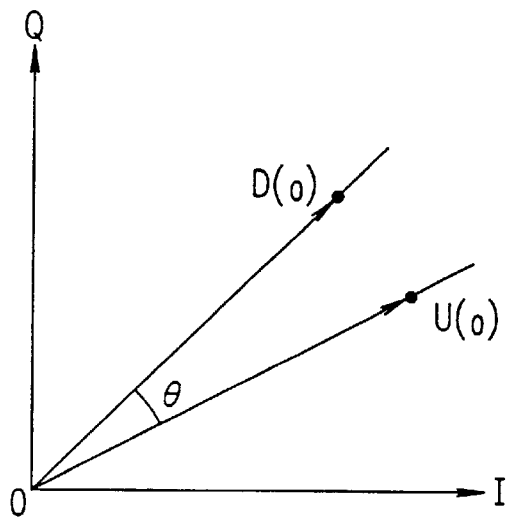
FIG.24A n=0
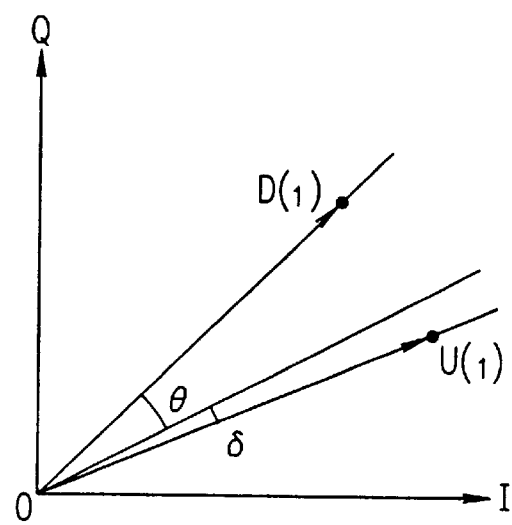
FIG.24B n=1
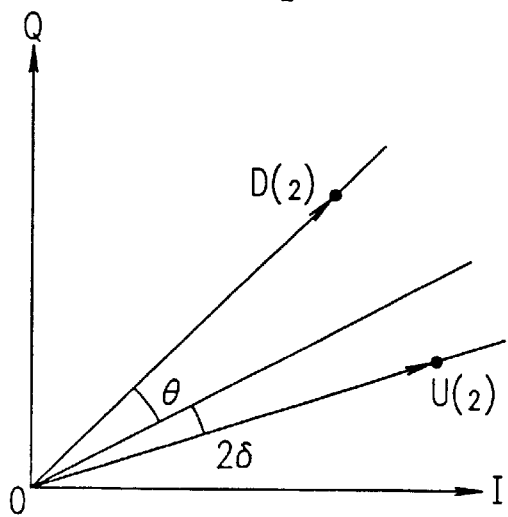
FIG.24C n=2
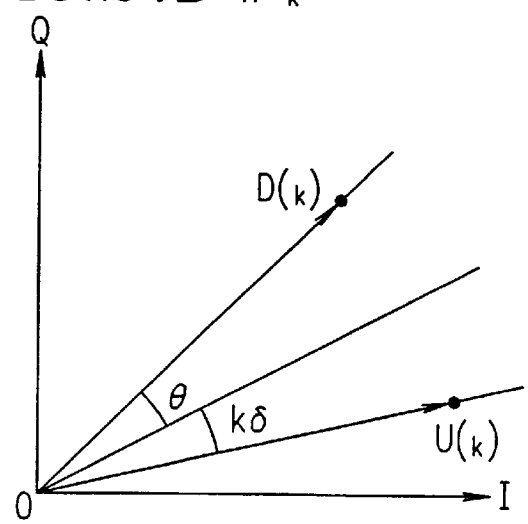
FIG.24D n=k

DIGITAL DEMODULATION WITH COMPENSATION FOR PHASE AND FREQUENCY OF TENTATIVELY DEMODULATED SIGNAL

BACKGROUND OF THE INVENTION

1. Field of the Invention

The present invention relates to a demodulation method and apparatus for performing a quasi-coherent detection of a modulated digital signal using a signal having a fixed frequency and compensating for the phase and frequency of a tentative demodulated signal obtained by the detection.

2. Description of the Related Art

It is well known that a modulated digital signal can be demodulated by, for example, a coherent detection system which is widely used for obtaining ideal demodulation characteristics. By the coherent detection system, a modulated digital signal s(t) is multiplied by cos ωct (ωc: radian frequency of the carrier), a signal representing the result of the multiplication is filtered by a low-pass filter, and an output from the low-pass filter is used as a baseband signal.

In order to perform the coherent detection system, which requires a carrier, various technologies have been proposed, for example, of extracting a suppressed carrier included in a modulated wave from a modulated signal and reproducing the suppressed carrier. In general, a signal having a radian frequency ωc is generated using a demodulated code and the frequency is controlled by a VCO (voltage-controlled oscillator).

By a quasi-coherent detection system, to which the present invention is related, a modulated signal is detected using an oscillation signal having a fixed oscillation frequency which is substantially equal to the radian frequency ωc of the carrier and the phase of the tentative demodulated signal generated by the detection is controlled to obtain a determined demodulated signal.

One example of the quasi-coherent detection system is described in the U.S. Pat. No. 5,287,067.

The system described in the above-mentioned document operates in the following manner.

A complex demodulated signal which is received is treated by quadrature detection to generate a tentative complex demodulated signal. The correlation value between the complex demodulated signal and the complex identification signal is obtained as a final signal by the quasi-coherent detection system. Based on the correlation value, a frequency error of one symbol cycle (the cycle by which the tentative demodulated signal is input in repetition) is estimated. An initial phase error is estimated based on the frequency error, the tentative complex demodulated signal, and the demodulated determined complex signal. An optimum phase compensation amount is obtained based on the frequency error and the initial phase error. By compensating for the tentative complex demodulated signal in accordance with the optimum phase compensation amount, a determined complex demodulated signal is generated. Based on the determined complex demodulated signal, a complex identification signal is generated.

The above-described conventional system involves many points to be improved, such as, for example, reduction in pull-in time (time required to compensate for a phase shift or frequency error) when there is no training signal, improvement in signal quality, and simplification of the entire circuit system. For example, when there is no training signal, a circuit used for performing this system has a complicated configuration including a large number of complex multipliers. Moreover, the number of signals to be processed and the number of processes to be performed during one symbol cycle are excessive. In the case where such a circuit is used for high-speed digital transmission having a high transmission rate, the power consumption of the circuit is excessive.

According to the above-described system, the phase shift caused by the frequency error is estimated based on the tentative demodulated signal and the identification signal. Thus, when the identification signal performs erroneous identification due to a noise or the like, the pull-in time of the phase shift is prolonged and signal quality is deteriorated.

Furthermore, demodulation of a modulated signal accompanying amplitude change such as QAM (quadrature amplitude modulation) requires a circuit for normalizing the complex signal, an orthogonal coordinate—polar coordinate conversion circuit and a polar coordinate—orthogonal coordinate conversion circuit, which prolongs the signal processing time and enlarges the size of the circuit.

SUMMARY OF THE INVENTION

According to one aspect of the invention, a demodulation method for tentatively demodulating a modulated input signal by a signal having a fixed frequency to form a tentative complex demodulated signal and then generating a determined complex demodulated signal from the tentative complex demodulated signal, the method including: step (a) of obtaining a determined complex demodulated signal by compensating for the tentative complex demodulated signal based on an optimum phase compensation amount; step (b) of estimating an optimum frequency compensation amount based on a shift in the optimum phase compensation amount during a predetermined cycle; and step (c) of estimating an immediately subsequent optimum phase compensation amount to be used in the steps (a) and (b) performed in repetition, based on the tentative complex demodulated signal, the determined complex demodulated signal, and the optimum frequency compensation amount.

In one embodiment of the invention, the step (c) includes: step (h1) of obtaining a complex error signal which represents a distance between the determined complex demodulated signal obtained by the step (a) and a complex identification signal; step (h2) of obtaining a phase correction direction signal which represents a correction direction or the optimum phase compensation amount, based on the complex error signal and the tentative complex demodulated signal; step (h3) of performing weighting of the phase correction direction signal; step (h4) of obtaining the tentative phase compensation amount based on the optimum frequency compensation amount estimated by the step (b) and the optimum phase compensation amount estimated by the step (c); and step (h5) of obtaining the immediately subsequent optimum phase compensation amount to be used in the steps (a) and (b) performed in repetition, based on the tentative phase compensation amount and the weighted phase correction direction signal.

In one embodiment of the invention, the step (h1) includes: step (i1) of obtaining the complex identification signal which is closest to the determined complex demodulated signal by identifying the determined complex demodulated signal obtained by the step (a); step (i2) of obtaining a complex error signal which represents a distance between the determined complex demodulated signal and the complex identification signal; step (i3) of determining whether or not each of a real part and an imaginary part of the complex error signal is required, based on the determined complex demodulated signal; and step (i4) of, when either one of the real part or the imaginary part is determined to be required, outputting the real part or the imaginary part which is determined to be required, and when either one of the real part or the imaginary part is determined not to be required, outputting zero in place of the real part or the imaginary part which is determined not to be required.

In one embodiment of the invention, the step (b) includes: step (k1) of obtaining a frequency correction direction signal which represents a correction direction of the optimum frequency compensation amount, based on the optimum phase compensation amounts estimated in repetition by the step (c) and the optimum frequency compensation amount estimated by the step (b); step (k2) of performing weighting of the frequency correction direction signal; and step (k3) of estimating an optimum frequency compensation amount to be used in the step (c) by updating the optimum frequency compensation amount estimated by the step (b) based on the weighted frequency correction direction signal.

In one embodiment of the invention, the step (k1) includes: step (11) of obtaining a complex multiplication value by performing complex multiplication of a first optimum phase compensation amount among the optimum phase compensation amounts estimated by the step (c) and the optimum frequency compensation amount estimated by the step (b); step (12) of obtaining a complex subtraction value by performing complex subtraction of the complex multiplication value from a second optimum phase compensation amount among the optimum phase compensation amounts estimated by the step (c), the second optimum phase compensation amounts being estimated later than the first optimum phase compensation amount; and step (13) of obtaining a complex multiplication value by performing complex multiplication of the first optimum phase compensation amount and the complex subtraction value.

In one embodiment of the invention, the step (k1) includes: step (m1) of obtaining a complex division value by performing complex division of the second optimum phase compensation amount among the optimum phase compensation amounts estimated by the step (c) by the first optimum phase compensation amount which is estimated before the second optimum phase compensation amount by step (c); and step (m2) of obtaining a complex subtraction value by performing complex subtraction of the optimum frequency compensation amount estimated by the step (b) from the complex division value.

In one embodiment of the invention, the step (k1) includes: step (n1) of obtaining an auto-correlation value by performing complex multiplication of the first optimum phase compensation amount estimated by the step (c) and the second optimum phase compensation amount estimated by the step (c) later than the first optimum phase compensation amount; step (n2) of obtaining a square of a magnitude of the first optimum phase compensation amount; step (n3) of obtaining a multiplication value of the square value and the optimum frequency compensation amount estimated by the step (b); and step (n4) of obtaining the multiplication value from the auto-correlation value obtained by the step (n1) by complex subtraction.

In one embodiment of the invention, the step (k1) includes: step (o1) of obtaining an auto-correlation value by performing complex multiplication of the optimum phase compensation amounts estimated in repetition by the step (c); and step (o2) of performing complex subtraction of the optimum frequency compensation amount estimated by the step (b) from the auto-correlation value.

In one embodiment of the invention, the step (b) includes: step (p1) of obtaining an auto-correlation value by performing complex multiplication of the optimum phase compensation amounts estimated in repetition by the step (c); and step (p2) of performing complex addition of the auto-correlation value and the optimum frequency compensation amount estimated by the step (b) which is weighted.

In one embodiment of the invention, the step (h3) is the step of performing weighting based on the optimum frequency compensation amount.

In one embodiment of the invention, the step (k1) includes step (r) of smoothing the frequency correction direction signal which represents the correction direction of the optimum frequency compensation amount.

In one embodiment of the invention, the step (h3) includes step (t) of smoothing the phase correction direction signal which represents the correction direction of the optimum phase compensation amount based on the optimum frequency compensation amount.

In one embodiment of the invention, the step (c) is performed based on the following expression:

$$\mu_1 E(n) U^*(n) + F(n) H(n) = H(n+1),$$

where $\mu_1$ is a step parameter,
E(n) is a complex error signal,
H(n) is the optimum phase compensation amount,
U(n) is the tentative complex demodulated signal,
U*(n) is a complex conjugate of U(n),
F(n) is the optimum frequency compensation amount, and
H(n+1) is the immediately subsequent optimum phase compensation amount to be used in the steps (a) and (b) performed in repetition.

In one embodiment of the invention, the step (b) is performed based on the following expression:

$$\mu_2 [H(n) - F(n) H(n-1)] H^*(n-1) + F(n) = F(n+1)$$

where $\mu_2$ is a step parameter,
H(n) and H(n-1) are optimum phase compensation amounts,
H*(n) is a complex conjugate of H(n),
F(n) is the optimum frequency compensation amount already estimated, and
F(n+1) is the optimum frequency compensation amount to be estimated.

According to another aspect of the invention, a demodulation method for tentatively demodulating a modulated input signal by a signal having a fixed frequency to form a tentative complex demodulated signal and then generating a determined complex demodulated signal from the tentative complex demodulated signal, the method including: step (a) of obtaining a determined complex demodulated signal by compensating for the tentative complex demodulated signal based on an optimum phase compensation amount; step (d) of obtaining a complex error signal which represents a distance between the determined complex demodulated signal and a complex identification signal; step (b) of estimating an optimum frequency compensation amount based on the determined complex demodulated signal and the complex error signal; and step (c) of estimating an immediately subsequent optimum phase compensation amount to be used in the step (a) performed in repetition, based on the tentative complex demodulated signal, the determined complex demodulated signal, and the optimum frequency compensation amount.

In one embodiment of the invention, the step (c) includes: step (h1) of obtaining the complex error signal which represents a distance between the determined complex demodulated signal obtained by the step (a) and a complex identification signal; step (h2) of obtaining a phase correction direction signal which represents a correction direction of the optimum phase compensation amount, based on the complex error signal obtained by the step (h1) and the tentative complex demodulated signal; step (h3) of performing weighting of the phase correction direction signal; step (h4) of obtaining the tentative phase compensation amount based on the optimum frequency compensation amount estimated by the step (b) and the optimum phase compensation amount estimated by the step (c); and step (h5) of obtaining the immediately subsequent optimum phase compensation amount to be used in the step (a) performed in repetition, based on the tentative phase compensation amount and the weighted phase correction direction signal.

In one embodiment of the invention, the step (d) includes: step (i1) of obtaining the complex identification signal which is closest to the determined complex demodulated signal by identifying the determined complex demodulated signal; step (i2) of obtaining a complex error signal which represents a distance between the determined complex demodulated signal and the complex identification signal; step (i3) of determining whether or not each of a real part and an imaginary part of the complex error signal is required, based on the determined complex demodulated signal; and step (i4) of, when either one of the real part or the imaginary part is determined to be required, outputting the real part or the imaginary part which is determined to be required, and when either one of the real part or the imaginary part is determined not to be required, outputting zero in place of the real part or the imaginary part which is determined not to be required.

In one embodiment of the invention, the step (h1) includes: step (i1) of obtaining the complex identification signal which is closest to the determined complex demodulated signal by identifying the determined complex demodulated signal; step (i2) of obtaining a complex error signal which represents a distance between the determined complex demodulated signal and the complex identification signal; step (i3) of determining whether or not each of a real part and an imaginary part of the complex error signal is required, based on the determined complex demodulated signal; and step (i4) of, when either one of the real part or the imaginary part is determined to be required, outputting the real part or the imaginary part which is determined to be required, and when either one of the real part or the imaginary part is determined not to be required, outputting zero in place of the real part or the imaginary part which is determined not to be required.

In one embodiment of the invention, the step (c) includes: step (j1) of obtaining a complex identification signal which is closest to the determined complex demodulated signal by identifying the determined complex demodulated signal; step (j2) of obtaining a cross-correlation value by performing complex multiplication of the tentative complex demodulated signal and the complex identification signal; step (j3) of obtaining a complex addition value by performing complex addition of the cross-correlation value and the optimum phase compensation amount estimated by the step (c) which is weighted; and step (j4) of obtaining a complex multiplication value by performing complex multiplication of the complex addition value and the optimum frequency compensation amount estimated by the step (b).

In one embodiment of the invention, the step (b) includes: step (q1) of obtaining a frequency correction direction signal which represents the correction direction of the optimum frequency compensation amount based on the determined complex demodulated signal obtained by the step (a) and the complex error signal obtained by the step (d); step (q2) of performing weighting of the frequency correction direction signal; and step (q3) of updating the optimum frequency compensation amount estimated by the step (b) based on the weighted frequency correction direction signal.

In one embodiment of the invention, the step (h3) is the step of performing weighting based on the optimum frequency compensation amount.

In one embodiment of the invention, the step (q2) is the step of performing weighting based on the optimum frequency compensation amount.

In one embodiment of the invention, the step (q1) includes step (r) of smoothing the frequency correction direction signal which represents the correction direction of the optimum frequency compensation amount.

In one embodiment of the invention, the step (h3) includes step (t) of smoothing the phase correction direction signal which represents the correction direction of the optimum phase compensation amount based on the optimum frequency compensation amount.

In one embodiment of the invention, the step (c) is performed based on the following expression:

$$\mu_1 E(n)U^*(n)+F(n)H(n)=H(n+1),$$

where $\mu_1$ is a step parameter,

E(n) is a complex error signal,

H(n) is the optimum phase compensation amount,

U(n) is the tentative complex demodulated signal,

U*(n) is a complex conjugate of U(n),

F(n) is the optimum frequency compensation amount, and

H(n+1) is the immediately subsequent optimum phase compensation amount to be used in the step (a) performed in repetition.

In one embodiment of the invention, the step (b) is performed based on the following expression:

$$\mu_1\mu_2 E(n)U^*(n)H^*(n)+F(n)=F(n+1)$$

where $\mu_1$ and $\mu_2$ step parameters,

E(n) is a complex error signal,

H(n) is the optimum phase compensation amount,

U(n) is the tentative complex demodulated signal,

U*(n) is a complex conjugate of U(n),

H*(n) is a complex conjugate of H(n),

F(n) is the optimum frequency compensation amount already estimated, and

F(n+1) is the optimum frequency compensation amount to be estimated.

According to still another aspect of the invention, a demodulation apparatus for tentatively demodulating a modulated input signal by a signal having a fixed frequency to form a tentative complex demodulated signal and then generating a determined complex demodulated signal from the tentative complex demodulated signal, the apparatus including: means (A) for obtaining a determined complex demodulated signal by compensating for the tentative complex demodulated signal based on an optimum phase compensation amount; means (B) for estimating an optimum frequency compensation amount based on a shift in the optimum phase compensation amount during a predetermined cycle; and means (C) for estimating an immediately subsequent optimum phase compensation amount to be used by means (A) and (B) in repetition, based on the tentative complex demodulated signal, the determined complex demodulated signal, and the optimum frequency compensation amount.

In one embodiment of the invention, the means (C) includes: means (H1) for obtaining a complex error signal which represents a distance between the determined complex demodulated signal obtained by the means (A) and a complex identification signal; means (H2) for obtaining a phase correction direction signal which represents a correction direction of the optimum phase compensation amount, based on the complex error signal and the tentative complex demodulated signal; means (H3) for performing weighting of the phase correction direction signal; means (H4) for obtaining the tentative phase compensation amount based on the optimum frequency compensation amount estimated by the means (B) and the optimum phase compensation amount estimated by the means (C); and means (H5) for obtaining the immediately subsequent optimum phase compensation amount to be used by the means (A) and (B) in repetition, based on the tentative phase compensation amount and the weighted phase correction direction signal.

In one embodiment of the invention, the means (H1) includes: means (I1) for obtaining the complex identification signal which is closest to the determined complex demodulated signal by identifying the determined complex demodulated signal; means (I2) for obtaining a complex error signal which represents a distance between the determined complex demodulated signal and the complex identification signal; means (I3) for determining whether or not each of a real part and an imaginary part of the complex error signal is required, based on the determined complex demodulated signal; and means (I4) for, when either one of the real part or the imaginary part is determined to be required, outputting the real part or the imaginary part which is determined to be required, and when either one of the real part or the imaginary part is determined not to be required, outputting zero in place of the real part or the imaginary part which is determined not to be required.

In one embodiment of the invention, the means (B) includes: means (K1) for obtaining a frequency correction direction signal which represents a correction direction of the optimum frequency compensation amount, based on the optimum phase compensation amounts estimated in repetition by the means (C) and the optimum frequency compensation amount estimated by the means (B); means (K2) for performing weighting of the frequency correction direction signal; and means (K3) for estimating an optimum frequency compensation amount to be used by the means (C) by updating the optimum frequency compensation amount estimated by the means (B) based on the weighted frequency correction direction signal.

In one embodiment of the invention, the means (K1) includes: means (L1) for obtaining a complex multiplication value by performing complex multiplication of a first optimum phase compensation amount among the optimum phase compensation amounts estimated by means (C) and the optimum frequency compensation amount estimated by the means (B); means (L2) for obtaining a complex subtraction value by performing complex subtraction of the complex multiplication value from a second optimum phase compensation amount among the optimum phase compensation amounts estimated by the means (C), the second optimum phase compensation amounts being estimated later than the first optimum phase compensation amount; and means (L3) for obtaining a complex multiplication value by performing complex multiplication of the first optimum phase compensation amount and the complex subtraction value.

In one embodiment of the invention, the means (K1) includes: means (M1) for obtaining a complex division value by performing complex division of the second optimum phase compensation amount among the optimum phase compensation amounts estimated by the means (C) by the first optimum phase compensation amount which is estimated before the second optimum phase compensation amount by the means (C); and means (M2) for obtaining a complex subtraction value by performing complex subtraction of the optimum frequency compensation amount estimated by the means (B) from the complex division value.

In one embodiment of the invention, the means (K1) includes: means (N1) for obtaining an auto-correlation value by performing complex multiplication of the first optimum phase compensation amount estimated by the means (C) and the second optimum phase compensation amount estimated by the means (C) later than the first optimum phase compensation amount; means (N2) for obtaining a square of a magnitude of the first optimum phase compensation amount; means (N3) for obtaining a multiplication value of the square value and the optimum frequency compensation amount estimated by the means (B); and means (N4) for obtaining the multiplication value from the auto-correlation value obtained by the means (N1) by complex subtraction.

In one embodiment of the invention, the means (K1) includes: means (O1) for obtaining an auto-correlation value by performing complex multiplication of the optimum phase compensation amounts estimated in repetition by the means (C); and means (O2) for performing complex subtraction of the optimum frequency compensation amount estimated by the means (B) from the auto-correlation value.

In one embodiment of the invention, the means (B) includes: means (P1) for obtaining an auto-correlation value by performing complex multiplication of the optimum phase compensation amounts estimated in repetition by the means (C); and means (P2) for performing complex addition of the auto-correlation value and the optimum frequency compensation amount estimated by the means (B) which is weighted.

In one embodiment of the invention, the means (H3) performs weighting based on the optimum frequency compensation amount.

In one embodiment of the invention, the means (K1) includes means (R) for smoothing the frequency correction direction signal which represents the correction direction of the optimum frequency compensation amount.

In one embodiment of the invention, the means (H3) includes means (T) for smoothing the phase correction direction signal which represents the correction direction of the optimum phase compensation amount based on the optimum frequency compensation amount.

According to still another aspect of the invention, a demodulation apparatus for tentatively demodulating a modulated input signal by a signal having a fixed frequency to form a tentative complex demodulated signal and then generating a determined complex demodulated signal from the tentative complex demodulated signal, the apparatus including: means (A) for obtaining a determined complex demodulated signal by compensating for the tentative complex demodulated signal based on an optimum phase compensation amount; means (D) for obtaining a complex error signal which represents a distance between the determined complex demodulated signal and a complex identification signal; means (B) for estimating an optimum frequency compensation amount based on the determined complex demodulated signal and the complex error signal; and means (C) for estimating an immediately subsequent optimum phase compensation amount to be used by the means (A) and (B) in repetition, based on the tentative complex demodulated signal, the determined complex demodulated signal, and the optimum frequency compensation amount.

In one embodiment of the invention, the means (C) includes: means (H1) for obtaining a complex error signal which represents a distance between the determined complex demodulated signal obtained by the means (A) and a complex identification signal; means (H2) for obtaining a phase correction direction signal which represents a correction direction of the optimum phase compensation amount, based on the complex error signal obtained by the means (H1) and the tentative complex demodulated signal; means (H3) for performing weighting of the phase correction direction signal; means (H4) for obtaining the tentative phase compensation amount based on the optimum frequency compensation amount estimated by the means (B) and the optimum phase compensation amount estimated by the means (C); and means (H5) for obtaining the immediately subsequent optimum phase compensation amount to be used by the means (A) in repetition, based on the tentative phase compensation amount and the weighted phase correction direction signal.

In one embodiment of the invention, the means (D) includes: means (I1) for obtaining the complex identification signal which is closest to the determined complex demodulated signal by identifying the determined complex demodulated signal; means (I2) for obtaining a complex error signal which represents a distance between the determined complex demodulated signal and the complex identification signal; means (I3) for determining whether or not each of a real part and an imaginary part of the complex error signal is required, based on the determined complex demodulated signal; and means (I4) for, when either one of the real part or the imaginary part is determined to be required, outputting the real part or the imaginary part which is determined to be required, and when either one of the real part or the imaginary part is determined not to be required, outputting zero in place of the real part or the imaginary part which is determined not to be required.

In one embodiment of the invention, the means (C) includes: means (J1) for obtaining a complex identification signal which is closest to the determined complex demodulated signal by identifying the determined complex demodulated signal; means (J2) for obtaining a cross-correlation value by performing complex multiplication of the tentative complex demodulated signal and the complex identification signal; means (J3) for obtaining a complex addition value by performing complex addition of the cross-correlation value and the optimum phase compensation amount estimated by the means (C) which is weighted; and means (J4) for obtaining a complex multiplication value by performing complex multiplication of the complex addition value and the optimum frequency compensation amount estimated by the means (B).

In one embodiment of the invention, the means (H1) includes: means (I1) for obtaining the complex identification signal which is closest to the determined complex demodulated signal by identifying the determined complex demodulated signal; means (I2) for obtaining a complex error signal which represents a distance between the determined complex demodulated signal and the complex identification signal; means (I3) for determining whether or not each of a real part and an imaginary part of the complex error signal is required, based on the determined complex demodulated signal; and means (I4) for, when either one of the real part or the imaginary part is determined to be required, outputting the real part or the imaginary part which is determined to be required, and when either one of the real part or the imaginary part is determined not to be required, outputting zero in place of the real part or the imaginary part which is determined not to be required.

In one embodiment of the invention, the means (B) includes: means (Q1) for obtaining a frequency correction direction signal which represents the correction direction of the optimum frequency compensation amount based on the determined complex demodulated signal obtained by the means (A) and the complex error signal obtained by the means (D); means (Q2) for performing weighting of the frequency correction direction signal; and means (Q3) for updating the optimum frequency compensation amount estimated by the means (B) based on the weighted frequency correction direction signal.

In one embodiment of the invention, the means (H3) performs weighting based on the optimum frequency compensation amount.

In one embodiment of the invention, the means (Q2) performs weighting based on the optimum frequency compensation amount.

In one embodiment of the invention, the means (Q1) includes means (R) for smoothing the frequency correction direction signal which represents the correction direction of the optimum frequency compensation amount.

In one embodiment of the invention, the means (H3) includes means (T) for smoothing the phase correction direction signal which represents the correction direction of the optimum phase compensation amount based on the optimum frequency compensation amount.

According to the above-described demodulation method, since a tentative complex demodulated signal generated by demodulating a modulated input signal using a signal having a fixed frequency includes a phase shift or a frequency error, a determined complex demodulated signal is obtained by the compensating for the phase shift or the frequency error of the tentative complex demodulated signal.

In this specification, compensating for a phase shift or a frequency error of a tentative complex demodulated signal is also referred to as "compensating for the phase or frequency of the tentative complex demodulated signal" or "compensating for the tentative complex demodulated signal".

In accordance with the above-described principle, in step (a), a determined complex demodulated signal is obtained by compensating for the tentative complex demodulated signal based on an optimum phase compensation amount. Then, in step (b), an optimum frequency compensation amount is estimated based on a shift in the optimum phase compensation amount during a predetermined cycle. In step (c), an immediately subsequent optimum phase compensation amount to be used in the steps (a) and (b) performed in repetition is estimated based on the tentative complex demodulated signal, the determined complex demodulated signal, and the optimum frequency compensation amount. By performing complex multiplication of the immediately subsequent optimum phase compensation amount and the next tentative complex demodulated signal, phase compensation and frequency compensation are performed. Such control is performed based on (1) the error between the tentative complex demodulated signal and the complex identification signal and (2) the error between the shift in the optimum phase compensation amount during a predetermined cycle and the optimum frequency compensation amount. As a result of the control, the error in the determined complex demodulated signal is reduced cycle by cycle, and thus a proper complex signal is stably obtained.

In the case where the immediately subsequent optimum phase compensation amount is estimated based on the optimum frequency compensation amount, the optimum phase compensation amount and a weighted correction direction signal, the size of the entire circuit system can be reduced.

In the case where the optimum frequency compensation amount is estimated based on the optimum phase compensation amounts obtained by estimations performed in repetition, the size of the entire circuit system can be reduced and also the signal processing amount required for one cycle of estimation can be reduced. For demodulating a signal modulated by the QAM system, the optimum frequency compensation amount is estimated using an optimum phase compensation amount having a sufficiently small amplitude change. Accordingly, the optimum frequency compensation amount can be estimated in stable state. Moreover, an AGC function by which the amplitude is controlled with respect to the amplitude change over time can be realized.

In the case where the optimum frequency compensation amount is estimated based on the determined complex demodulated signal and a complex error signal, the optimum frequency compensation amount and the optimum phase compensation amount can be estimated in parallel. Thus, the size of the entire circuit system can be reduced and also the signal processing amount required for one cycle of estimation can be reduced.

In the case where the complex error signal is selectively used, the pull-in time of the optimum frequency compensation amount can be shortened.

In the case where the optimum phase compensation amount is obtained based on the cross-correlation value between the tentative complex demodulated signal and the complex identification signal and also based on the optimum frequency compensation amount, the size of the entire circuit system can be reduced. For demodulating a signal modulated by the QAM system, the optimum frequency compensation amount is estimated using an optimum phase compensation amount having a sufficiently small amplitude change. Accordingly, for demodulating a signal modulated by the M-ary QAM system using the RLS (recursive least squares) algorithm, a circuit for normalizing a complex demodulated signal, or an orthogonal coordinate—polar coordinate conversion circuit or a polar coordinate—orthogonal coordinate conversion circuit which is formed of a ROM or the like is not required. Thus, signal processing time is shortened and the size of the entire circuit system is reduced. Since the circuit for normalizing a complex demodulated signal or a ROM is not required to estimate an optimum frequency compensation amount, an AGC function by which the amplitude is controlled with respect to the amplitude change over time can be realized. When an RLS algorithm is used, optimum phase compensation can be realized at high speed by use of a training signal.

In the case where weighting with respect to the phase correction direction signal and the frequency correction direction signal is performed based on the optimum frequency compensation amount, a correction direction signal can be generated in consideration of the frequency error, and thus the range in which the frequency can be corrected can be enlarged.

In the case where the frequency correction direction signal is smoothed, noise components can be restricted.

In the case where the phase correction direction signal is smoothed based on the optimum frequency compensation amount, noise components can be restricted.

Thus, the invention described herein makes possible the advantage of providing a demodulation method and apparatus for compensating for the phase and the frequency of a tentative demodulated signal formed after quasi-coherent detection by a sufficiently simple configuration.

These and other advantages of the present invention will become apparent to those skilled in the art upon reading and understanding the following detailed description with reference to the accompanying figures.

BRIEF DESCRIPTION OF THE DRAWINGS

FIGS. 22A, 22B, 22C and 22D are graphs used for describing the state of phase error generation when phase control is not performed for the QPSK system;

FIGS. 23A, 23B, 23C and 23D are graphs used for describing the state of phase error generation when phase control is performed for the QPSK system;

FIGS. 24A, 23B, 24C and 24D are graphs used for describing the state of phase error generation and frequency error generation when phase control is not performed for the QPSK system;

DESCRIPTION OF THE PREFERRED EMBODIMENTS

Hereinafter, the present invention will be described by way of examples with reference to the attached drawings.

EXAMPLE 1

A basic principle of a demodulation method and apparatus in a first example according to the present invention will be described.

Generally in a signal processing circuit, an error $e(n)$ generated in an output signal from the signal processing circuit at time n of the "n"th sample of the symbol cycle T can be reduced by optimizing the transmission function $h(n)$ in accordance with the least mean square (LMS) algorithm. By the LMS algorithm, the optimum transmission function $h(n+1)$ at time $(n+1)$ is obtained by expression (O), where $x(n)$ represents the input signal and $a$ represents the step parameter.

$$\alpha \cdot e(n) \cdot x(n) + h(n) = h(n+1) \tag{O}$$

The above-described LMS algorithm can be adopted for a phase control signal in a quasi-coherent detection system, i.e., a phase control circuit for obtaining a determined demodulated signal by controlling the phase of the tentative demodulated signal generated by demodulation with a frequency which is substantially equal to that of the carrier.

Figure 19:
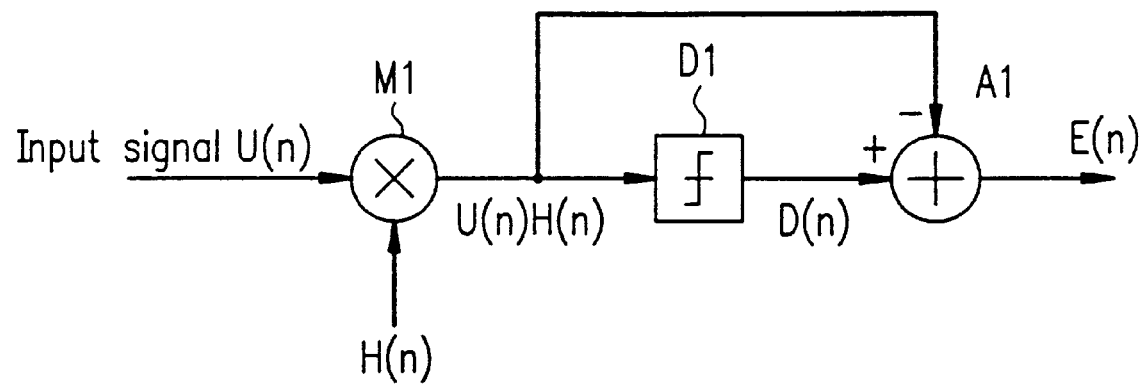
FIG. 19 is a schematic block diagram showing a general configuration of a phase control circuit.

FIG. 19 shows a general configuration of such a phase control circuit, which includes a multiplier M1, an identifier D1, and a complex adder A1. In the following description, capital letters represent a complex scalar.

A complex demodulated signal $U(n)$, which is generated by tentatively demodulating a signal modulated by a QPSK (quadrature phase shift keying) system using a signal having a fixed frequency, is a baseband signal including an in-phase component and a quadrature component which are separated from each other. When the tentative complex demodulated signal $U(n)$ is input to the complex multiplier M1, the complex multiplier M1 compensates for the phase of the tentative complex demodulated signal $U(n)$ by an optimum phase compensation amount $H(n)$ and thus outputs a determined complex modulated signal $U(n)H(n)$.

The identifier D1 identifies a symbol which is closest to the determined complex demodulated signal $U(n)H(n)$ among the symbols obtained by demodulating the signals modulated by the QPSK system, and outputs an identification signal $D(n)$ representing the resultant symbol.

Figure 20:
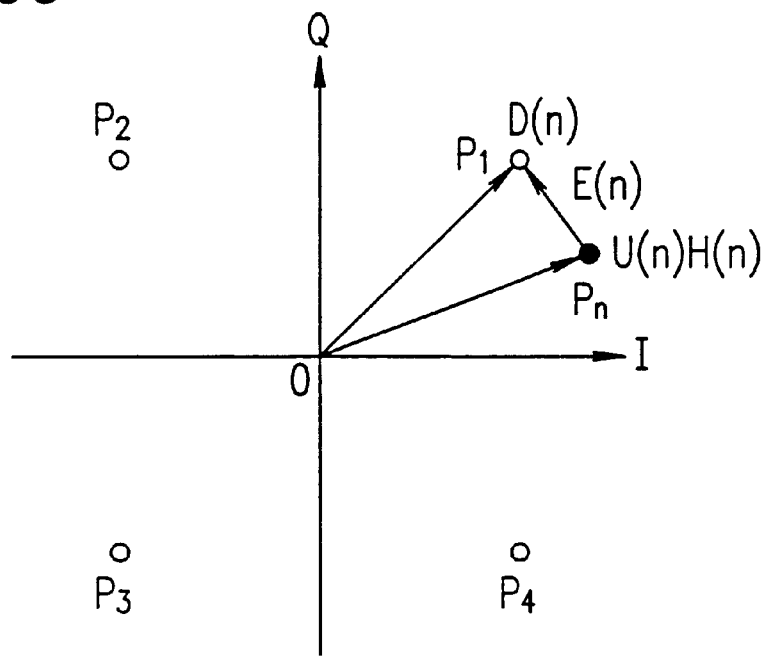
FIG. 20 is a view showing an orthogonal coordinate system having symbols arranged.

FIG. 20 shows symbols $P_1$, $P_2$, $P_3$ and $P_4$ in an orthogonal coordinate system. In FIG. 20, vector $OP_n$ corresponds to the determined complex modulated signal $U(n)H(n)$, and vector $OP_1$ corresponds to the identification signal $D(n)$. Since the determined complex modulated signal $U(n)H(n)$ is closest to the symbol $P_1$ in FIG. 20, the identification signal $D(n)$ representing the symbol $P_1$ is output from the identifier D1.

The complex adder A1 performs complex subtraction of the threshold complex demodulated signal $U(n)H(n)$ from the identification signal $D(n)$ and thus outputs an estimated error $E(n)$. The estimated error $E(n)$ can be represented by expression (1).

$$E(n) = D(n) - U(n)H(n) \tag{1}$$

Although the identification signal $D(n)$ is a signal closest to the determined complex demodulated signal $U(n)H(n)$ herein, the identification signal $D(n)$ may be a training signal.

In the LMS algorithm, a square error $J(n)$ is used as the evaluation reference of the estimated error $E(n)$. The optimum phase compensation amount $H(n)$ is updated so as to minimize the estimated error $E(n)$.

The square error $J(n)$ can be represented by expression (2) using expression (1).

$$J(n) = [E(n)]^2 = [D(n) - U(n)H(n)]^2 \tag{2}$$

Figure 21:
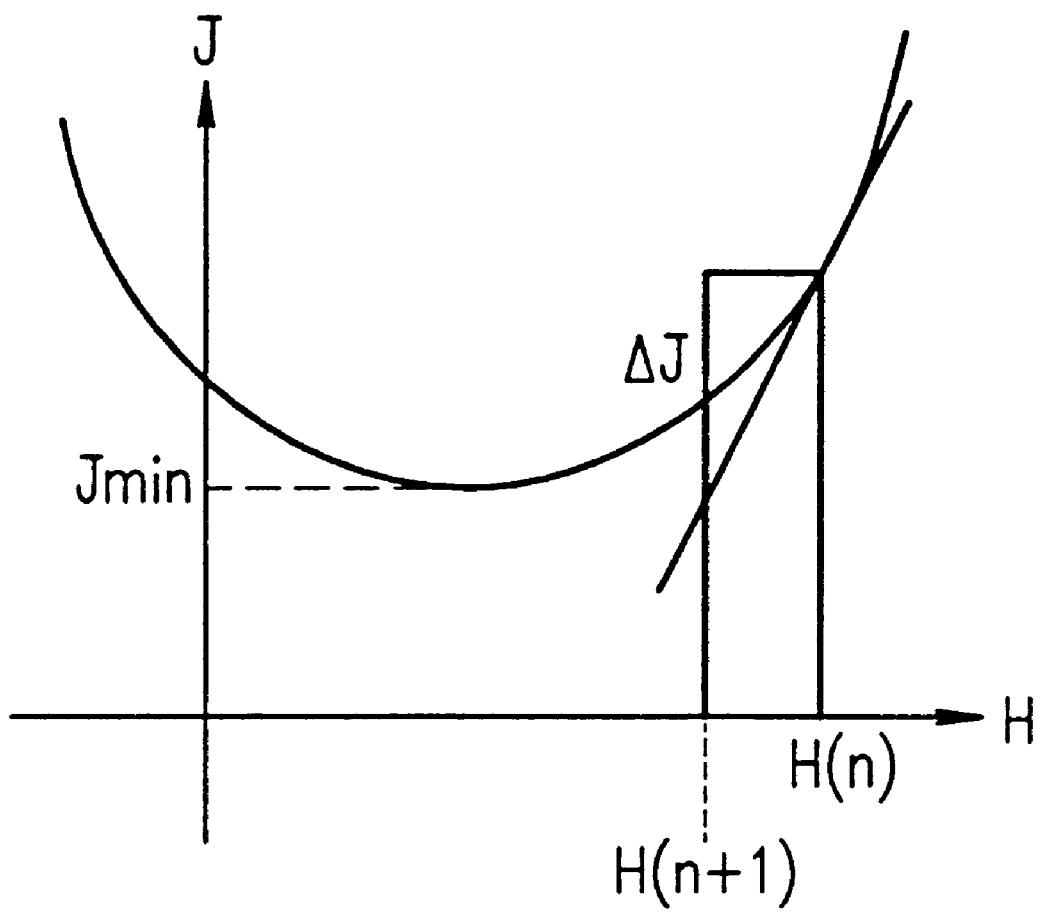
FIG. 21 is a graph showing a square error in the LMS algorithm.

As can be appreciated from expression (2), the square error $J(n)$ and the optimum phase compensation amount $H(n)$ have the secondary function relationship as shown in FIG. 21. Accordingly, there is a level of the optimum phase compensation amount $H(n)$ at which the square error $J(n)$ is the minimum value Jmin.

In the LMS algorithm, the gradient of the characteristic curve of the secondary function regarding the optimum phase compensation amount $H(n)$ at arbitrary time n. By repeating an update operation of adding a small value in the opposite direction to that of the gradient to the optimum phase compensation amount $H(n)$ at every symbol cycle T, the level of the optimum phase compensation amount $H(n)$ at which the secondary function is the minimum value Jmin is obtained.

The optimum phase compensation amount $H(n)$ is updated as represented by expression (3), where c is a constant.

$$H(n+1)=H(n)-c\partial J(n)/\partial H(n) \qquad (3)$$

In order to develop the second term of the right side of expression (3), the estimated error E(n) is divided into a real part $E_i(n)$ and an imaginary part $E_q(n)$ as represented by expression (4). Hereinafter, "$_i$" represents a real part, and "$_q$" represents an imaginary part.

$$E_i(n)=D_i(n)-[H_i(n)U_i(n)-H_q(n)U_q(n)]$$
$$E_q(n)=D_q(n)-[H_q(n)U_i(n)+H_i(n)U_q(n)] \qquad (4)$$

The square error J(n) is represented by expression (5) using $E_i(n)$ and $E_q(n)$.

$$J(n)=[E_i(n)]^2+[E_q(n)]^2 \qquad (5)$$

The gradient $\partial J(n)/\partial H(n)$ of the second term of the right side of expression (3) is obtained using expressions (4) and (5) as represented by expression (6).

$$\frac{dJ(n)}{dH(n)} = \begin{pmatrix} \frac{\partial J(n)}{\partial Hi(n)} \\ \frac{\partial J(n)}{\partial Hq(n)} \end{pmatrix} = \begin{pmatrix} 2Ei(n)\frac{\partial Ei(n)}{\partial Hi(n)}+2Eq(n)\frac{\partial Eq(n)}{\partial Hi(n)} \\ 2Ei(n)\frac{\partial Ei(n)}{\partial Hq(n)}+2Eq(n)\frac{\partial Eq(n)}{\partial Hq(n)} \end{pmatrix} \qquad (6)$$

$$= 2\begin{pmatrix} \frac{\partial Ei(n)}{\partial Hi(n)} & \frac{\partial Eq(n)}{\partial Hi(n)} \\ \frac{\partial Ei(n)}{\partial Hq(n)} & \frac{\partial Eq(n)}{\partial Hq(n)} \end{pmatrix}\begin{pmatrix} Ei(n) \\ Eq(n) \end{pmatrix}$$

$$= 2\begin{pmatrix} -Ui(n) & -Uq(n) \\ Uq(n) & -Ui(n) \end{pmatrix}\begin{pmatrix} Ei(n) \\ Eq(n) \end{pmatrix}$$

$$= -2\begin{pmatrix} Ui(n) & Uq(n) \\ -Uq(n) & Ui(n) \end{pmatrix}\begin{pmatrix} Ei(n) \\ Eq(n) \end{pmatrix}$$

$$= -2\begin{pmatrix} Ei(n) & -Eq(n) \\ Eq(n) & Ei(n) \end{pmatrix}\begin{pmatrix} Ui(n) \\ -Uq(n) \end{pmatrix}$$

By substituting the result of expression (6) into expression (3), expressions (7) and (8) are obtained, where $\mu=2c$ and $\mu$ and $2c$ are both step parameters.

$$H(n+1)=H(n)+2cE(n)U^*(n) \qquad (7)$$
$$H(n+1)=H(n)+\mu[D(n)-H(n)U(n)]U^*(n) \qquad (8)$$

The step parameters are set sufficiently small to prevent dispersion of the optimum phase compensation amount H(n) even when noise is added to the tentative complex demodulated signal U(n) and also to stabilize the optimum phase compensation amount H(n) after convergence. $U^*(n)$ represents the conjugate complex number of U(n). $H^*(n)$ (infra) represents the conjugate complex number of H(n).

Expression (8) obtained in the above-described manner is used for updating the optimum phase compensation amount H(n) for controlling the phase using the estimated error E(n) by the LMS algorithm.

In the case where, for example, the tentative complex demodulated signal U(n) has an error of phase angle θ with respect to the transmission symbol of the QPSK system, amplitude phase control (APC) can be performed in accordance with expression (8). As shown in FIGS. 23A, 23B, 23C and 23D, at time n (n=0, 1, 2, . . . k) at which the tentative complex demodulated signal U(n) is sampled at every symbol cycle T, the error between the identification signal D(n) and the demodulated signal U(n), i.e., the phase angle θ is gradually reduced.

In the case where the phase control is not performed as shown in FIGS. 22A, 22B, 22C and 22D, the phase angle θ between the identification signal D(n) and the demodulated signal U(n) is not improved at sampling time n (n=0, 1, 2, . . . k).

In the case where the tentative complex demodulated signal U(n) rotates with respect to the transmission symbol of the QPSK system at phase angle δ at every symbol cycle T (the frequency error is included in the tentative complex demodulated signal U(n)), if the phase control is not performed, the phase angle θ between the identification signal D(n) and the demodulated signal U(n) is gradually increased at sampling time n (n=0, 1, 2, . . . k) as shown in FIGS. 24A, 24B, 24C and 24D. In other words, phase angle δ is added to phase angle θ at time n=0 at every symbol cycle T.

However, in the case where the frequency error is included in the tentative complex demodulated signal U(n), even if the phase control is performed, the optimum phase compensation amount H(n) cannot be accurately estimated for the following reason. The updating amount of the optimum phase compensation amount H(n) for each symbol cycle T in expression (8) relies on the magnitude of the step parameter $\mu$. Since the step parameter $\mu$ is set to be sufficiently small to prevent dispersion of the optimum phase compensation amount H(n) for stabilization thereof, the updating amount of the optimum phase compensation amount H(n) for each symbol cycle T is also small. Accordingly, the phase shift larger than the updating amount cannot be compensated for.

In order to accurately estimate the optimum phase compensation amount H(n), the frequency error needs to be considered. Under such circumstances, frequency correction is performed for the right side of expression (8) with the provision that the tentative complex demodulated signal U(n) includes the frequency error as well as the phase error. In other words, the optimum phase compensation amount H(n) needs to include an optimum frequency compensation amount F(n) for giving rotation in the opposite direction to the phase angle δ. It is considered that the compensation amount obtained by performing complex multiplication of the optimum phase compensation amount H(n) in expression (8) and the optimum frequency compensation amount F(n) is close to the optimum phase compensation amount H(n+1) at time t=(n+1). Expression (9) represents the LMS algorithm for performing phase control in consideration of the frequency error as described above.

$$\mu_1[D(n)-H(n)U(n)]U^*(n)+F(n)H(n)=H(n+1) \qquad (9)$$

In expression (9), $\mu_1$ represents a real number and a step parameter of the optimum phase compensation amount H(n).

In order to estimate the optimum frequency compensation amount F(n) in accordance with the LMS algorithm, the optimum frequency compensation amount F(n) can be updated based on expression (10).

$$F(n+1)=F(n)-c\partial[Ef(n)]^2/\partial F(n) \qquad (10)$$

In order to develop expression (10), the estimated error Ef(n) of the frequency included in the second term of the right side is obtained in the following manner.

Herein, estimation of the optimum frequency compensation amount F(n) refers to obtaining the optimum frequency compensation amount F(n) which, when the tentative complex demodulated signal U(n) including the frequency error rotates by phase angle δ during the symbol cycle T, provides the tentative complex demodulated signal U(n) with the phase angle −δ in the direction opposite to the rotation direction.

Where δ(n) is the phase angle of the optimum phase compensation amount H(n), the phase angle −δ in the opposite direction (=∠F(n)) can be represented by shift in the optimum phase compensation amount H(n) during the symbol cycle T as in expression (11).

$$[\theta(n)-\theta(n-1)]=-\delta \quad (11)$$

Expression (11) can be represented using the optimum phase compensation amount H(n) and the optimum frequency compensation amount F(n) as in expression (12).

$$H(n)-F(n)H(n-1)=0 \quad (12)$$

Expression (12) is valid when the optimum phase compensation amount H(n) and the optimum frequency compensation amount F(n) are accurately estimated and is invalid when optimum frequency compensation amount F(n) is not accurately estimated.

Where the estimated error caused when the optimum frequency compensation amount F(n) is not accurately estimated is Ef(n), Ef(n) can be defined by expression (13) based on expression (12).

$$Ef(n)=H(n)-F(n)H(n-1) \quad (13)$$

By developing expression (10) using expression (13), expression (14) is obtained.

$$\mu_2[H(n)-F(n)H(n-1)]H^*(n-1)+F(n)=F(n+1) \quad (14)$$

In expression (14), $\mu_2$ represents a real number and a step parameter.

Expression (14) is used for updating the optimum frequency compensation amount F(n) for controlling the phase using the estimated error Ef(n) by the LMS algorithm.

By performing phase control based on expression (9) and frequency control based on expression (14), the phase error and the frequency error of the tentative complex demodulated signal U(n) accompanying a frequency error is compensated for and thus a determined complex demodulated signal U(n)H(n) can be obtained. In other words, accurate demodulation can be performed.

Figure 1:
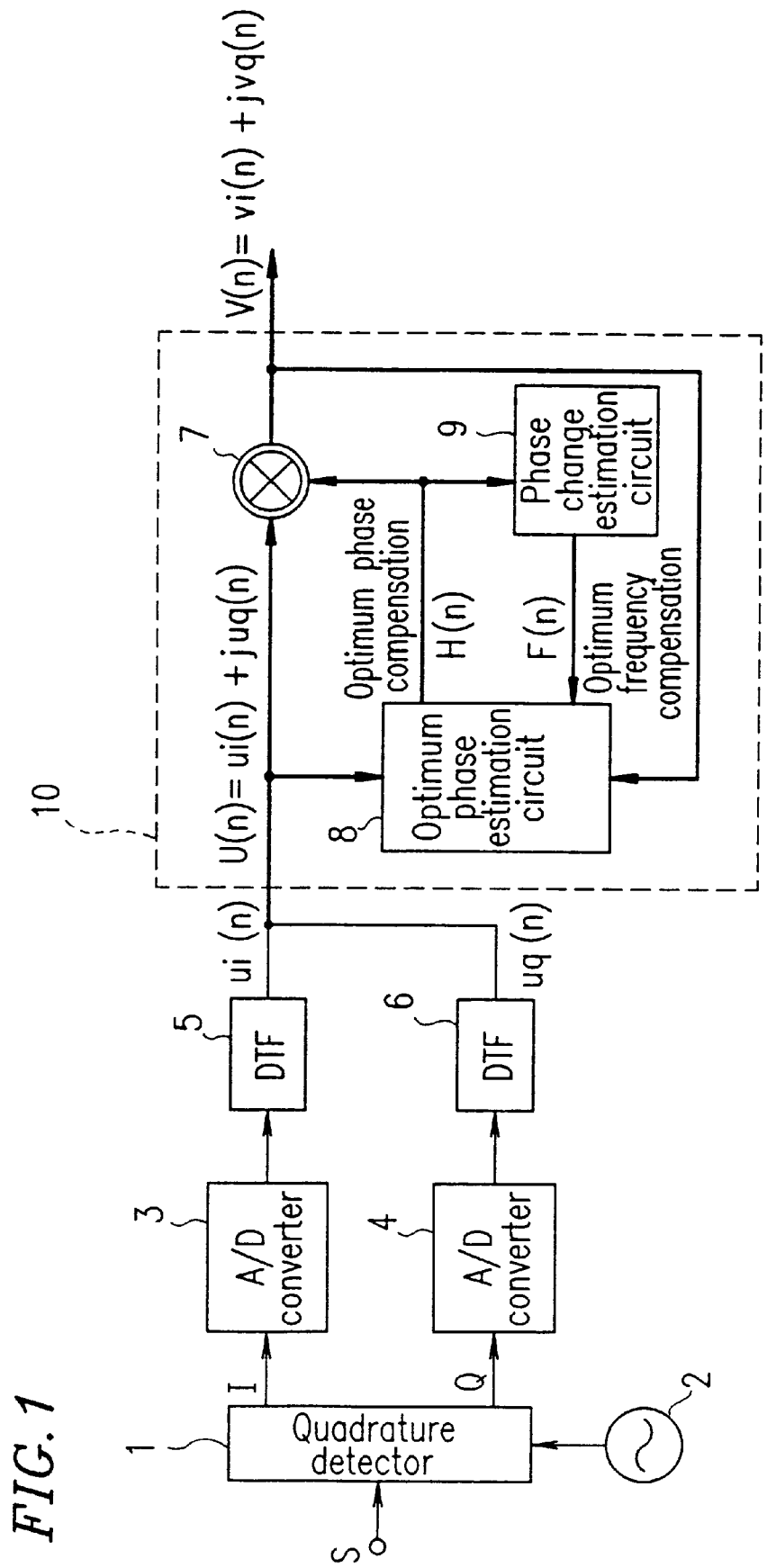
FIG. 1 is a block diagram of a demodulation apparatus in a first example according to the present invention.

FIG. 1 shows a demodulation apparatus adopting the above-described basic principle of the first example according to the present invention.

As shown in FIG. 1, a demodulation apparatus includes a quadrature detector 1, a local oscillator 2, A/D converters 3 and 4, digital transversal filters (DTFs) 5 and 6, and a phase control circuit 10 represented by the dotted box.

The phase control circuit 10 includes a complex multiplier 7, an optimum phase estimation circuit 8, and a phase shift estimation circuit 9. The thick solid lines in the dotted box indicate signal lines represented by complex scalar, and the thin solid lines outside the dotted box indicate signal lines represented by scalar.

In such a configuration, the quadrature detector 1 receives a modulated input signal S and an oscillation signal from the local oscillator 2. The quadrature detector 1 converts I and Q baseband signals using the oscillation signal. The I and Q baseband signals have quadrature relationship to each other.

The I and Q baseband signals are respectively converted into digital signals via the A/D converters 3 and 4, and have waves thereof shaped by the DTFs 5 and 6 to be tentative demodulated signals U(n) (in-phase signal ui(n) and quadrature signal uq(n)). The demodulated signals U(n) are input to the phase control circuit 10.

In the case of the QPSK system, where the original signal of the baseband is d(t) and the frequency of the carrier is f0, the modulated input signal S is represented by s(2π·f0·t+d(t)). Where the oscillation frequency of the local oscillator 2, the phase of the output obtained by quadrature detection of the modulated input signal S performed using the oscillation signal of the frequency f1 is 2π·Δf·t+d(t)+Φ.

Δf represents the frequency error, Φ represents the initial phase error, and t represents the time, and Δf=f0−f1=ω/2π. Where the phase error of the tentative complex demodulated signal U(n) obtained at time n during the symbol cycle T for one symbol is θ1 and the phase error of the complex demodulated signal U(n+1) obtained at time (n+1) is θ2, ω=(θ2−θ1)/T.

The phase control circuit 10 is used for obtaining the determined complex demodulated signal U(n) from the tentative demodulated signal U, and compensates for the phase represented by 2π·Δf·t+Φ.

In the phase control circuit 10, the tentative complex demodulated signal U(n) is input to the complex multiplier 7 having a phase rotation function. The complex multiplier 7 rotates the phase of the tentative complex demodulated signal U(n) in correspondence with −(2π·Δf·t+Φ) in accordance with the optimum phase compensation amount H(n) output by the optimum phase estimation circuit 8, and outputs a determined complex demodulated signal H(n)U(n)=V(n). The optimum phase compensation amount H(n) is also output to the phase shift estimation circuit 9. The phase shift estimation circuit 9 obtains the optimum frequency compensation amount F(n), which is output to the optimum phase estimation circuit 8. The optimum phase estimation circuit 8 receives the tentative complex demodulated signal U(n), the determined complex demodulated signal V(n) and the optimum frequency compensation amount F(n), and generates an optimum phase compensation amount H(n+1) used for the next processing. At the next processing, i.e., when a tentative complex demodulated signal U(n+1) is input to the complex multiplier 7, the optimum phase estimation circuit 8 sends the optimum phase compensation amount H(n+1) to the complex multiplier 7.

Figure 2:
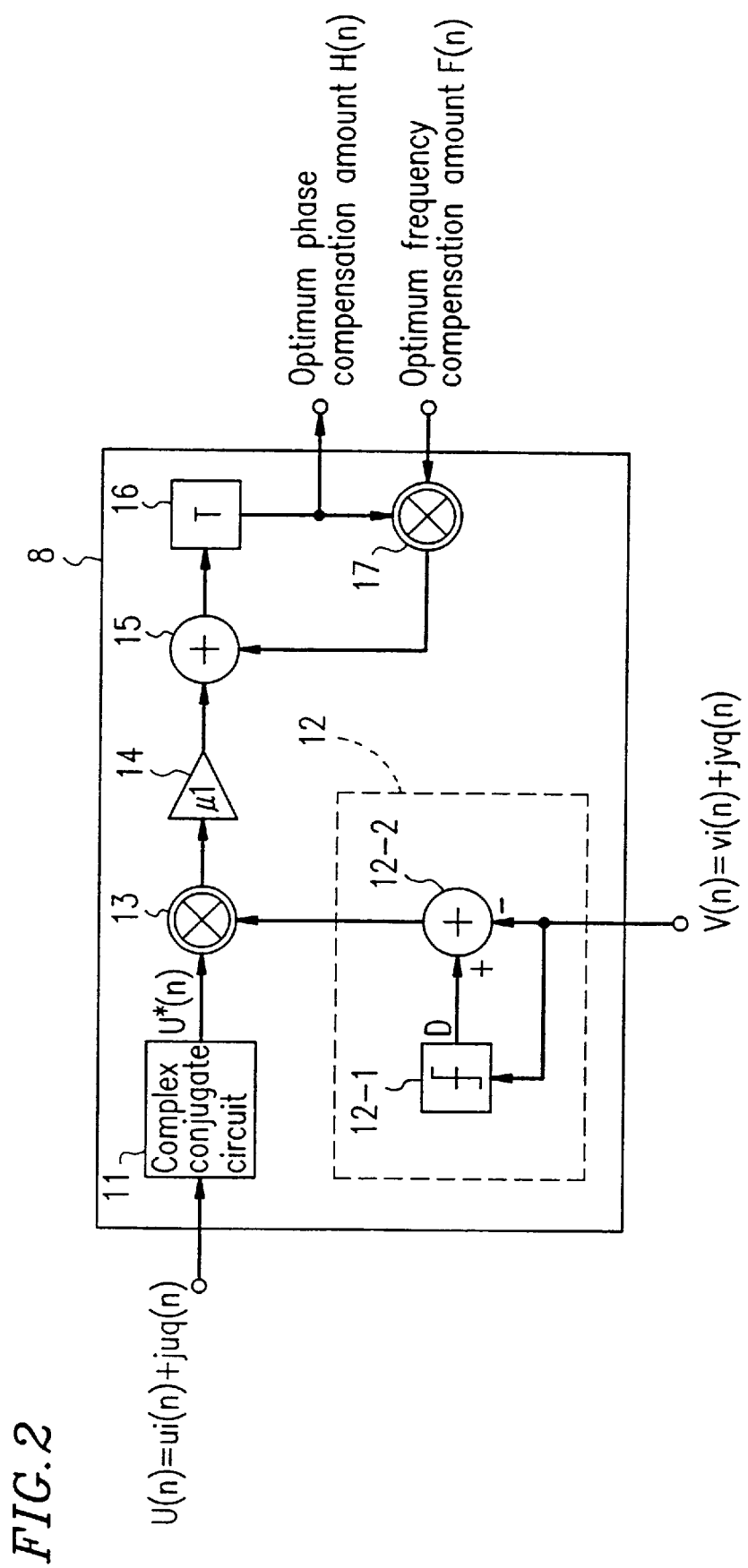
FIG. 2 is a block diagram of an optimum phase estimation circuit in the demodulation apparatus shown in FIG. 1.

FIG. 2 is a block diagram showing a configuration of the optimum phase estimation circuit 8. The optimum phase estimation circuit 8 obtains an optimum phase compensation amount H(n+1) based on the optimum frequency compensation amount F(n) and the optimum phase compensation amount H(n) in accordance with the LMS algorithm.

The optimum phase estimation circuit 8, which is provided for estimating the optimum phase compensation amount H(n+1) represented by expression (9), includes a complex conjugate circuit 11, a phase error detection circuit 12, a complex multiplier 13, a weighting circuit 14, a complex adder 15, a delay circuit 16, and another complex multiplier 17. The phase error detection circuit 12 includes an identifier 12-1 and a complex subtractor 12-2.

The complex conjugate circuit 11 receives the tentative complex demodulated signal U(n) and outputs a complex conjugate demodulated signal U*(n) which acts as a complex conjugate with respect to the tentative complex demodulated signal U(n) to the complex multiplier 13.

The phase error detection circuit 12 receives the determined complex demodulated signal V(n) from the complex multiplier 7. The determined complex demodulated signal V(n) includes an in-phase signal $v_i(n)$ and a quadrature signal $v_q(n)$. The identifier 12-1 of the phase error detection circuit 12 identifies a symbol which is closest to the determined complex demodulated signal V(n) and outputs an identification signal D(n) representing the symbol. The complex subtractor 12-2 of the phase error detection circuit 12 performs complex subtraction of the determined complex demodulated signal V(n) from the identification signal D(n) and outputs a complex error signal representing the distance between the identification signal D(n) and the determined complex demodulated signal V(n).

The complex multiplier 13 performs complex multiplication of the complex error signal and the complex conjugate demodulated signal U*(n) and outputs a phase correction direction signal representing the correction direction of the optimum phase compensation to the weighting circuit 14. The phase correction direction signal corresponds to a part of the first term of the left side of expression (9), i.e., [D(n)−H(n)U(n)]U*(n).

The weighting circuit 14 performs weighting corresponding to the step parameter $\mu_1$ (0<$\mu_1$) with respect to the phase correction direction signal and outputs the resultant value to the complex adder 15.

The delay circuit 16 outputs the optimum phase compensation amount H(n) estimated at the previous processing to the complex multiplier 17. The complex multiplier 17 performs complex multiplication of the optimum phase compensation amount H(n) from the delay circuit 16 and the optimum frequency compensation amount F(n) from the phase shift estimation circuit 9 and outputs the resultant value to the complex adder 15. The complex adder 15 performs complex addition of the value from the weighting circuit 14 and the value from the complex multiplier 17 and outputs the optimum phase compensation amount H(n+1) represented by expression (9) to the delay circuit 16. The optimum phase compensation amount H(n+1) is output from the delay circuit 16 at the next processing, i.e., at time (n+1) at which the tentative complex demodulated signal U(n+1) is received and the optimum phase compensation amount H(n+2) is estimated.

Figure 3:
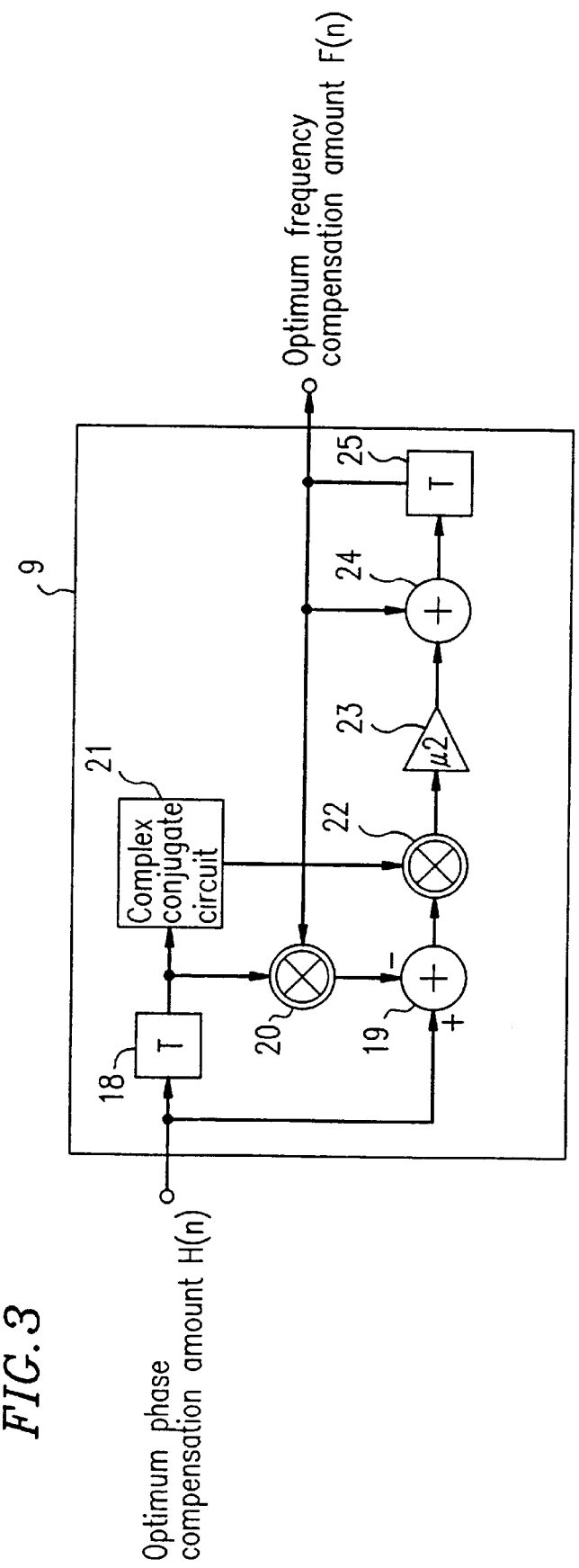
FIG. 3 is a block diagram of a phase shift estimation circuit in the demodulation apparatus shown in FIG. 1.

FIG. 3 is a block diagram showing the phase shift estimation circuit 9. The phase shift estimation circuit 9 obtains an optimum frequency compensation amount F(n) in accordance with the LMS algorithm.

The phase shift estimation circuit 9, which is provided for estimating the optimum frequency compensation amount F(n) represented by expression (14), includes a delay circuit 18, a complex subtractor 19, a complex multiplier 20, a complex conjugate circuit 21, another complex multiplier 22, a weighting circuit 23, a complex adder 24, and another delay circuit 25.

The delay circuit 18 received an optimum phase compensation amount H(n−1) from the optimum phase estimation circuit 8 at the previous processing, and outputs the optimum phase compensation amount H(n−1) to the complex multiplier 20 and the complex conjugate circuit 21 at time n, i.e., at the present processing. The delay circuit 25 outputs the optimum frequency compensation amount F(n) estimated at the previous processing to the complex multiplier 20. The complex multiplier 20 receives the optimum phase compensation amount H(n−1) from the delay circuit 18 and the optimum frequency compensation amount F(n) from the delay circuit 25, performs complex multiplication of the optimum phase compensation amount H(n−1) and the optimum frequency compensation amount F(n), and outputs the resultant value, i.e., F(n)H(n−1) to the complex subtractor 19. The complex subtractor 19 performs complex subtraction of the F(n)H(n−1) from the optimum phase compensation amount H(n) to obtain a phase shift error signal, which is output.

The complex conjugate circuit 21 outputs H*(n−1) which acts as a complex conjugate with respect to the optimum phase compensation amount H(n−1) to the complex multiplier 22. The complex multiplier 22 performs complex multiplication of the phase error signal from the complex subtractor 19 and the signal H*(n−1) from the complex conjugate circuit 21 to generate and output a frequency correction direction signal representing the correction direction of the optimum frequency compensation. The frequency correction direction signal corresponds to a part of the first term of the left side of expression (14), i.e., [H(n)−F(n)H(n−1)]H*(n−1).

The weighting circuit 23 performs weighting corresponding to the step parameter $\mu_2$ with respect to the frequency correction direction signal and outputs the resultant value to the complex adder 24. The complex adder 24 performs complex addition of the value from the weighting circuit 23 and the optimum frequency compensation amount F(n) from the delay circuit 25 and outputs the optimum frequency compensation amount F(n+1) represented by expression (14) to the delay circuit 25. The optimum frequency compensation amount F(n+1) is output from the delay circuit 25 at the next processing, i.e., when the optimum phase compensation amount H(n+1) is input from the optimum phase estimation circuit 8 and the optimum frequency compensation amount F(n+2) is estimated.

The operation of the phase control circuit 10 in the first example can be summarized as follows. The tentative complex demodulated signal U(n), the determined complex demodulated signal V(n) and the optimum frequency compensation amount F(n) are input to the optimum phase estimation circuit 8. The optimum phase compensation amount H(n+1) used for the next processing is obtained based on the optimum phase estimation circuit 8, and the optimum phase compensation amount H(n+1) is output to the complex multiplier 7 and the phase shift estimation circuit 9 at the next processing.

At the next processing, i.e., at time (n+1), the complex multiplier 7 receives the tentative complex demodulated signal U(n+1) and the optimum phase compensation amount H(n+1), performs complex multiplication thereof, and outputs the determined complex demodulated signal V(n+1). The phase shift estimation circuit 9 obtains the optimum frequency compensation amount F(n+2) from the optimum phase compensation amounts H(n+1) and H(n) and outputs the optimum frequency compensation amount F(n+1) to the optimum phase estimation circuit 8. Accordingly, the optimum phase compensation amount H(n+2) used for the next processing is obtained by the optimum phase estimation circuit 8.

According to such a configuration, as can be appreciated from expression (9), the optimum phase compensation amount H(n) is estimated based on the tentative complex demodulated signal U(n), the determined complex demodulated signal V(n), and the optimum frequency compensation amount F(n).

The demodulation apparatus in the first example requires a smaller number of circuits such as delay circuits, complex multipliers and adders than the conventional apparatus. Accordingly, the entire circuit system can be reduced in size.

According to the system in the first example, the optimum phase compensation amount H(n) is used to estimate the optimum frequency compensation amount F(n). In the case where a quadrature amplitude modulated signal is demodulated, the optimum frequency compensation amount F(n) can be estimated in a stable state. Furthermore, since the optimum frequency compensation amount F(n) controls the tentative complex demodulated signal in the amplitude direction as well as in the rotation direction, an AGC function of controlling the amplitude with respect to the amplitude change over time can be realized.

In the first example, a signal modulated by the QPSK system is tentatively demodulated by the circuits before the phase control circuit 10, namely, circuits from the quadrature detector 1 up to the DTFs 5 and 6. The present invention is not limited to such a system. Alternatively, a signal modulated by the M-ary QAM system may be tentatively demodulated by the circuits before the phase control circuit 10 and input to the phase control circuit 10. In this case also, a determined demodulated signal can be obtained by the phase control circuit 10.

EXAMPLE 2

Figure 4:
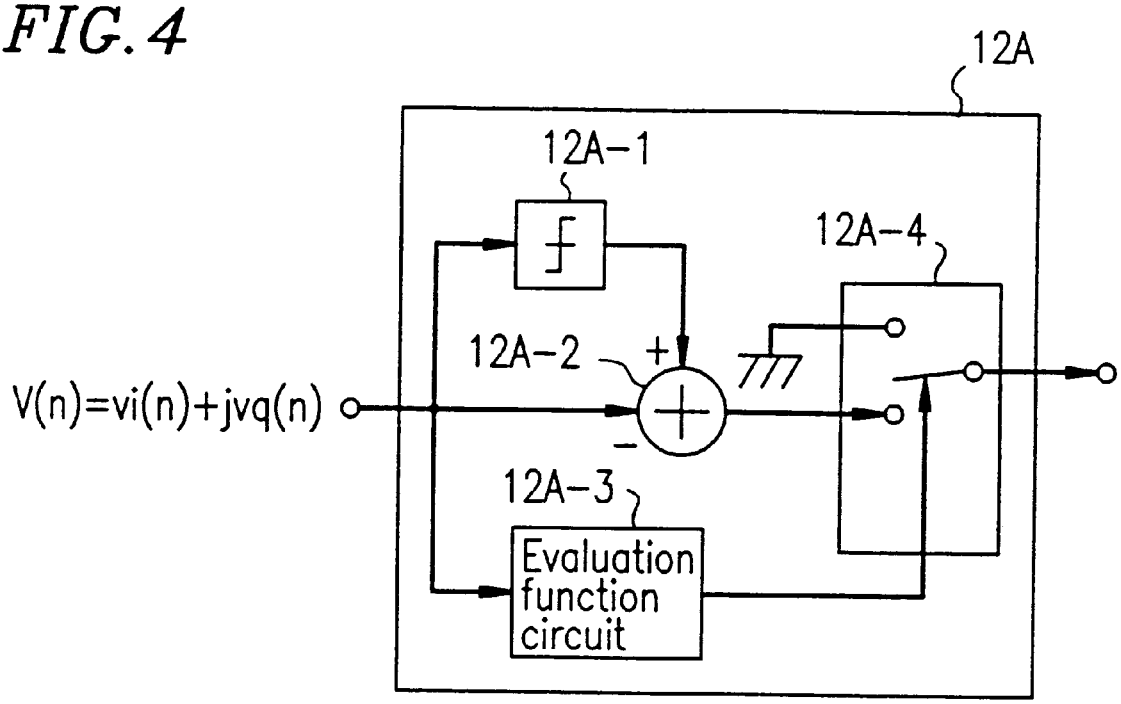
FIG. 4 is a block diagram of a phase error detection circuit in an optimum phase estimation circuit of a demodulation apparatus in a second example according to the present invention.

A demodulation apparatus in a second example according to the present invention will be described. FIG. 4 is a block diagram of a phase error detection circuit 12A used in place of the phase error detection circuit 12 in the optimum phase estimation circuit 8 shown in FIG. 2. In the demodulation apparatus in the second example, the configuration of the optimum phase estimation circuit 8, except for the phase error detection circuit 12A and the phase shift estimation circuit 9, is identical with configurations of those in the first example (see FIGS. 1, 2 and 3).

The phase error detection circuit 12A includes an identifier 12A-1, a complex subtractor 12A-2, an evaluation function circuit 12A-3, and a switch 12A-4. The phase error detection circuit 12A is different from the phase error detection circuit 12 shown in FIG. 2 in further including the evaluation function circuit 12A-3 for independently evaluating an in-phase signal $v_i(n)$ and a quadrature signal $v_q(n)$ of the determined complex demodulated signal V(n) and the switch circuit 12A-4 for controlling the output from the complex subtractor 12A-2 using a complex control signal output from the evaluation function circuit 12A-3.

Figure 5A:
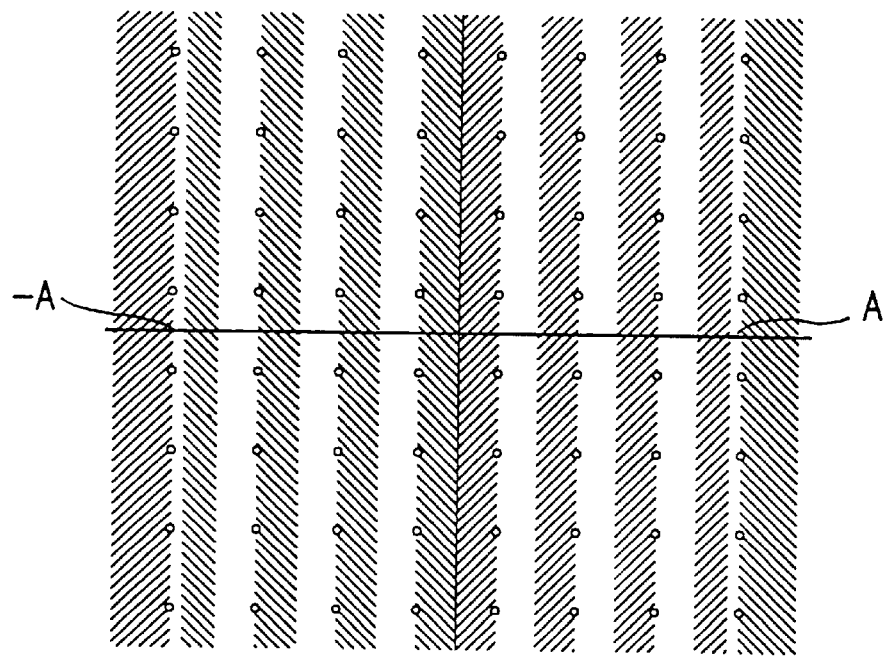
FIG. 5A is a view for illustrating the operation of the phase error detection circuit shown in FIG. 4, which shows symbols and areas in the in-phase axis direction.
Figure 5B:
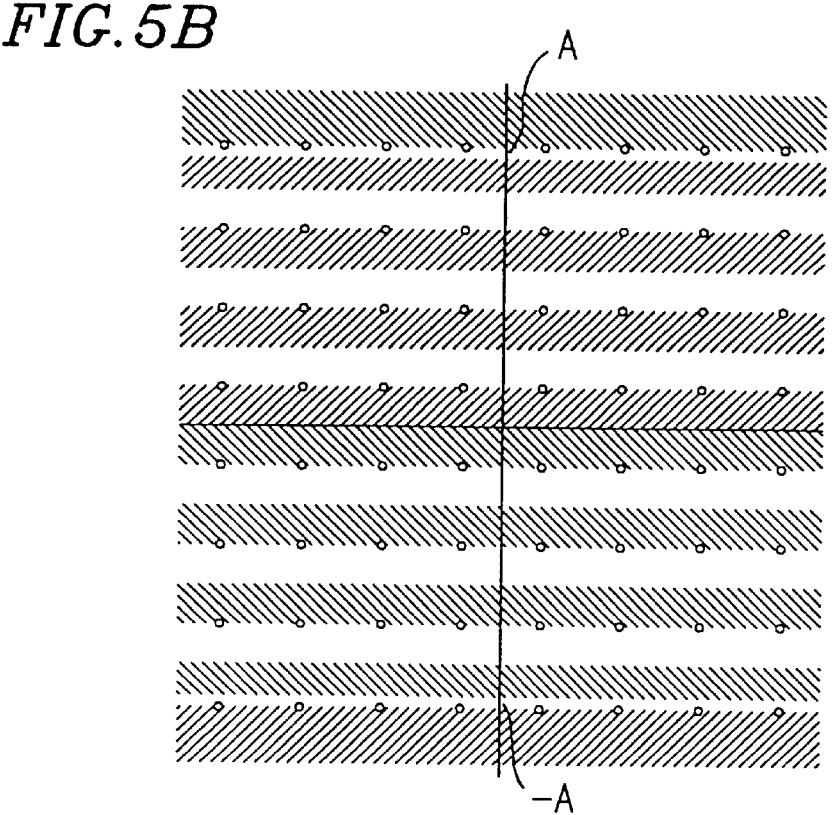
FIG. 5B is a view for illustrating the operation of the phase error detection circuit shown in FIG. 4, which shows symbols and areas in the quadrature axis direction.

In the case where a signal modulated by the 64-bit QAM system is tentatively demodulated into a tentative demodulated signal U(n) and input to the phase control circuit 10, and a tentative demodulated signal V(n) is generated from the tentative demodulated signal U(n), the evaluation function circuit 12A-3 evaluates the position of the determined demodulated signal V(n) with respect to 64 symbols arranged as shown in FIGS. 5A and 5B.

FIG. 5A shows areas (shaded areas and unshaded areas) used for determining the position of the in-phase signal $v_i(n)$ in an in-phase direction. FIG. 5B shows areas (shaded areas and unshaded areas) used for determining the position of the quadrature signal $v_q(n)$ in a quadrature direction. In FIGS. 5A and 5B, letter A represents a value obtained by dividing the sum of squares of the distances between the origin and 64 QAM symbols by the sum of the distances between the origin and the 64 QAM symbols.

In the case where there is an in-phase signal $v_i(n)$ in any of the lined areas shown in FIG. 5A, the error ratio for generating an identification signal by identifying the in-phase signal $v_i(n)$ increases. In the case where there is an in-phase signal $v_i(n)$ in any of the blank areas in FIG. 5A, the error ratio for identifying the in-phase signal $v_i(n)$ decreases. In the same manner, in the case where there is a quadrature signal $v_q(n)$ in any of the lined areas shown in FIG. 5B, the error ratio for identifying the quadrature signal $v_q(n)$ increases. In the case where there is a quadrature signal $v_q(n)$ in any of the blank areas in FIG. 5B, the error ratio for identifying the quadrature signal $v_q(n)$ decreases.

The switch circuit 12A-4 receives the in-phase signal $v_i(n)$ and the quadrature signal $v_q(n)$ from the complex subtractor 12A-2 separately, and outputs either one of the in-phase signal $v_i(n)$ or the ground level, and either one of the quadrature signal $v_q(n)$ or the ground level.

The phase error detection circuit 12A operates in the following manner. The determined complex demodulated signal V(n) is input to the identifier 12A-1, the complex subtractor 12A-2 and the evaluation function circuit 12A-3. The identifier 12A-1 identifies a symbol which is closest to the determined complex demodulated signal V(n) and outputs an identification signal D(n) representing the symbol. The complex subtractor 12A-2 performs complex subtraction of the determined complex demodulated signal V(n) from the identification signal D(n) and outputs a complex error signal representing the distance between the identification signal D(n) and the determined complex demodulated signal V(n).

The evaluation function circuit 12A-3 receives the determined complex demodulated signal V(n). When an in-phase signal $v_i(n)$ is in any of the lined areas in FIG. 5A, the evaluation function circuit 12A-3 adds a high level signal to the switch 12A-4. In response to the high level signal, the switch 12A-4 selects and outputs the in-phase signal $v_i(n)$ from the complex subtractor 12A-2. When an in-phase signal $v_i(n)$ is in any of the blank areas in FIG. 5A, the evaluation function circuit 12A-3 adds a low level signal to the switch 12A-4. In response to the low level signal, the switch 12A-4 selects and outputs the ground level.

When a quadrature signal $v_q(n)$ is in any of the lined areas in FIG. 5B, the evaluation function circuit 12A-3 adds a high level signal to the switch 12A-4. In response to the high level signal, the switch 12A-4 selects and outputs the quadrature signal $v_q(n)$ from the complex subtractor 12A-2. When a quadrature signal $v_q(n)$ is in any of the blank areas in FIG. 5B, the evaluation function circuit 12A-3 adds a low level signal to the switch 12A-4. In response to the low level signal, the switch 12A-4 selects and outputs the ground level.

Due to such a system, the phase error detection circuit 12A outputs "0" as a complex error signal when the determined complex demodulated signal V(n) is in any of the blank areas, which indicates the error ratio for identifying the determined complex demodulated signal V(n) increases. Accordingly, update of the coefficient (optimum phase compensation amount H(n) and the optimum frequency compensation amount F(n)) based on a wrong complex error signal can be prevented. Thus, the pull-in time can be shortened, and the amplitude of the determined complex demodulated signal V(n) can be stabilized.

EXAMPLE 3

A basic principle of a demodulation method and apparatus in a third example according to the present invention will be described.

In the third example, expression (14) is modified as described below to obtain expression (17). The processing is performed based on expression (17). Since expression (14) is used for the phase shift estimation circuit 9 shown in FIG. 3, expression (17) is used for obtaining the optimum frequency compensation amount F(n) in a similar manner.

First, the first term of the left side of expression (14) is developed to obtain expression (15).

$$\mu_2[H(n)H^*(n-1)-F(n)|H(n-1)|^2]+F(n)=F(n+1) \quad (15)$$

By normalizing the part inside "[ ]" of expression (15) with $|H(n-1)|^2$, expression (16) is obtained.

$$\mu_2|H(n-1)|^2[\{H(n)/H(n-1)\}-F(n)]+F(n)=F(n+1) \quad (16)$$

The value of the step parameter $\mu_2$ for adjusting the updating amount of the optimum frequency compensation amount F(n) is arbitrary. Accordingly, by replacing $\mu_2|H(n-1)|^2$ with the step parameter $\mu_3$, expression (17) is obtained.

$$\mu_3[\{H(n)/H(n-1)\}-F(n)]+F(n)=F(n+1) \quad (17)$$

The first term of the left side of expression (16) and that of expression (17) have different updating amounts but an identical updating direction of the coefficient (optimum phase compensation amount H(n) and optimum frequency compensation amount F(n)).

Figure 6:
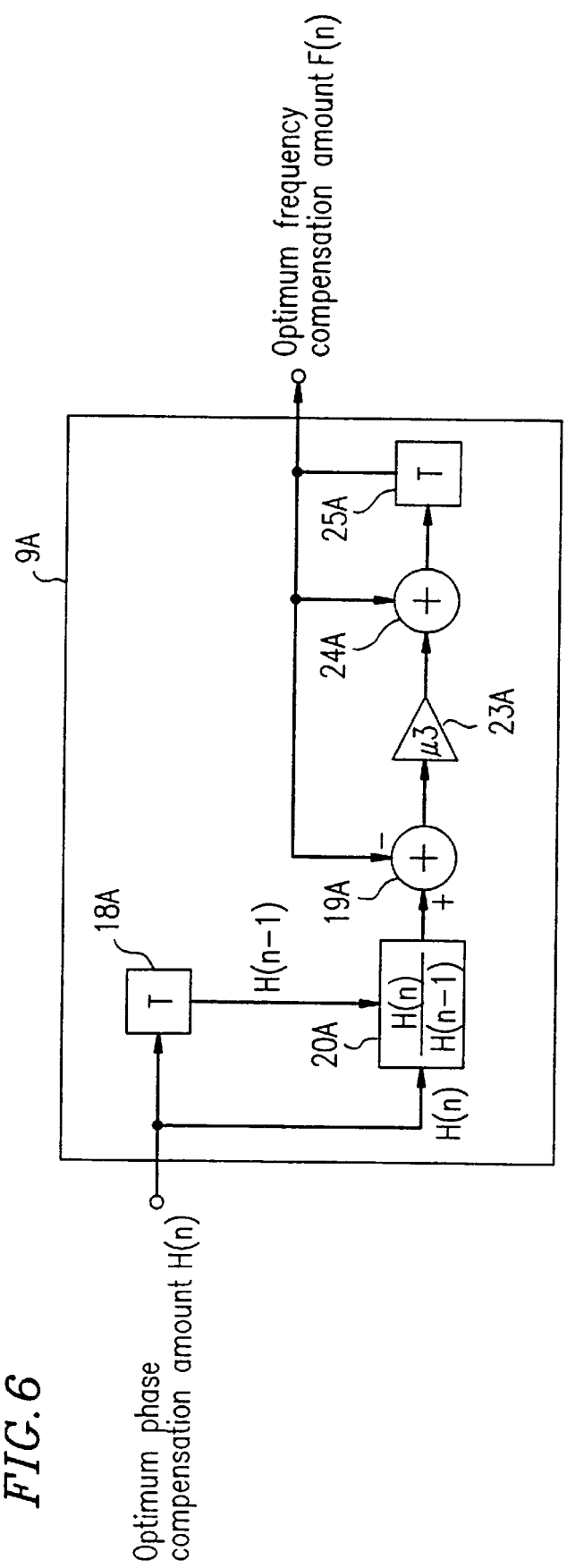
FIG. 6 is a block diagram of a phase shift estimation circuit of a demodulation apparatus in a third example according to the present invention.

FIG. 6 is a block diagram of a phase shift estimation circuit 9A adopting the above-described basic principle in the third example. The configuration of the optimum phase estimation circuit 8 in the third example is identical with the configuration shown in FIG. 2 and the configuration in which the phase error detection circuit 12 in FIG. 2 is replaced with the phase error detection circuit 12A in FIG. 4.

The phase shift estimation circuit 9A includes a delay circuit 18A, a complex subtractor 19A, a complex divider 20A, a weighting circuit 23A, a complex adder 24A, and a delay circuit 25A. The phase shift estimation circuit 9A is different from the phase shift estimation circuit 9 shown in FIG. 3 in including the complex divider 20A in place of the complex multipliers 20 and 22 and the complex conjugate circuit 21.

The complex divider 20A receives the optimum phase compensation amount H(n) and also receives the optimum phase compensation amount H(n+1) used for the previous processing via the delay circuit 18A, performs complex division of the optimum phase compensation amount H(n) by the optimum phase compensation amount H(n-1), and outputs the resultant value to the complex subtractor 19A. The delay circuit 25A outputs the optimum frequency compensation amount F(n) estimated by the previous processing to the complex subtracter 19A. The complex subtractor 19A receives the output from the complex divider 20A and the optimum frequency compensation amount F(n) from the delay circuit 25A, performs complex subtraction of the optimum frequency compensation amount F(n) from the output obtained by the complex divider 20A, and generates and outputs a frequency correction direction signal. The frequency correction direction signal corresponds a part of the first term of the left side of expression (17), i.e., [{(H(n)/H(n-1)}-F(n)].

The weighting circuit 23A performs weighting corresponding to the step parameter $\mu_3$, with respect to the frequency correction direction signal. The resultant value is output to the complex adder 24A. The complex adder 24A performs complex addition of the value from the weighting circuit 23A and the optimum frequency compensation amount F(n) from the delay circuit 25A, and outputs the optimum frequency compensation amount F(n+1) to the delay circuit 25A. The optimum frequency compensation amount F(n+1) is output from the delay circuit 25A at the next processing, i.e., at time (n+1) when the optimum phase compensation amount H(n+1) is input from the optimum phase estimation circuit 8 and the optimum frequency compensation amount F(n+2).

As described above, the phase shift estimation circuit 9A in the third example can estimate the optimum frequency compensation amount F(n+1) as in the phase shift estimation circuit 9 shown in FIG. 3 and also simplifies and reduces the size of the entire circuit system by providing the complex divider 20A in place of the complex multipliers 20 and 22 and the complex conjugate circuit 21.

EXAMPLE 4

Figure 7:
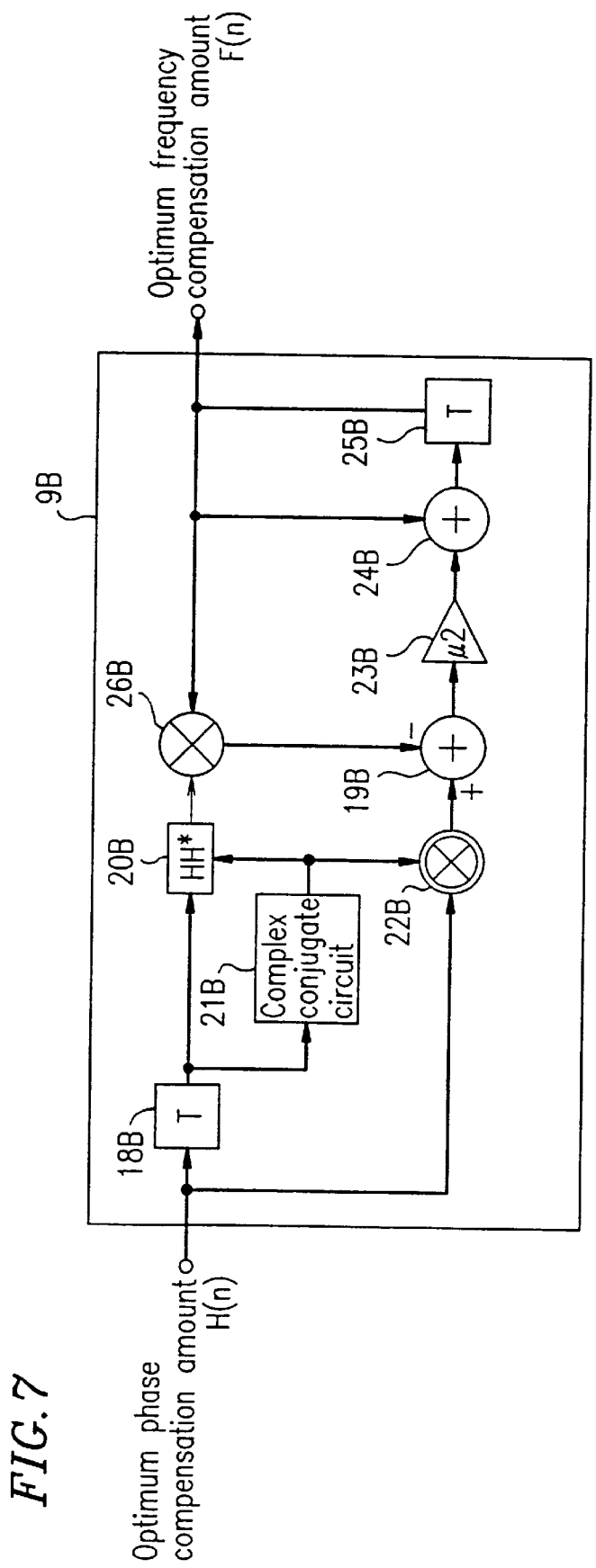
FIG. 7 is a block diagram of a phase shift estimation circuit of a demodulation apparatus in a fourth example according to the present invention.

FIG. 7 is a block diagram of a phase shift estimation circuit 9B in a fourth example according to the present invention. The phase shift estimation circuit 9B is provided in place of the phase shift estimation circuit 9 shown in FIG. 3 or the phase shift estimation circuit 9A shown in FIG. 6. The configuration of the optimum phase estimation circuit 8 in the fourth example is identical with the configuration shown in FIG. 2 and the configuration in which the phase error detection circuit 12 in FIG. 2 is replaced with the phase error detection circuit 12A in FIG. 4.

The phase shift estimation circuit 9B includes a delay circuit 18B, a complex subtractor 19B, an absolute value square circuit 20B, a complex conjugate circuit 21B, a complex multiplier 22B, a weighting circuit 23B, a complex adder 24B, a delay circuit 25B, and another weighting circuit 26B. The phase shift estimation circuit 9B is different from the phase shift estimation circuit 9 shown in FIG. 3 in including the absolute value square circuit 20B and the weighting circuit 26B in place of the complex multiplier 20.

In such a configuration, the delay circuit 18B received the optimum phase compensation amount H(n-1) at the previous processing and outputs the optimum phase compensation amount H(n-1) to the absolute value square circuit 20B and the complex conjugate circuit 21B at the present processing. The complex conjugate circuit 21B outputs H*(n-1) which acts as a complex conjugate with respect to the optimum phase compensation amount H(n-1) to the absolute value square circuit 20B and the complex multiplier 22B. The absolute value square circuit 20B obtains a square of the magnitude of the optimum phase compensation amount based on the optimum phase compensation amount H(n-1) and H*(n-1), and outputs the scalar $|H(n-1)|^2$ to the weighting circuit 26B. The delay circuit 25B outputs the optimum frequency compensation amount F(n) estimated by the previous processing to the weighting circuit 26B and the complex adder 24B. The weighting circuit 26B performs weighting of the optimum frequency compensation amount F(n) based on the scalar $|H(n-1)|^2$ from the absolute value square circuit 20B, and outputs the resultant value to the complex subtractor 19B.

The complex multiplier 22B performs complex multiplication of the optimum phase compensation amount H(n) and H*(n-1) from the complex conjugate circuit 21B, and outputs the resultant value to the complex subtractor 19B. The complex subtractor 19B performs complex subtraction of the value obtained by the weighting circuit 26B from the value obtained by the complex multiplier 22B, and thus generates and outputs a frequency correction direction signal. The frequency correction direction signal corresponds to a part of the first term of the left side of expression (14), i.e., [H(n)-F(n)H(n-1)]H*(n-1).

The weighting circuit 23B performs weighting corresponding to the step parameter $\mu_2$ with respect to the frequency correction direction signal, and outputs the resultant value to the complex adder 24B. The complex adder 24B performs complex addition of the value from the weighting circuit 23B and the optimum frequency compensation amount F(n) from the delay circuit 25B, and outputs the optimum frequency compensation amount F(n+1) represented by expression (14) to the delay circuit 25B. The optimum frequency compensation amount F(n+1) is output from the delay circuit 25B at the next processing, i.e., time (n+1) when the optimum phase compensation amount H(n+1) is input from the optimum phase estimation circuit 8 and the optimum frequency compensation amount F(n+2) is estimated.

As described above, the phase shift estimation circuit 9B in the fourth example can estimate the optimum frequency compensation amount F(n+1) as in the phase shift estimation circuit 9 shown in FIG. 3, and also simplifies and reduces the size of the entire circuit system by providing the absolute value square circuit 20B and the weighting circuit 26B in place of the complex multiplier 20. Moreover, since the processing performed by the complex multiplier 22B and the absolute value square circuit 20B and the processing performed by the weighting circuit 26B are conducted in parallel, signal processing can be performed at higher speed. Since one complex multiplier includes two adders and four multipliers, elimination of even one complex multiplier significantly contributes to the size reduction of the entire circuit system.

EXAMPLE 5

A basic principle of a demodulation method and apparatus in a fifth example according to the present invention will be described.

In the fifth example, expression (14) is modified as described below to obtain expression (18). The processing is performed based on expression (18). Since expression (14) is used for the phase shift estimation circuit 9 shown in FIG. 3, expression (18) is used for obtaining the optimum frequency compensation amount F(n) in a similar manner.

First, expression (15) obtained by developing the first term of the left side of expression (14) is the following.

$$\mu_2[H(n)H^*(n-1)-F(n)|H(n-1)|^2]+F(n)=F(n+1) \quad (15)$$

In order to control the phase of a signal modulated by an M-ary PSK (phase shift keying) system, it can be considered that $|H(n-1)|^2 \approx 1$.

By substituting 1 to $|H(n-1)|^2$ in expression (15), expression (18) is obtained.

$$\mu_2[H(n)H^*(n-1)-F(n)]+F(n)=F(n+1) \quad (18)$$

Figure 8:
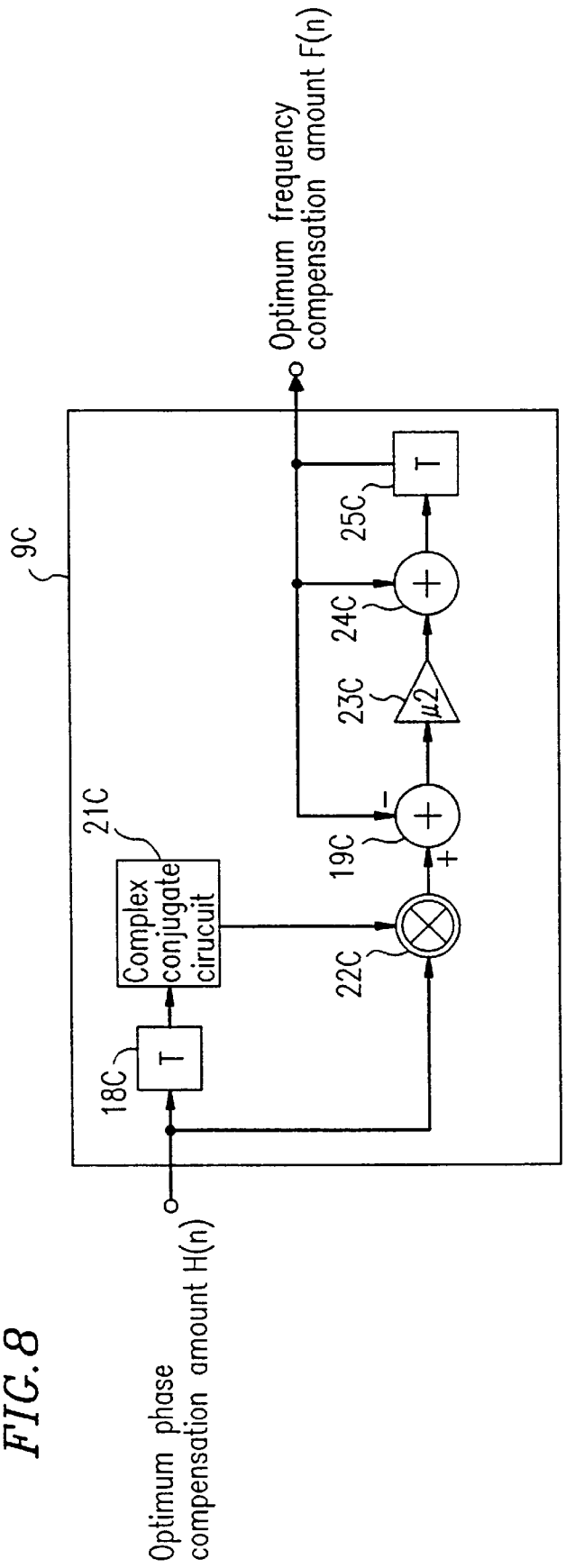
FIG. 8 is a block diagram of a phase shift estimation circuit of a demodulation apparatus in a fifth example according the present invention.

FIG. 8 is a block diagram of a phase shift estimation circuit 9C adopting the above-described basic principle in the fifth example. The configuration of the optimum phase estimation circuit 8 in the fifth example is identical with the configurations shown in FIG. 2 and the configuration in which the phase error detection circuit 12 in FIG. 2 is replaced with the phase error detection circuit 12A in FIG. 4.

The phase shift estimation circuit 9C includes a delay circuit 18C, a complex subtractor 19C, a complex conjugate circuit 21C, a complex multiplier 22C, a weighting circuit 23C, a complex adder 24C, and a delay circuit 25C. The phase shift estimation circuit 9C is different from the phase shift estimation circuit 9 shown in FIG. 3 in excluding the complex multiplier 20.

In such a configuration, the delay circuit 18C received the optimum phase compensation amount H(n−1) at the previous processing and outputs the optimum phase compensation amount H(n−1) to the complex conjugate circuit 21C at the present processing. The complex conjugate circuit 21C outputs H*(n−1) which acts as a complex conjugate with respect to the optimum phase compensation amount H(n−1) to the complex multiplier 22C. The complex multiplier 22C performs complex multiplication of the optimum phase compensation amount H(n) and H*(n−1) from the complex conjugate circuit 21C, and outputs the resultant value to the complex subtractor 19C. The delay circuit 25C outputs the optimum frequency compensation amount F(n) estimated by the previous processing to the complex subtractor 19C and the complex adder 24C. The complex adder 19C performs complex subtraction of the optimum frequency compensation amount F(n) obtained by the delay circuit 25C from the value obtained by the complex multiplier 22C, and thus generates and outputs a frequency correction direction signal. The frequency correction direction signal corresponds to a part of the first term of the left side of expression (18), i.e., [H(n)H*(n−1)−F(n)].

The weighting circuit 23C performs weighting corresponding to the step parameter $\mu_2$ with respect to the frequency correction direction signal, and outputs the resultant value to the complex adder 24C. The complex adder 24C performs complex addition of the value from the weighting circuit 23C and the optimum frequency compensation amount F(n) from the delay circuit 25C, and outputs the optimum frequency compensation amount F(n+1) represented by expression (18) to the delay circuit 25C. The optimum frequency compensation amount F(n+1) is output from the delay circuit 25C at the next processing, i.e., time (n+1) when the optimum phase compensation amount H(n+1) is input from the optimum phase estimation circuit 8 and the optimum frequency compensation amount F(n+2) is estimated.

As described above, the phase shift estimation circuit 9C in the fifth example, when used for a signal modulated by the M-ary PSK system, can estimate the optimum frequency compensation amount F(n+1) as in the phase shift estimation circuit 9 shown in FIG. 3, and also simplifies and reduces the size of the entire circuit system by eliminating the complex multiplier 20.

EXAMPLE 6

A basic principle of a demodulation method and apparatus in a sixth example according to the present invention will be described.

In the sixth example, expression (10) is modified as described below to obtain expression (20). The processing is performed based on expression (20). Since expression (10) is used for the phase shift estimation circuit 9 shown in FIG. 3, expression (20) is used for obtaining the optimum frequency compensation amount F(n) in a similar manner.

First, expression (13) which defines the estimated error Ef(n) is the following.

$$Ef(n)=H(n)-F(n)H(n-1) \quad (13)$$

Expression (13) defines the estimated error Ef(n) at time n as change in the optimum phase compensation amount H(n) and the optimum phase compensation amount H(n−1). In the sixth example, the estimated error Ef(n) is defined as change in the optimum phase compensation amount H(n+1) and the optimum phase compensation amount H(n). Accordingly, expression (13) is replaced by expression (19).

$$Ef(n)=H(n+1)-F(n)H(n) \quad (19)$$

By modifying expression (10) using expression (19), expression (20) is obtained.

$$\mu_2[H(n+1)-F(n)H(n)]H^*(n)+F(n)=F(n+1) \quad (20)$$

Figure 9:
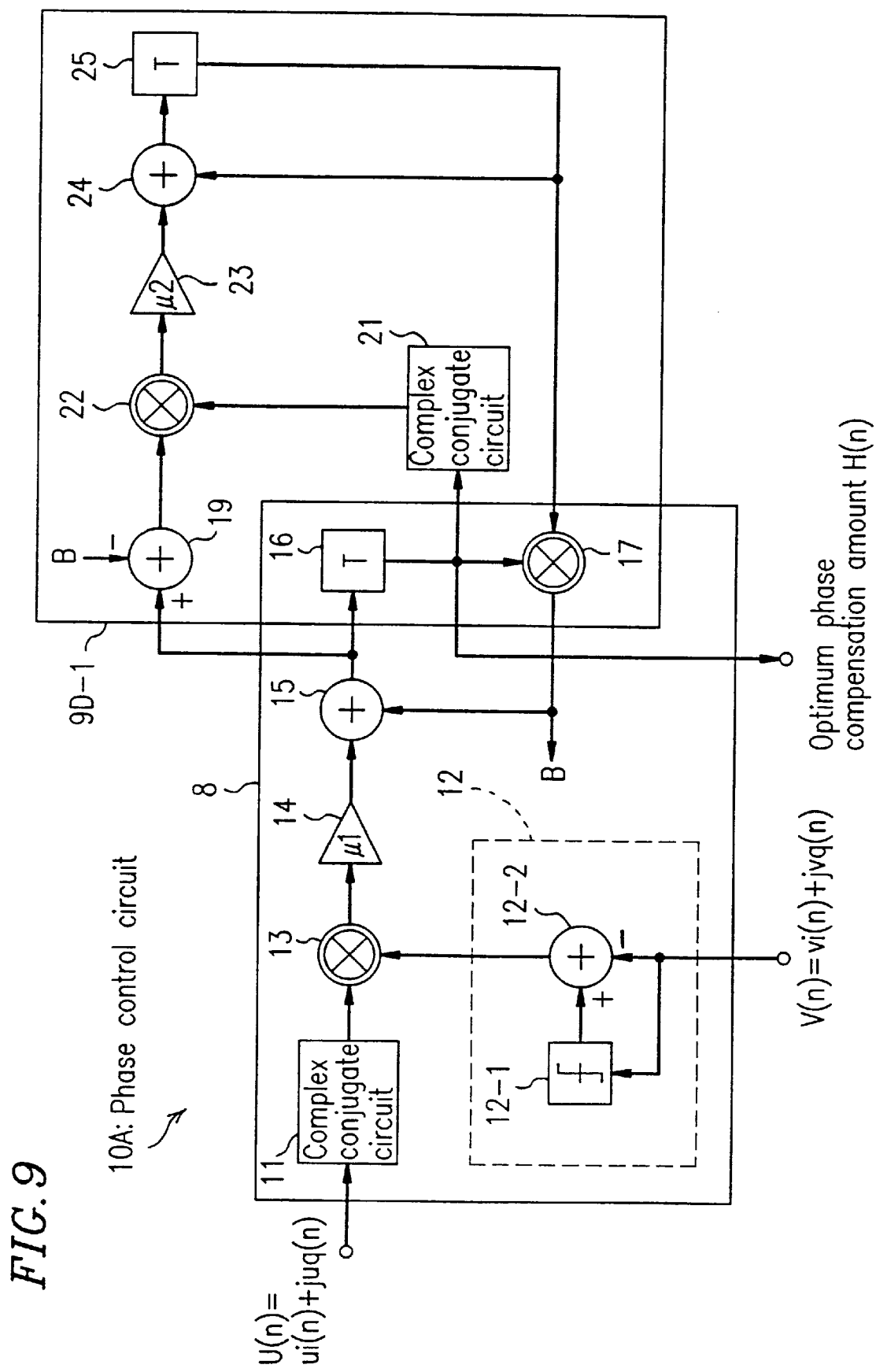
FIG. 9 is a block diagram of a phase control circuit of a demodulation apparatus including a phase shift estimation circuit and an optimum phase estimation circuit in a sixth example according to the present invention.

FIG. 9 is a block diagram of a phase control circuit 10A which includes a phase shift estimation circuit 9D-1 adopting the above-described basic principle in the sixth example. The phase shift estimation circuit 9D-1 is combined with the optimum phase estimation circuit 8 in the phase control circuit 10A. In the phase shift estimation circuit 9D-1, the delay circuit 18 and the complex multiplier 20 in the phase shift estimation circuit 9 are eliminated. The operation of the optimum phase estimation circuit 8 in the sixth example is identical with the configurations shown in FIG. 2 and the configuration in which the phase error detection circuit 12 in FIG. 2 is replaced with the phase error detection circuit 12A in FIG. 4. The optimum phase compensation amount H(n) is estimated based on expression (9).

In FIG. 9, elements having the same functions as those in FIGS. 2 and 3 bear identical reference numerals therewith.

In such a configuration, the weighting circuit 14 performs weighting corresponding to the step parameter $\mu_1$ with respect to a phase correction direction signal, and outputs the resultant value to the complex adder 15. The delay circuit 25 outputs the optimum frequency compensation amount F(n) estimated by the previous processing to the complex multiplier 17. The delay circuit 16 outputs the optimum phase compensation amount H(n) estimated by the previous processing to the complex multiplier 17. The complex multiplier 17 performs complex multiplication of the optimum frequency compensation amount F(n) from the delay circuit 25 and the optimum phase compensation amount H(n) from the delay circuit 16, and outputs F(n)H(n) to the complex adder 15. The complex adder 15 performs complex addition of the value from the weighting circuit 14 and the value from the complex multiplier 17, and outputs the optimum phase compensation amount H(n+1) represented by expression (9) to the delay circuit 16 and the complex subtractor 19. The optimum phase compensation amount H(n+1) is output from the delay circuit 16 at the next processing.

The complex subtractor 19 performs complex subtraction of the value F(n)H(n) obtained by the complex multiplier 17 from the optimum phase compensation amount H(n+1) obtained by the complex adder 15, and outputs the resultant value to the complex multiplier 22. The complex conjugate circuit 21 outputs H*(n) which acts as a complex conjugate with respect to the optimum phase compensation amount H(n) to the complex multiplier 22. The complex multiplier 22 performs complex multiplication of the value from the complex subtractor 19 and H*(n) from the complex conjugate circuit 21, and thus generates and outputs a frequency correction direction signal which indicates a frequency correction direction. The frequency correction direction signal corresponds to a part of the first term of the left side of expression (20), i.e., [H(n+1)–F(n)H(n)]H*(n).

The weighting circuit 23 outputs the resultant value to the complex adder 24. The complex adder 24 performs complex addition of the value from the weighting circuit 23 and the optimum frequency compensation amount F(n) from the delay circuit 25, and outputs the optimum frequency compensation amount F(n+1) represented by expression (20). The optimum frequency compensation amount F(n+1) is output from the delay circuit 25 at the next processing.

As described above, the phase shift estimation circuit 9D-1 in the sixth example, which estimates one delay circuit and one complex multiplier from the circuit shown in FIG. 3, simplifies and reduces the size of the entire circuit system. Since the optimum frequency compensation amount F(n+1) is estimated based on expression (20), only H(n+1), F(n) and H(n) are required. Since H(n–1) is not required as opposed to the case of expression (14), the delay circuit 18 can be eliminated. Thus, the pull-in time is shortened and accurate phase correction is realized.

Figure 10:
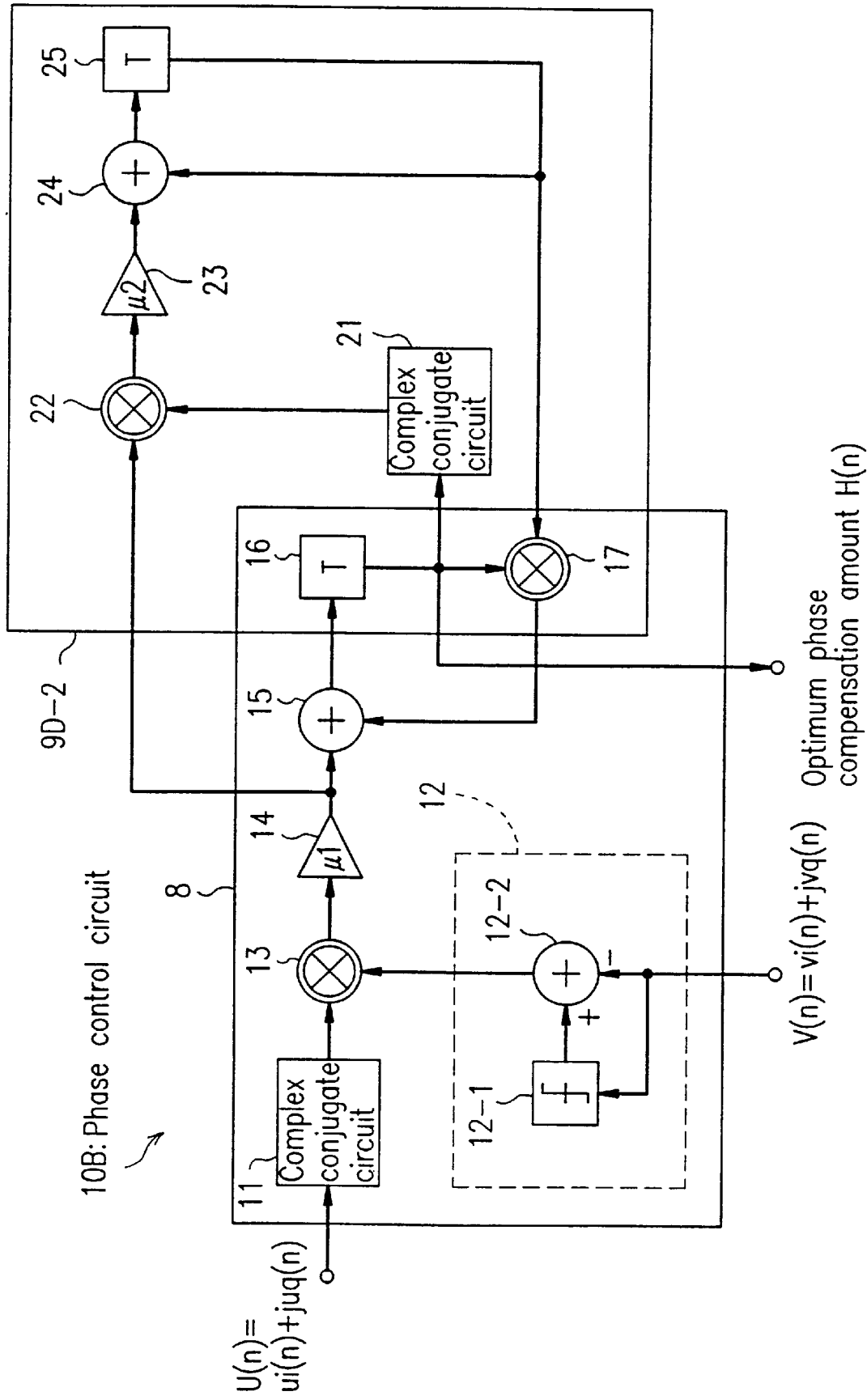
FIG. 10 is a block diagram showing a modification of the phase shift estimation circuit and optimum phase estimation circuit shown in FIG. 9.

FIG. 10 is a block diagram of a phase control circuit 10B, which is obtained by modifying the phase shift estimation circuit 9D-2 and the optimum phase estimation circuit 8.

In the phase control circuit 10B, the complex subtractor 19 is eliminated, and the value obtained by the weighting circuit 19 is directly input to the complex multiplier 22. The value output by the complex subtractor 19 in FIG. 9 is obtained by subtracting the value output by the complex multiplier 17 from the sum of the values output by the complex multiplier 17 and the weighting circuit 14. Accordingly, the value output by the complex subtractor 19 in FIG. 9 equals to the value output by the weighting circuit 14. Thus, the value sent by the weighting circuit 14 can be directly input to the complex multiplier 22.

EXAMPLE 7

A basic principle of a demodulation method and apparatus in a seventh example according to the present invention will be described.

In the first through sixth examples, the optimum phase compensation amount H(n) and the optimum frequency compensation amount F(n) are estimated in accordance with the LMS algorithm. In the seventh example, the optimum phase compensation amount H(n) and the optimum frequency compensation amount F(n) are estimated in accordance with an RLS (recursive least squares) algorithm.

According to the RLS algorithm, where the auto-correlation function of the tentative complex demodulated signal U(n) at time n is $\Phi(n)$ (scalar) and the cross-correlation function of the tentative complex demodulated signal U(n) and the identification signal D(n) at time n is $\Theta(n)$ (complex scalar), expressions (21) and (22) are valid.

$$\Phi(n) = \lambda_1 \Phi(n-1) + U(n)U^*(n) \quad (21)$$

$$= \lambda_1 \Phi(n-1) + |U(n)|^2$$

$$\Theta(n) = F(n)[\lambda_1 \Theta(n-1) + D(n)U^*(n)] \quad (22)$$

In expressions (21) and (22), $\lambda_1$ represents a real number and a weighting coefficient of the optimum phase compensation amount H(n).

In this case, the optimum phase compensation amount H(n) is represented by expression (23).

$$H(n+1) = \Theta(n)/\Phi(n) \quad (23)$$

$$= \{F(n)[\lambda_1 \Theta(n-1) + D(n)U^*(n)]\}/\{\lambda_1 \Phi(n-1) + |U(n)|^2\}$$

In the seventh example, the optimum phase compensation amount H(n) is estimated based on expression (23).

Where the auto-correlation function of the optimum phase compensation amount H(n) at time n is $\Phi_f(n)$ and the auto-correlation function between two adjacent symbols is $\Theta_f(n)$, expressions (24) and (25) are valid.

$$\Phi_f(n) = \lambda_2 \Phi_f(n-1) + H(n-1)H^*(n-1) \quad (24)$$

$$= \lambda_2 \Phi_f(n-1) + |H(n-1)|^2$$

$$\Theta_f(n) = \lambda_2 \Theta_f(n-1) + H(n-1)H^*(n-1) \quad (25)$$

In expressions (24) and (25), $\lambda_2$ represents a real number and a weighting coefficient of the optimum frequency compensation amount F(n).

In this case, the optimum frequency compensation amount F(n) is represented by expression (26) as a value obtained by normalizing a change of H(n) between two adjacent symbols, i.e., $\theta_f(n)$ by the amount $\Phi_f(n)$ thereof.

$$F(n+1) = \Theta_f(n)/\Phi_f(n) \quad (26)$$

$$= \{\lambda_2 \Theta_f(n-1) + H(n)H^*(n-1)\}/\lambda_2 \Phi_f(n-1) + |H(n-1)|^2$$

In the seventh example, the optimum frequency compensation amount F(n) is estimated based on expression (26).

By advancing the time for the optimum phase compensation amount H(n) by one symbol cycle T, expression (27) is obtained.

$$F(n+1) = \Theta_f(n)/\Phi_f(n) \quad (27)$$

$$= \{\lambda_2 \Theta_f(n-1) + H(n+1)H^*(n)\}/\lambda_2 \Phi_f(n-1) + |H(n)|^2$$

Figure 11:
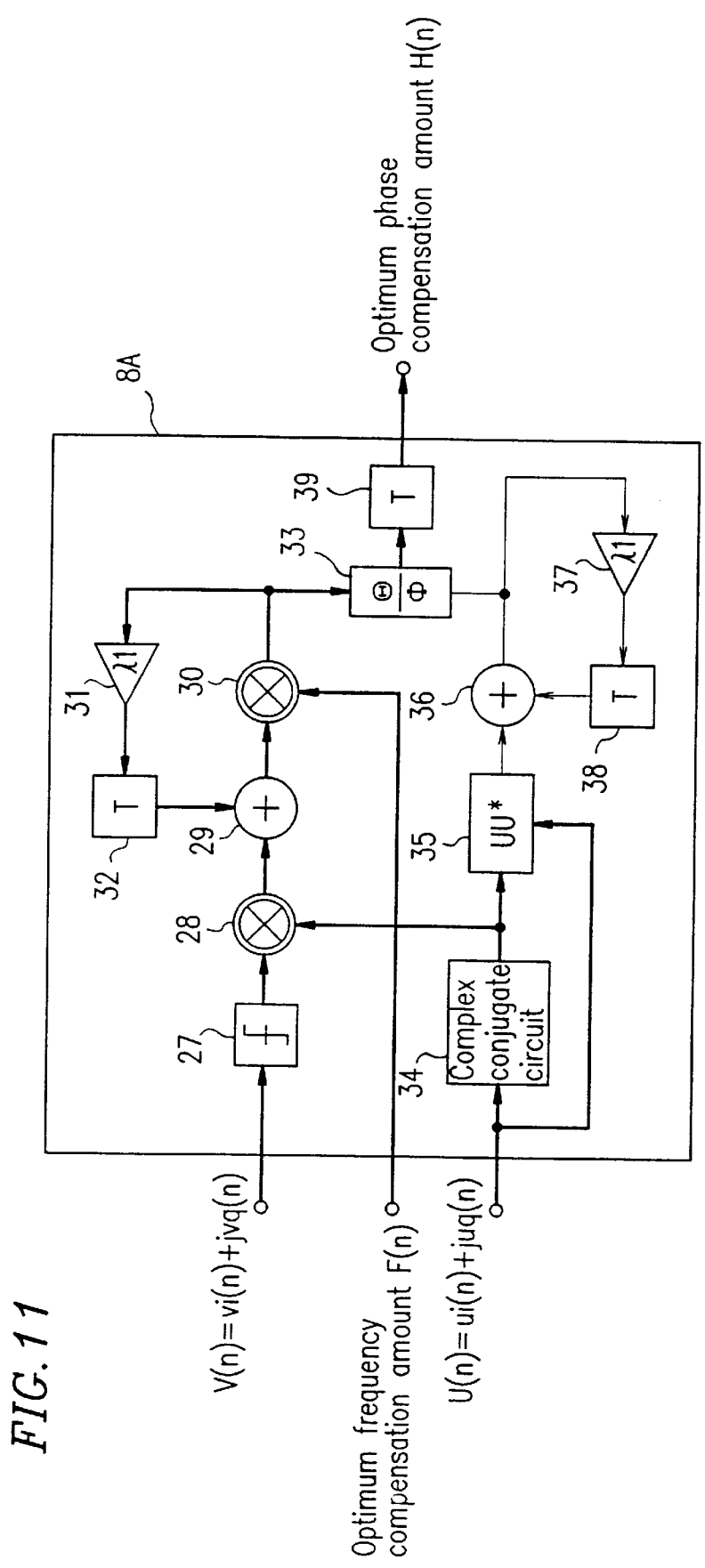
FIG. 11 is a block diagram of an optimum phase estimation circuit of a demodulation apparatus in a seventh example according to the present invention.
Figure 12:
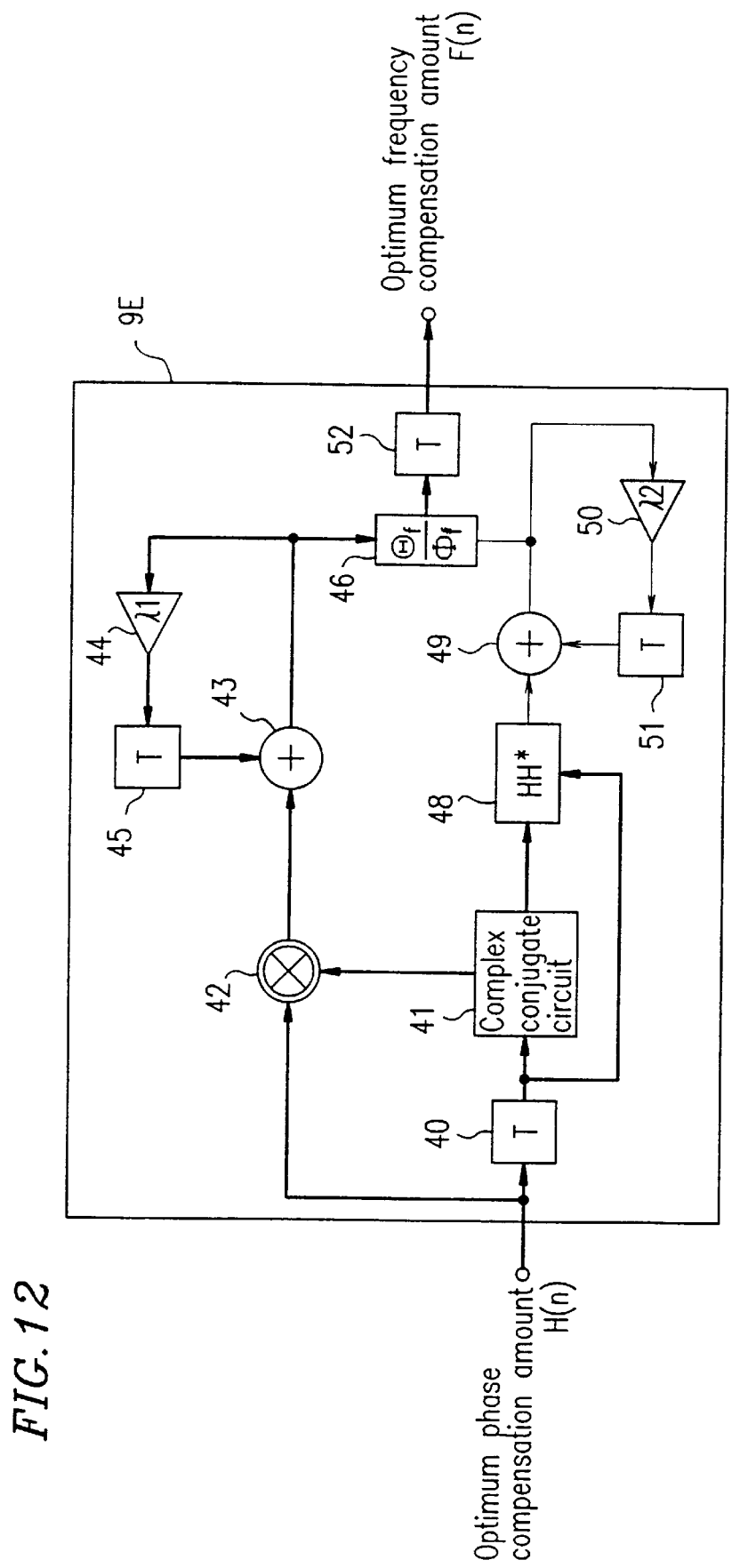
FIG. 12 is a block diagram of a phase shift estimation circuit of the demodulation apparatus in the seventh example according to the present invention.

FIG. 11 is a block diagram of an optimum phase estimation circuit 8A for estimating the optimum phase compensation amount H(n) based on expression (23), and FIG. 12 is a block diagram of a phase shift estimation circuit 9E for estimating the optimum frequency compensation amount F(n) based on expression (26).

As shown in FIG. 11, the optimum phase estimation circuit 8A includes an identifier 27, a complex multiplier 28, a complex adder 29, another complex multiplier 30, a weighting circuit 31, a delay circuit 32, a divider 33, a complex conjugate circuit 34, an absolute value square circuit 35, an adder 36, another weighting circuit 37, another delay circuit 38, and still another delay circuit 39.

In the optimum phase estimation circuit 8A, the identifier 27 receives a determined complex demodulated signal V(n), identifies a symbol closest to the determined complex demodulated signal V(n) among the 64 symbols, and outputs an identification signal D(n) representing the identified symbol. The complex conjugate circuit 34 receives a tentative complex demodulated signal U(n) and outputs a conjugate complex demodulated signal U*(n). The complex multiplier 28 performs complex multiplication of the identification signal D(n) and the conjugate complex demodulated signal U*(n) and outputs the resultant value to the complex adder 29. The delay circuit 32 outputs $\lambda_1\Theta(n-1)$ obtained by the previous processing to the complex adder 29. The complex adder 29 performs complex addition of the value from the complex multiplier 28 and the value from the delay circuit 32, and outputs the resultant value to the complex multiplier 30. The complex multiplier 30 performs complex multiplication of the value from the complex adder 29 and the optimum frequency compensation amount F(n) from the phase shift estimation circuit 9E, and outputs the resultant value, i.e., $\Theta(n)$ to the weighting circuit 31 and the divider 33. The weighting circuit 31 performs weighting corresponding to the weighting factor $\lambda_1$, with respect to $\Theta(n)$, and outputs the resultant value to the delay circuit 32. The delay circuit 32 outputs $\lambda_1\Theta(n)$ to the complex adder 29 at the next processing.

The absolute value square circuit 35 receives the tentative complex demodulated signal U(n) and the conjugate complex demodulated signal U*(n) from the complex conjugate circuit 34, calculates a square of the magnitude of U(n), and outputs the resultant value, i.e., the auto-correlation function to the adder 36. The delay circuit 38 outputs $\lambda_1\Phi(n-1)$ obtained by the previous processing to the adder 36. The adder 36 adds the value from the absolute value square circuit 35 and the value from the delay circuit 36, and outputs the resultant value, i.e., $\Phi(n)$ to the weighting circuit 37 and the divider 33. The weighting circuit 37 performs weighting corresponding to the weighting factor $\lambda_1$ with respect to $\Phi(n)$, and outputs the resultant value to the delay circuit 38. The delay circuit 38 outputs $\lambda_1\Phi(n)$ to the adder 36.

The divider 33 divides the complex scalar $\Theta(n)$ by the scalar $\Phi(n)$, and outputs the optimum phase compensation amount H(n+1) represented by expression (23) to the delay circuit 39. The optimum phase compensation amount H(n+1) is output from the delay circuit 39 at the next processing, i.e., time (n+1) when the tentative complex demodulated signal U(n+1) is input and the optimum phase compensation amount H(n+2) is estimated.

As shown in FIG. 12, the phase shift estimation circuit 9E includes a delay circuit 40, a complex conjugate circuit 41, a complex multiplier 42, a complex adder 43, a weighting circuit 44, another delay circuit 45, a divider 46, an absolute value square circuit 48, an adder 49, another weighting circuit 50, another delay circuit 51, and still another delay circuit 52.

In the phase shift estimation circuit 9E, the delay circuit 40 outputs the optimum phase compensation amount H(n-1) received at the previous processing to the complex conjugate circuit 41. The complex conjugate circuit 41 receives the optimum phase compensation amount H(n-1) and outputs an complex optimum phase compensation amount H*(n-1). The complex multiplier 42 performs complex multiplication of the optimum phase compensation amount H(n) and the complex optimum phase compensation amount H*(n-1), and outputs the auto-correlation value between two adjacent symbols of the optimum phase compensation amount H(n) to the complex adder 43. The delay circuit 45 outputs $\lambda_2\Theta_f(n-1)$ obtained by the previous processing to the complex adder 43.

The complex adder 43 performs complex addition of the value from the complex multiplier 42 and the value from the delay circuit 45, and outputs the resultant value, i.e., $\Theta_f(n)$ to the weighting circuit 44 and the divider 46. The weighting circuit 44 performs weighting corresponding to the weighting factor $\lambda_2$ with respect to $\Theta_f(n)$, and outputs the resultant value to the delay circuit 45. The delay circuit 45 outputs $\lambda_2\Theta_f(n)$ to the complex adder 43 at the next processing.

The absolute value square circuit 48 receives the optimum phase compensation amount H(n-1) from the delay circuit 40 and H*(n-1) from the complex conjugate circuit 41, calculates a square of the magnitude of H(n-1), and outputs the resultant value, i.e., the auto-correlation function to the adder 49. The delay circuit 51 outputs $\lambda_2\Phi_f(n-1)$ obtained by the previous processing to the adder 49. The adder 49 adds the value from the delay circuit 51 and the value from the absolute value square circuit 48, and outputs the resultant value, i.e., $\Phi_f(n)$ to the weighting circuit 50 and the divider 46. The weighting circuit 50 performs weighting corresponding to the weighting factor $\lambda_2$ with respect to $\Phi_f(n)$, and outputs the resultant value to the delay circuit 45. The delay circuit 51 outputs $\lambda_2\Phi_f(n)$ to the adder 49.

The divider 46 divides the complex scalar $\Theta_f(n)$ by the scalar $\Phi_f(n)$, and outputs the optimum frequency compensation amount F(n+1) represented by expression (26) to the delay circuit 52. The optimum frequency compensation amount F(n+1) is output from the delay circuit 52 at the next processing, i.e., time (n+1) when the optimum phase compensation amount H(n+1) is input.

As described above, in the seventh example, the optimum phase compensation amount H(n+1) and the optimum frequency complex F(n+1) are obtained in accordance with the RLS algorithm, and the optimum frequency compensation amount F(n) is obtained from a change in the optimum phase compensation amount H(n) between two adjacent symbols. Accordingly, demodulation of a signal modulated by the M-ary QAM system does not require circuits which are required in the conventional system, i.e., a circuit for normalizing a complex signal, or an orthogonal coordinate—polar coordinate conversion circuit or a polar coordinate—orthogonal coordinate conversion circuit which is formed of a ROM or the like. Thus, signal processing time is shortened and the size of the entire circuit system is reduced.

EXAMPLE 8

A basic principle of a demodulation method and apparatus in an eighth example according to the present invention will be described.

In the eighth example, the LMS algorithm is used again. Expression (9) is modified as described below to obtain expression (29). The optimum frequency compensation amount F(n) is obtained by applying expression (29) to the phase shift estimation circuit.

First, expression (9) is modified to obtain expression (29).

$$H(n+1)-F(n)H(n)=\mu_1[D(n)-H(n)U(n)]U^*(n) \qquad (28)$$

By substituting expression (28) to a part of the first term of the left side of expression (20), i.e., [H(n+1)−F(n)H(n)], expression (29) is obtained.

$$\mu_1\mu_2[D(n)-H(n)U(n)]U^*(n)H^*(n)+F(n)=F(n+1) \qquad (29)$$

In the eighth example, the optimum phase compensation amount H(n) is estimated based on expression (9), and the optimum frequency compensation amount F(n) is estimated based on expression (29).

Figure 13:
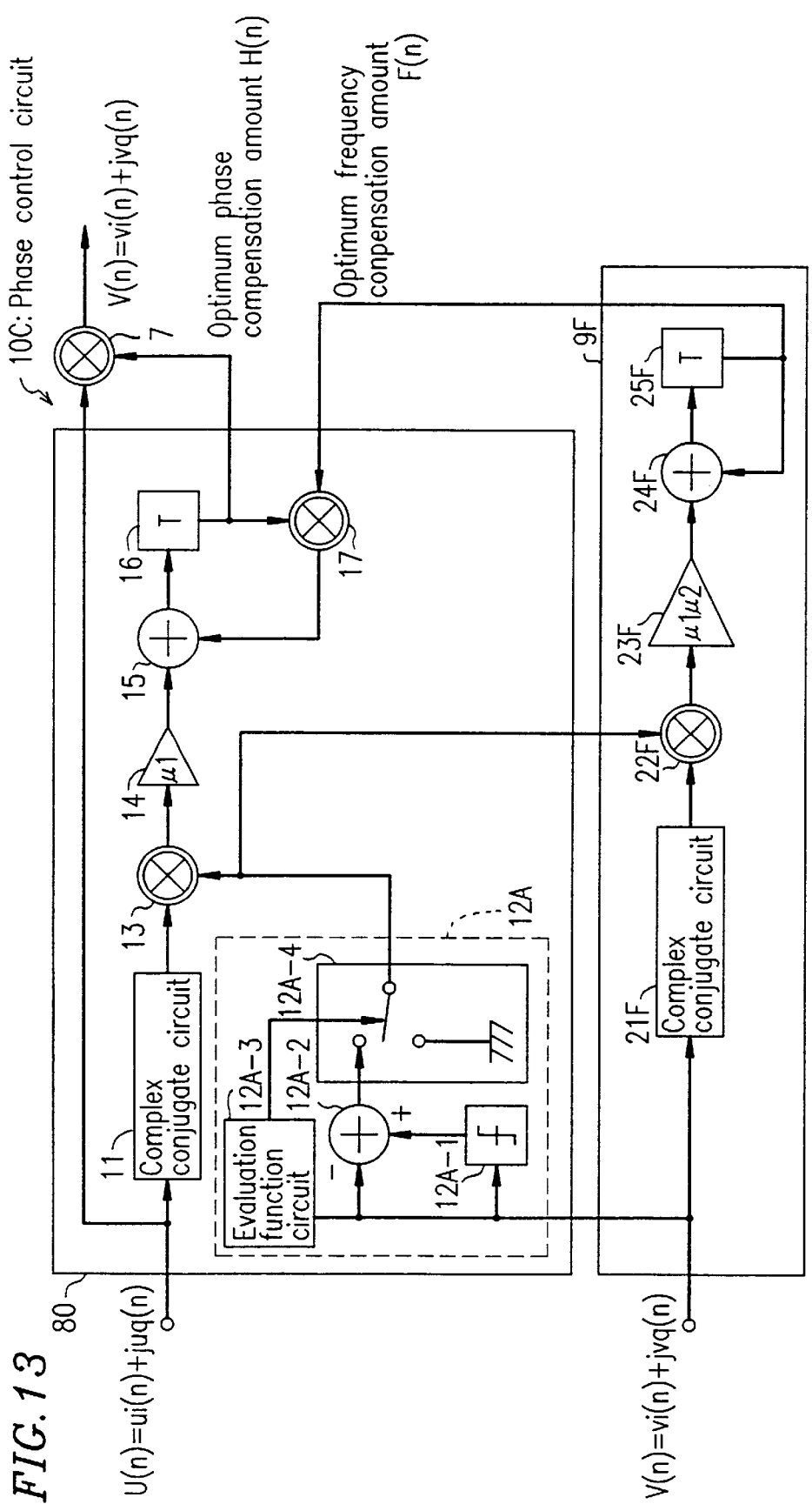
FIG. 13 is a block diagram of a phase control circuit of a demodulation apparatus in an eighth example according to the present invention.

FIG. 13 is a block diagram of a phase control circuit 10C of the demodulation apparatus in the eighth example. As shown in FIG. 13, the phase control circuit 10C includes a complex multiplier 7, an optimum phase estimation circuit 80, and a phase shift estimation circuit 9F. The complex multiplier 7 is identical with that in FIG. 1. The optimum phase estimation circuit 80 is obtained by adding the phase error detection circuit 12A shown in FIG. 4 to the optimum phase estimation circuit 8 shown in FIGS. 1 and 2, and thus the configuration and operation thereof are the same as described above.

The phase shift estimation circuit 9F includes a complex conjugate circuit 21F, a complex multiplier 22F, a weighting circuit 23F, a complex adder 24F, and a delay circuit 25F. The phase shift estimation circuit 9F receives a determined complex demodulated signal V(n) and the complex error signal output from the phase error detection circuit 12A instead of the optimum phase compensation amount H(n).

The phase shift estimation circuit 9F having the above-described configuration operates in the following manner.

The complex conjugate circuit 21F receives the determined complex demodulated signal V(n) and outputs V*(n) which acts as a complex conjugate with respect to the complex demodulated signal V(n) to the complex multiplier 22F.

The determined complex demodulated signal V(n) is also output to the phase error detection circuit 12A of the optimum phase estimation circuit 80. The identifier 12A-1 identifies a symbol closest to the determined complex demodulated signal V(n) among the 64 symbols and outputs an identification signal D(n) representing the identified symbol. The complex subtractor 12A-2 performs complex subtraction of the determined complex demodulated signal V(n) from the identification signal D(n) and outputs the resultant value as a complex error signal. The complex error signal represents a scalar indicating the distance between the identification signal D(n) and the complex demodulated signal V(n), and is input to the complex multiplier 22F via the switch 12A-4.

The complex multiplier 22F performs complex multiplication of the complex error signal from the phase error detection circuit 12A and the complex conjugate demodulated signal V*(n) from the complex conjugate circuit 21F, and thus generates and outputs a frequency correction direction signal representing the correction direction of the optimum frequency compensation amount F(n). The frequency correction direction signal corresponds to a part of the first term of the left side, i.e., [D(n)−H(n)U(n)]U*(n)H*(n).

The weighting circuit 23F performs weighting corresponding to the step parameter $\mu_1\mu_2(0<\mu_1\mu_2)$ with respect to the frequency correction direction signal, and outputs the resultant value to the complex adder 24F. The complex adder 24F performs complex addition of the value from the weighting circuit 23F and the optimum frequency compensation amount F(n) from the delay circuit 25F, and outputs the optimum frequency compensation amount F(n+1) represented by expression (29) to the delay circuit 25F. The optimum frequency compensation amount F(n+1) is output from the delay circuit 25F to the optimum phase estimation circuit 80 at the next processing, and is used to estimate the optimum phase compensation amount H(n+2).

Compared with the phase shift estimation circuit 9 shown in FIG. 1, the phase shift estimation circuit 9F in the eighth example eliminates the delay circuit 18, the complex subtractor 19 and the complex multiplier 20. Thus, the circuit configuration is simplified and the size of the entire circuit system is reduced. Moreover, the phase shift estimation circuit 9F does not use the output from the complex adder 15 or the weighting circuit 14 despite being substantially the same size as that of the phase shift estimation circuits 9D-1 and 9D-2 shown in FIGS. 9 and 10, and estimates the optimum frequency compensation amount F(n) using the complex error signal from the phase error detection circuit 12 and the determined complex demodulated signal V(n). Accordingly, the signal processing amount required for one symbol can be reduced.

EXAMPLE 9

A basic principle of a demodulation method and apparatus in a ninth example according to the present invention will be described.

Performing complex multiplication of the phase correction direction signal corresponding to a part of the first term of the left side of expression (9), i.e., [D(n)−H(n)U(n)]U*(n) and the optimum frequency compensation amount F(n) in consideration of the influence of the optimum frequency compensation amount F(n) on the phase correction direction signal results in expression (30).

$$\mu_1 F(n)[D(n)-H(n)U(n)]U^*(n)+F(n)H(n)=H(n+1) \quad (30)$$

Hereinafter, expression (30) will be considered with reference to FIGS. 1, 25A, 25B, 26A and 26B. FIGS. 25A, 25B, 26A and 26B are orthogonal coordinate systems representing the tentative complex demodulated signal U(k), the optimum phase compensation amount H(k), the optimum frequency compensation amount F(k), and the identification signal D(k) at sampling time n (=k). The phase angle of the optimum phase compensation amount H(k) with respect to axis I is $\alpha=\angle H(k)$, the phase angle of the optimum frequency compensation amount F(k) with respect to axis I is $\gamma=\angle F(k)$, and the phase angle of the tentative complex demodulated signal U(k) with respect to axis I is $\beta=\angle U(k)$.

When a tentative complex demodulated signal U(k) including no noise is input to the phase control circuit 10, vector OC representing the tentative complex demodulated signal U(k) rotates counterclockwise by phase angle $\alpha$ of the optimum phase compensation amount H(k) by the complex multiplier 7 (FIG. 25A) to be vector OB representing a determined complex demodulated signal V(k)=H(k)U(k). The determined complex demodulated signal V(k) is identified as vector OA of the symbol closest to the determined complex demodulated signal V(k). Vector OA represents the identification signal D(k). At this point, the complex error signal is represented by vector OB and corresponds to a part of the first term of the left side of expression (30), i.e., [D(n)–H(n)U(n)].

Figure 25B:
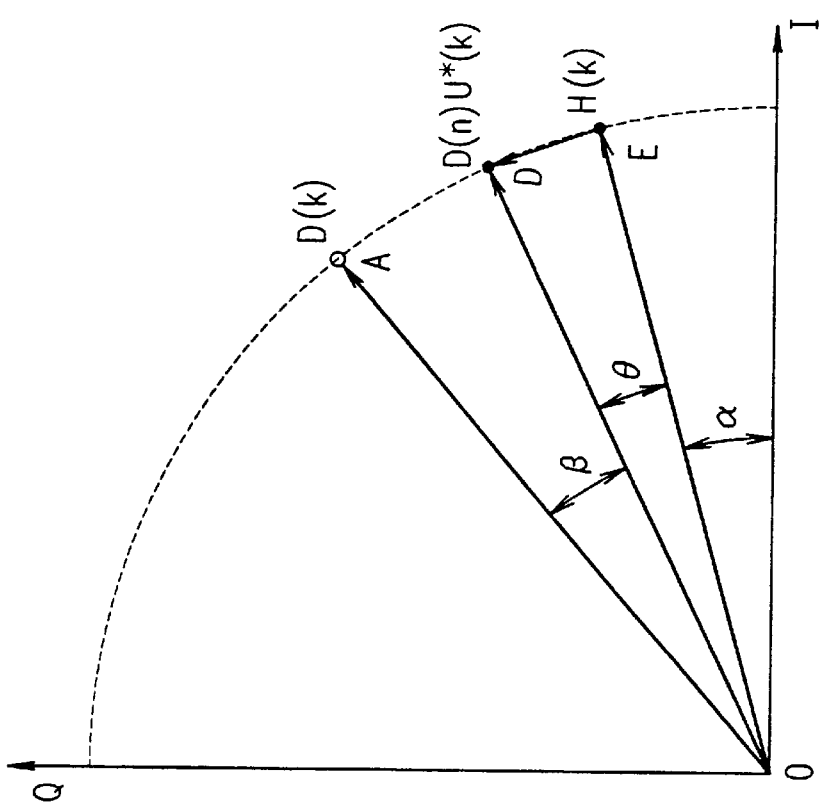
FIGS. 25A and 25B are graphs illustrating vectors regarding an example of an optimum frequency compensation amount and optimum phase compensation amount.
Figure 25A:
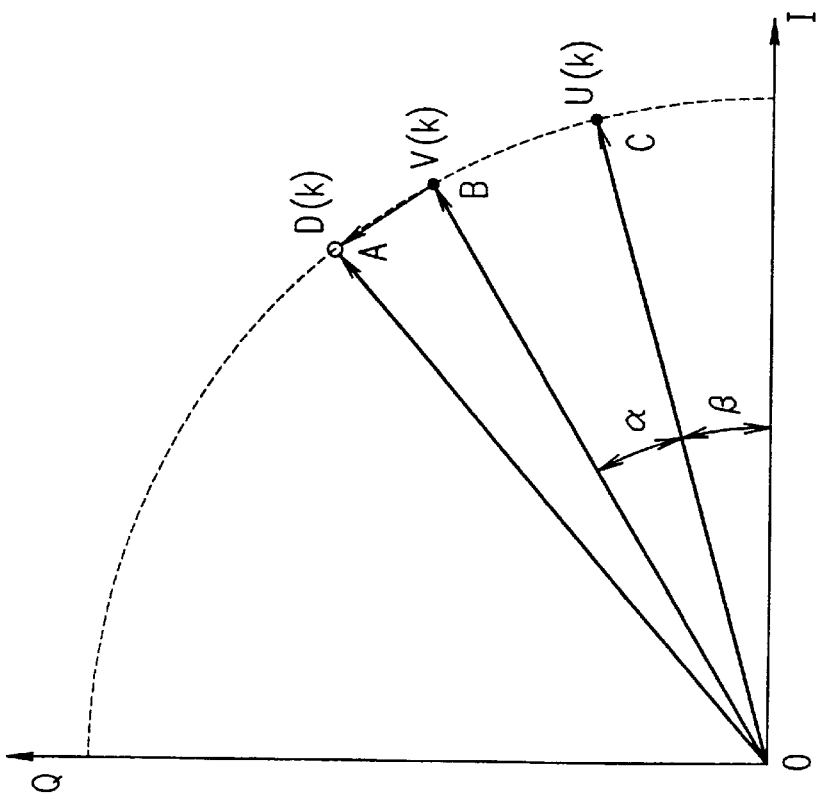

With reference to FIG. 25B, [D(n)–H(n)U(n)]U*(n) of the first term of the left side of expression (30) at the same sampling time n (=k) will be considered.

Where the magnitude of the tentative complex demodulated signal U(k) including no noise is 1, $|U(n)|^2=1$. Accordingly, [D(n)–H(n)U(n)]U*(n) can be expressed as [D(n)U*(n)–H(n)]. Since $\angle U^*(k)=-\beta$, D(k)U*(k) can be represented by vector OD resulting from clockwise rotation of vector OA by angle $\beta$. H(k) can be represented by vector OE. Accordingly, [D(k)U*(k)–H(k)] can be represented by vector ED.

Figure 26A:
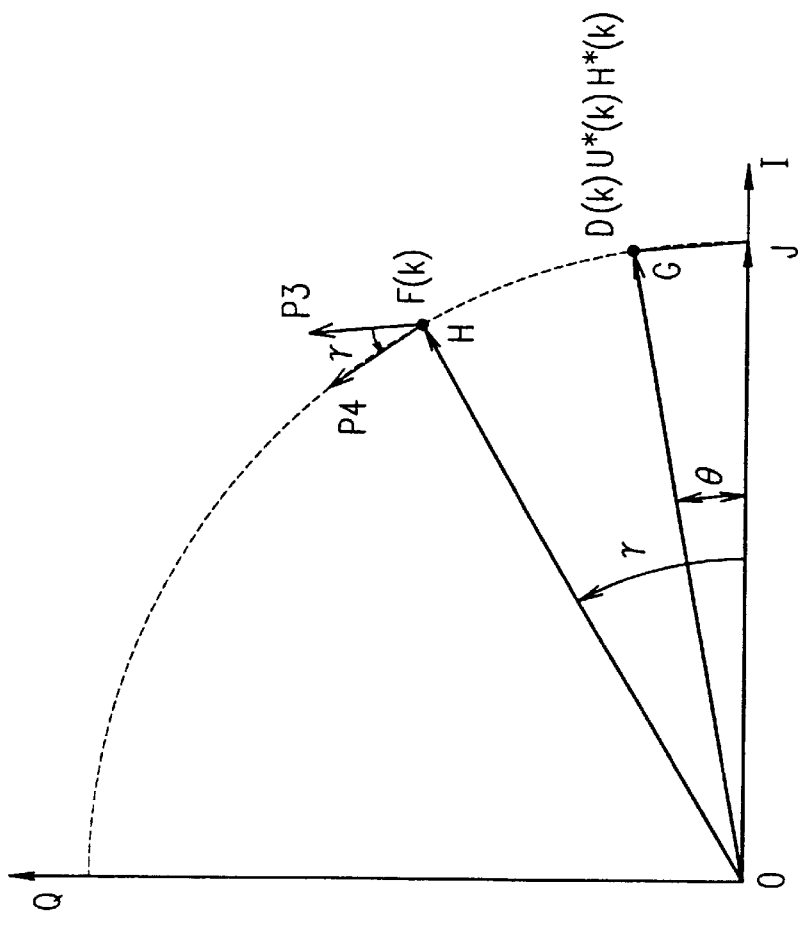
FIGS. 26A and 26B are graphs illustrating vectors regarding another example of an optimum frequency compensation amount and optimum phase compensation amount.

With reference to FIG. 26A, the optimum phase compensation amount F(n) based on expression (30) at the same sampling time n (=k) will be described.

The second term of the left side of expression (30), i.e., F(k)H(k) (n→k) can be represented by vector OF resulting from counterclockwise rotation of vector OE by angle $\gamma$, the vector OE representing H(k).

Estimation of the optimum phase compensation amount H(k+1) performed by adding F(k)H(k) and [D(n)–H(n)U(n)]U*(n) in accordance with expression (30) refers to addition of vector P1 to vector OF, vector P1 being in the same direction as vector ED. The direction of vectors P1 and ED is different from the direction of vector P2 (vector which should be added) which is tangent to the unit circumference (indicated by a dotted line). Geometrically, vector P2 is resultant from counterclockwise rotation of vector P1 by angle $\gamma$.

Accordingly, when the value of $\gamma$ is excessively large, it is effective to correct the direction of vector P1 toward vector P2. Such a correction of vector P1 corresponds to complex multiplication of F(n) and [D(n)–H(n)U(n)]U*(n) in expression (30).

From the above consideration, when the value of $\gamma$ is excessively large, i.e., the tentative complex demodulated signal U(k) involves an excessively large frequency error, it can be regarded as effective to estimate the optimum phase compensation amount H(n+1) in accordance with expression (30).

In the ninth example, demodulation of $|U(n)|^2=1$ is described. The above-described principle can be applied regardless of the modulation system of the signal as long as the average level of the complex demodulated signal U(n) over time is maintained at a certain value.

Figure 14A:
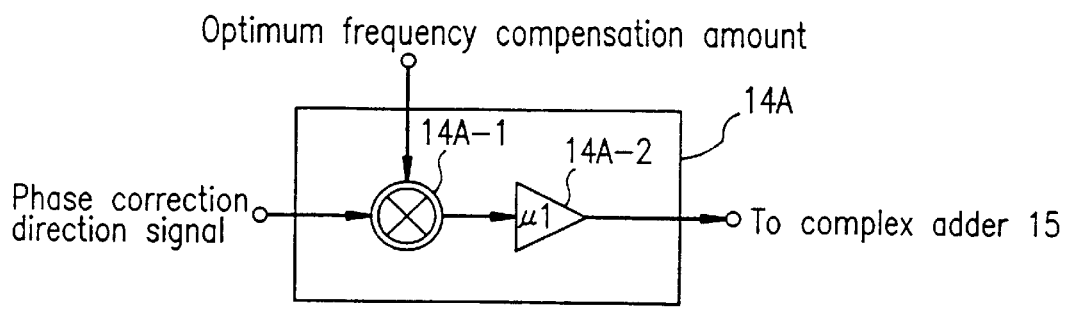
FIG. 14A is a block diagram of a weighting circuit in the optimum phase estimation circuit in an of a demodulation apparatus in a ninth example according to the present invention.

In order to adopt the principle of the ninth example, a weighting operation section 14A shown in FIG. 14A is used in place of the weighting circuit 14 in the optimum phase estimation circuit shown in FIGS. 1 and 2. Except for this, it is not necessary to change the configuration of the optimum phase estimation circuit 8.

The weighting operation section 14A includes a complex multiplier 14A-1 and a weighting circuit 14A-2. Compared with the weighting circuit 14 in FIG. 1, the complex multiplier 14A-1 is additionally provided.

The weighting operation section 14A operates in the following manner.

The complex multiplier 14A-1 receives a phase correction direction signal representing the output from the complex multiplier 13 of the optimum phase estimation circuit 8 (FIGS. 1 and 2), namely, [D(n)–H(n)U(n)]U*(n) and the optimum frequency compensation amount F(n) from the phase shift estimation circuit 9 (FIG. 2), performs complex multiplication of these two values, and outputs the resultant value. The resultant value corresponds to a part of the first term of the left side of expression (30), i.e., F(n)[D(n)–H(n)U(n)]U*(n).

The weighting circuit 14A-2 performs weighting corresponding to the step parameter $\mu_1(0<\mu_1)$ with respect to the output from the complex multiplier 14A-1, and outputs the resultant value to the complex adder 15 in the optimum phase estimation circuit 8. The complex adder 15 performs complex addition of the output from the weighting circuit 14A-2 and the output from the complex multiplier 17 of the optimum phase estimation circuit 8, and outputs the optimum phase compensation amount H(n+1) represented by expression (30) to the delay circuit 16. The optimum phase compensation amount H(n+1) is output from the delay circuit 16 at the next processing.

In the ninth example, since weighting is performed with respect to the phase correction direction signal based on the optimum frequency compensation amount F(n) as described above, the range in which the frequency is corrected can be enlarged.

EXAMPLE 10

A basic principle of a demodulation method and apparatus in a tenth example according to the present invention will be described.

Expression (30) is modified to obtain expression (31).

$$H(n+1)-F(n)H(n)=\mu_1 F(n)[D(n)-H(n)U(n)]U^*(n) \quad (31)$$

By substituting expression (31) to a part of the first term of the left side of expression (30), i.e., [D(n)–H(n)U(n)], expression (32) is obtained.

$$\mu_1\mu_2 F(n)[D(n)-H(n)U(n)]U^*(n)H^*(n)+F(n)=F(n+1) \quad (32)$$

Figure 26B:
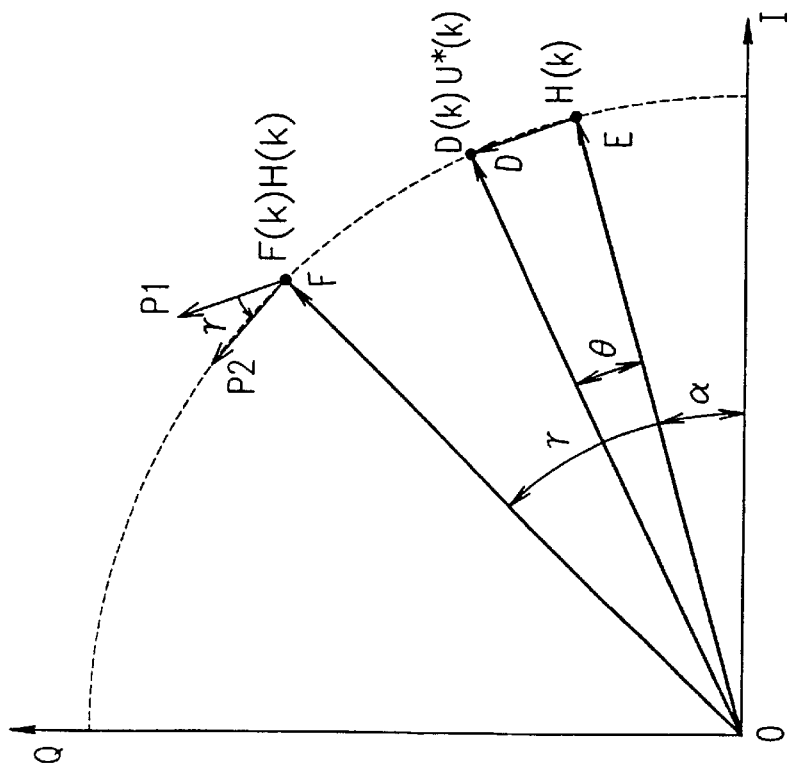

With reference to FIG. 26B, expression (32) will be considered. In FIG. 26B, vector OG is resultant from clockwise rotation of vector OD (FIG. 26A) by the phase angle a of H(k). Vector OG corresponds to D(k)U*(k)H*(k).

A part of the first term of the left side of expression (32), i.e., [D(n)–H(n)U(n)]U*(n)H*(n) can be developed into $D(n)U^*(n)H^*(n)-|H(n)U(n)|^2$. Where $|U(n)|^2=1$ as described above, the optimum magnitude of the optimum phase compensation amount H(n) is 1. Accordingly, $D(n)U^*(n)H^*(n)-|H(n)U(n)|^2$ equals to $D(n)U^*(n)H^*(n)-1$.

$D(k)U^*(k)H^*(k)-1$ at sampling time n (=k) corresponds to vector JG. F(k) in the second term of the left side of expression (32) at sampling time n (=k) corresponds to vector OH.

Estimation of the optimum frequency compensation amount F(n+1) performed by adding F(k) in the second term of the left side of expression (32) and $[D(n)-H(n)U(n)]U^*(n)H^*(n)$ in the first term of the left side in accordance with expression (32) refers to addition of vector P3 to vector OH, vector P3 being in the same direction as vector JG. The direction of vectors P3 and JG is different from the direction of vector P4 (vector which should be added) which is tangent to the unit circumference (indicated by a dotted line). Geometrically, vector P4 is resultant from counterclockwise rotation of vector P3 by angle γ.

Accordingly, when the value of γ is excessively large, it is effective to correct the direction of vector P3 toward vector P4. Such a correction of vector P3 corresponds to complex multiplication of F(n) and $[D(n)-H(n)U(n)]U^*(n)H^*$ in expression (32).

From the above consideration, when the value of γ is excessively large, i.e., the tentative complex demodulated signal U(k) involves an excessively large frequency error, it can be regarded as effective to estimate the optimum frequency compensation amount F(n+1) in accordance with expression (32).

Figure 14B:
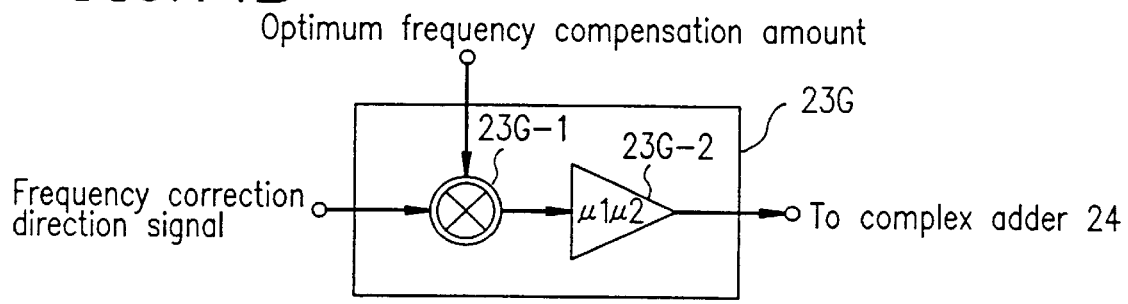
FIG. 14B is a block diagram of a weighting circuit in the optimum phase estimation circuit of a demodulation apparatus in a tenth example according to the present invention.

In order to adopt the principle of the tenth example, a weighting operation section 23G shown in FIG. 14B is used in place of the weighting circuit 23F in the phase shift estimation circuit 9F shown in FIG. 13. Except for this, it is not necessary to change the configuration of the phase shift estimation circuit 9F.

The weighting section 23G includes a complex multiplier 23G-1 and a weighting circuit 23G-2. Compared with the weighting circuit 23F in FIG. 13, the complex multiplier 23G-1 is additionally provided.

The weighting operation section 23G operates in the following manner.

The complex multiplier 23G-1 receives a frequency correction direction signal representing the output from the complex multiplier 22F of the phase shift estimation circuit 9F (FIG. 13), namely, $[D(n)-H(n)U(n)]U^*(n)H^*(n)$ and the optimum frequency compensation amount F(n) from the delay circuit 25F, performs complex multiplication of these two values, and outputs the resultant value. The resultant value corresponds to a part of the first term of the left side of expression (32), i.e., $F(n)[D(n)-H(n)U(n)]U^*(n)H^*(n)$.

The weighting circuit 23G-2 performs weighting corresponding to the step parameter $\mu_1\mu_2(0<\mu_1,\mu_2)$ with respect to the output from the complex multiplier 23G-1, and outputs the resultant value to the complex adder 24F (FIG. 13) in the phase shift estimation circuit 9F. The complex adder 24F performs complex addition of the output from the weighting circuit 23G-2 and the optimum frequency compensation amount F(n) from the delay circuit 25F, and outputs the optimum frequency compensation amount F(n+1) represented by expression (29) to the delay circuit 25F. The optimum frequency compensation amount F(n+1) is output from the delay circuit 25F at the next processing.

In the tenth example, since weighting is performed with respect to the frequency correction direction signal based on the optimum frequency compensation amount F(n) as described above, the range in which the frequency is corrected can be enlarged.

Figure 15:
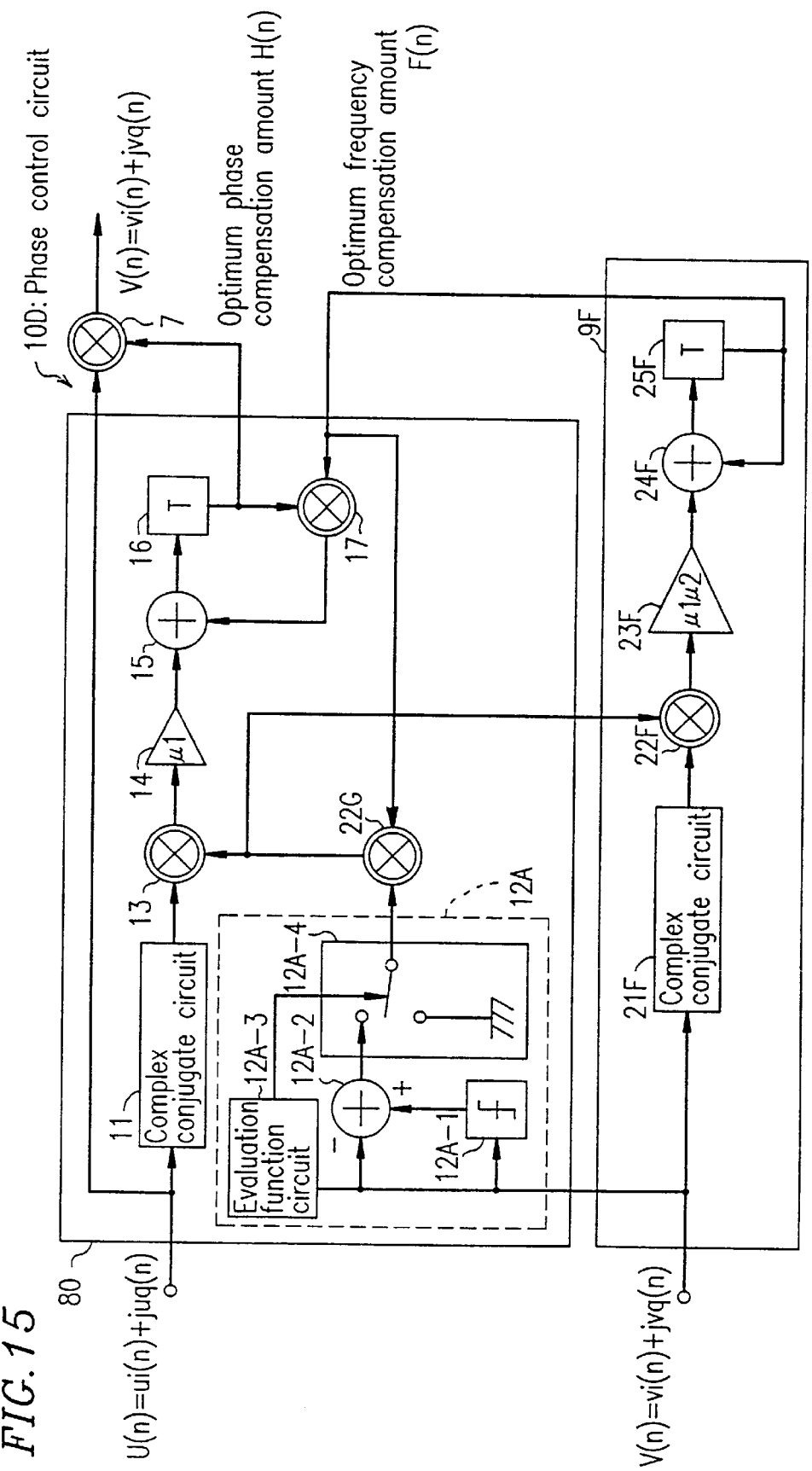
FIG. 15 is a sock diagram showing a modification of the phase control circuit shown in FIG. 13.

FIG. 15 shows a phase control circuit 10D modified from the phase control circuit 10C. The phase control circuit 10D includes a complex multiplier 22G in place of the complex multiplier 14A-1 of the weighting operation section 14A shown in FIG. 14A or the complex multiplier 23G-1 of the weighting operation section 23G shown in FIG. 14B. The complex multiplier 22G, in cooperation with the complex multiplier 13, performs complex multiplication of the input to the weighting circuit 14 and the optimum frequency compensation amount F(n) in place of the complex multiplier 14A-1 of the weighting operation section 14A. In addition, the complex multiplier 22G, in cooperation with the complex multiplier 22F, performs complex multiplication of the input to the weighting circuit 23F and the optimum frequency compensation amount F(n) in place of the complex multiplier 23G-1 of the weighting operation section 23G.

By such a system, both of the functions of the complex multiplier 14A-1 of the weighting operation section 14A (FIG. 14A) and the complex multiplier 23G-1 of the weighting operation section 23G (FIG. 14B) are achieved. The range in which the frequency is corrected can be enlarged, and the size of the entire circuit system can be reduced by simplified circuit configuration.

EXAMPLE 11

Figure 16A:
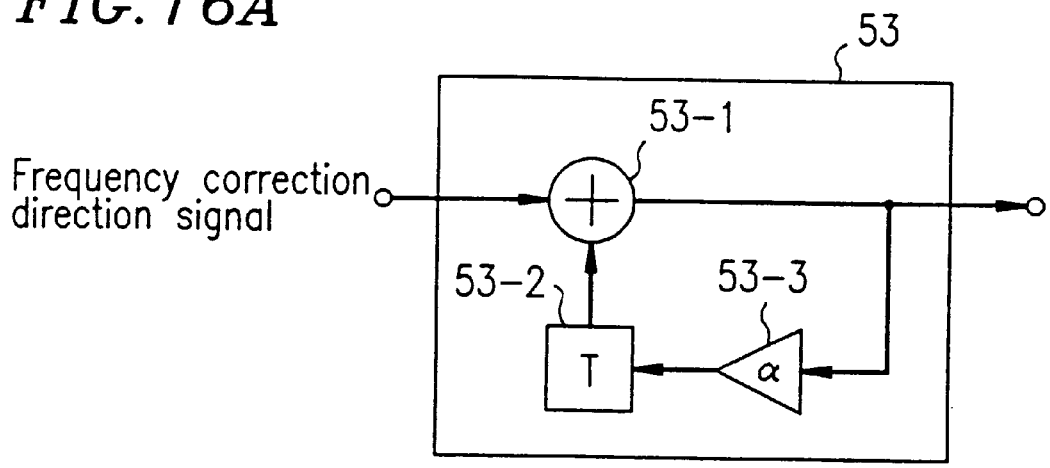
FIG. 16A is a block diagram of a smoothing circuit in a phase shift estimation circuit of a demodulation apparatus in an eleventh example according to the present invention.

FIG. 16A is a block diagram of a smoothing circuit 53 in a phase shift estimation circuit of a demodulation apparatus in an eleventh example according to the present invention.

The smoothing circuit 53 is applied to any of the phase shift estimation circuit 9 shown in FIG. 3, the phase shift estimation circuits 9A, 9B, 9C, 9D-1 and 9D-2 shown in FIGS. 6 through 10, and the phase shift estimation circuit 9F shown in FIGS. 13 and 15. In detail, the smoothing circuit 53 is inserted immediately before the weighting circuit (23, 23A, 23B, 23C or 23F). The smoothing circuit 53 smooths the frequency correction direction signal and outputs the smoothed frequency correction direction signal to the weighting circuit.

The smoothing circuit 53 includes a complex adder 53-1, a delay circuit 53-2, and a weighting circuit 53-3.

The smoothing circuit 53 having such a configuration operates in the following manner. The complex adder 53-1 receives the frequency correction direction signal from either one of the complex multipliers 22 and 22F and the complex subtractors 19A, 19B and 19C provided therebefore, performs complex addition of the frequency correction direction signal and the output from the delay circuit 53-2 to smooth the frequency correction direction signal and outputs the smoothed frequency correction direction signal to either one of the weighting circuits 23, 23A, 23B, 23C and 23F and the weighting circuit 53-3. The weighting circuit 23 performs weighting corresponding to the step parameter $\mu_2$ or $\mu_1\mu_2$ with respect to the frequency correction direction signal, and outputs the resultant value to either one of the complex adders 24, 24A, 24B, 24C and 24F. Thereafter, the above-described operations are performed.

The weighting circuit 53-3 performs weighting corresponding to the parameter α with respect to the smoothed frequency correction direction signal, and outputs the resultant value to the delay circuit 53-2. The delay circuit 53-2 outputs the resultant value to the complex adder 53-1 at the next processing.

As described above, in the eleventh example, the frequency correction direction signal is smoothed, i.e., components of frequency correction direction signals generated in repetition are cumulatively added by weighting by the parameter α. Accordingly, various types of noise can be restricted. Thus, the optimum frequency compensation amount F(n) can be estimated in a stable state.

Figure 16B:
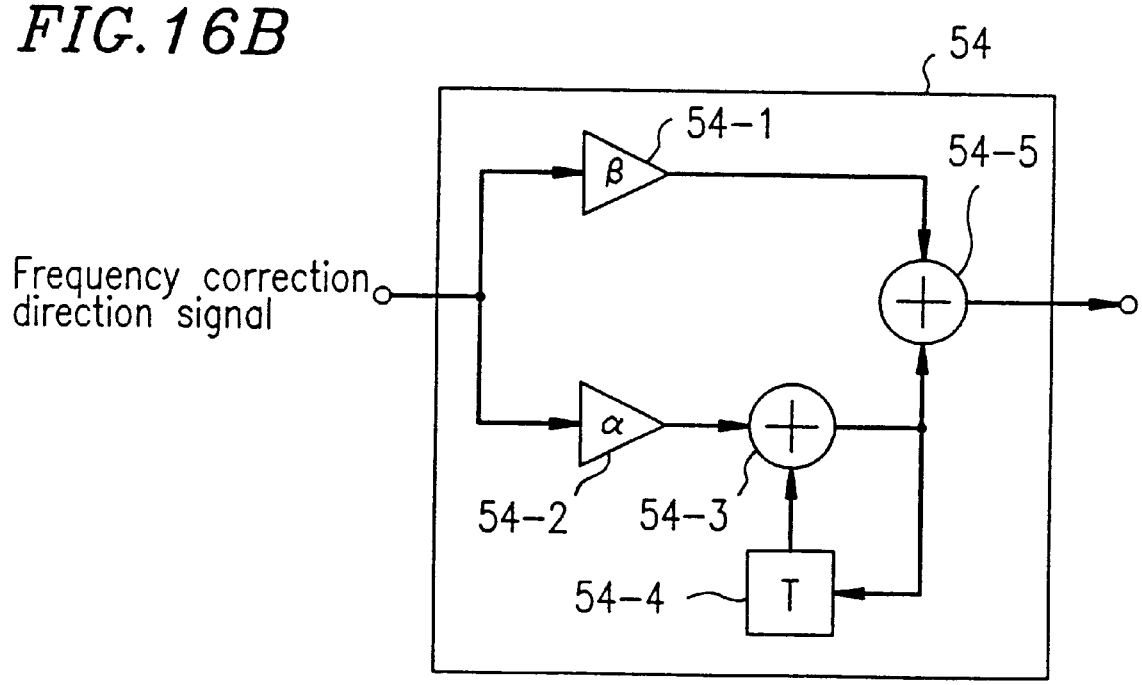
FIG. 16B is a block diagram showing a modification of the smoothing circuit shown in FIG. 16A.

FIG. 16B shows a smoothing circuit 54 modified from the smoothing circuit 53 shown in FIG. 16A. The smoothing circuit 54 includes weighting circuits 54-1 and 54-2, complex adders 54-3 and 54-5, and a delay circuit 54-4.

The smoothing circuit 54 having such a configuration operates in the following manner when, for example, used for the phase shift estimation circuit 9 in FIG. 3. The weighting circuit 54-1 receives the frequency correction direction signal from the complex multiplier 22 provided therebefore, performs weighting corresponding to the parameter β with respect to the frequency correction direction signal, and outputs the resultant value to the complex adder 54-5. Hereinafter, the output from the weighting circuit 54-1 will be referred to as the "direct output".

The weighting circuit 54-2 performs weighting corresponding to the parameter α with respect to the frequency correction direction signal, and outputs the resultant value to the complex adder 54-3. The complex adder 54-3 performs complex addition of the output from the weighting circuit 54-2 and the output from the delay circuit 54-4, and outputs the resultant value to the complex adder 54-5 and the delay circuit 54-4. Hereinafter, the output from the complex adder 54-3 will be referred to as the "integrated output". The delay circuit 54-4 outputs the integrated output to the complex adder 54-3.

The complex adder 54-5 performs complex addition of the direct output obtained by weighting performed by the weighting circuit 54-1 and the integrated output obtained by weighting performed by the weighting circuit 54-2 and integrated by the complex adder 54-3 and the delay circuit 54-4, and outputs the resultant value to the complex adder 24 provided after the complex adder 54-4 as a smoothed frequency correction direction signal.

By obtaining the direct output and the integrated output from the frequency correction direction signal and smoothing the frequency correction direction signal by complex addition, noise components can be further restricted and thus the optimum frequency compensation amount F(n) can be more estimated in a stable state.

EXAMPLE 12

Figure 17A:
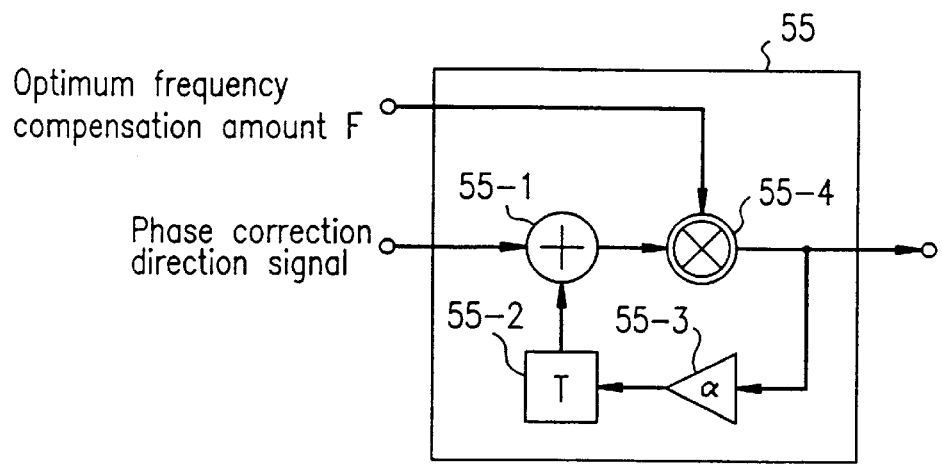
FIG. 17A is a block diagram of a smoothing circuit in an optimum phase estimation circuit of a demodulation apparatus in a twelfth example according to the present invention.

FIG. 17A is a block diagram of a smoothing circuit 55 in an optimum phase estimation circuit of a demodulation apparatus in a twelfth example according to the present invention.

The smoothing circuit 55 is applied to the optimum phase estimation circuit 8 shown in FIG. 2. In detail, the smoothing circuit 55 is inserted immediately before the weighting circuit 14. The smoothing circuit 55 smooths the phase correction direction signal and outputs the smoothed phase correction direction signal to the weighting circuit 14.

The smoothing circuit 55 includes a complex adder 55-1, a delay circuit 55-2, a weighting circuit 55-3, and a complex multiplier 55-4.

The smoothing circuit 55 having such a configuration operates in the following manner. The complex adder 55-1 receives the phase correction direction signal from the complex multiplier 13 before the complex adder 55-1, performs complex addition of the phase correction direction signal and the output from the delay circuit 53-2, and outputs the resultant value to the complex multiplier 55-4. The complex multiplier 55-4 performs complex multiplication of the value from the complex adder 55-1 and the optimum frequency compensation amount F(n) from the phase shift estimation circuit (e.g., the circuit 9 in FIG. 1), rotates the value from the complex adder 55-1 by ∠F(n), and outputs the resultant value to the weighting circuits 14 and 55-3 as a smoothed phase correction direction signal. The weighting circuit 14 performs weighting corresponding to the step parameter $\mu_1$ with respect to the smoothed phase correction direction signal, and outputs the resultant value to the complex adder 15. Thereafter, the above-described operations are performed.

The weighting circuit 55-3 performs weighting corresponding to the parameter α with respect to the smoothed phase correction direction signal, and outputs the resultant value to the delay circuit 55-2. The delay circuit 55-2 outputs the resultant value to the complex adder 55-1 at the next processing.

As described above, in the twelfth example, the phase correction direction signal is smoothed by treating the optimum frequency compensation amount F(n) by complex multiplication, weighting and complex addition in consideration of phase shift. Accordingly, noise components are sufficiently restricted and thus the optimum phase compensation amount H(n) can be estimated in a stable state.

Figure 17B:
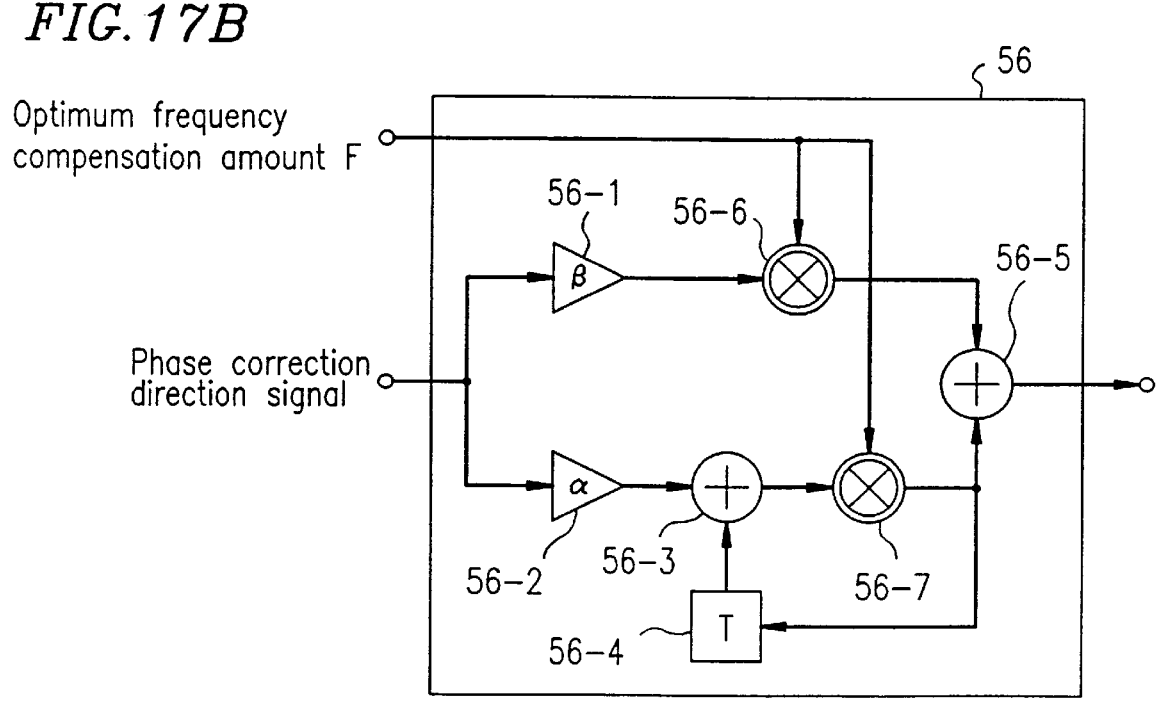
FIG. 17B is a block diagram showing a modification of the smoothing circuit shown in FIG. 17A.

FIG. 17B shows a smoothing circuit 56 modified from the smoothing circuit 55 shown in FIG. 17A. The smoothing circuit 56 includes weighting circuits 56-1 and 56-2, complex adders 56-3 and 56-5, a delay circuit 56-4, and complex multipliers 56-6 and 56-7.

The smoothing circuit 56 having such a configuration operates in the following manner. The weighting circuit 56-1 performs weighting corresponding to the parameter β with respect to the phase correction direction signal, and outputs the resultant value to the complex multiplier 56-6. The complex multiplier 56-6 performs complex multiplication of the value from the weighting circuit 56-1 and the optimum frequency compensation amount F(n) from the phase shift estimation circuit (e.g., the circuit 9 in FIG. 1), rotates the value from the weighting circuit 56-1 by ∠F(n), and outputs the resultant value (direct output) to the complex adder 56-5.

The weighting circuit 56-2 performs weighting corresponding to the parameter α with respect to the phase correction direction signal, and outputs the resultant value to the complex adder 56-3. The complex adder 56-3 performs complex addition of the value from the complex adder 56-3 and the output from the delay circuit 56-4, and outputs the resultant value to the complex multiplier 56-7. The complex multiplier 56-7 performs complex multiplication of the value from the weighting circuit 56-2 and the optimum frequency compensation amount F(n) from the phase shift estimation circuit 9, and outputs the resultant value (integrated output) to the delay circuit 56-4 and the complex adder 56-5. The outputs delay circuit 56-4 outputs the integrated output to the complex adder 56-3 at the next processing.

The complex adder 56-5 performs complex addition of the direct output obtained by weighting performed by the weighting circuit 56-1 and complex multiplication performed with the optimum frequency compensation amount F(n) by the complex multiplier 56-6, and the integrated output obtained by weighting performed by the weighting circuit 56-2, integration performed by the complex adder 56-3 and the delay circuit 56-4 and complex multiplication performed with the optimum frequency compensation amount F(n) by the complex multiplier 56-7. Then, the complex adder 56-5 outputs the resultant value to the weighting circuit 14 provided after the complex adder 56-5 as a smoothed phase correction direction signal.

By obtaining the direct output and integrated output from the phase correction direction signal and smoothing the phase correction direction signal by complex addition, noise components can be further restricted and thus the optimum frequency compensation amount F(n) can be more estimated in a stable state.

The present invention is not limited to the above-described examples and is applicable to many other modifications. For example, the present application is applicable for demodulating a single modulated by the M-ary PSK (phase shift keying) system, M-ary APSK (amplitude phase shift keying) system, or the M-ary QAM (quadrature amplitude modulation) system.

The RLS algorithm provides superior initial convergence characteristics of the optimum frequency compensation in the case where a known training signal is used in lieu of the complex identification signal D. Accordingly, it is effective to use a training signal in lieu of the complex identification signal D.

In the seventh example, a constant amplitude level of the demodulated signal can be obtained. Accordingly, in the case where a signal modulated by the PSK system is demodulated in the seventh example, some of the circuits in the phase shift estimation circuit 9E shown in FIG. 12 may be eliminated. In more detail, the adder 49, the delay circuit 51, the weighting circuit 50, the absolute value square circuit 48, and the divider 46 may be eliminated. In such a case, the output from the complex adder 43 is directed input to the delay circuit 52. Even with such a configuration, the phase control can be performed properly. Moreover, some of the circuits in the optimum phase estimation circuit 8A shown in FIG. 11 may be also eliminated. In more detail, even when the adder 36, the delay circuit 38, the weighting circuit 37, the absolute value square circuit 35, and the divider 33 are eliminated and the output from the complex multiplier 30 is directly sent to the delay circuit 39, proper phase control can be performed. In a configuration in which the phase shift estimation circuit 9E and the optimum phase estimation circuit 8A share some of the circuits, for example, the delay circuits 39 and 40, the size of the entire circuit system is reduced and the signal processing speed can be raised.

Figure 18:
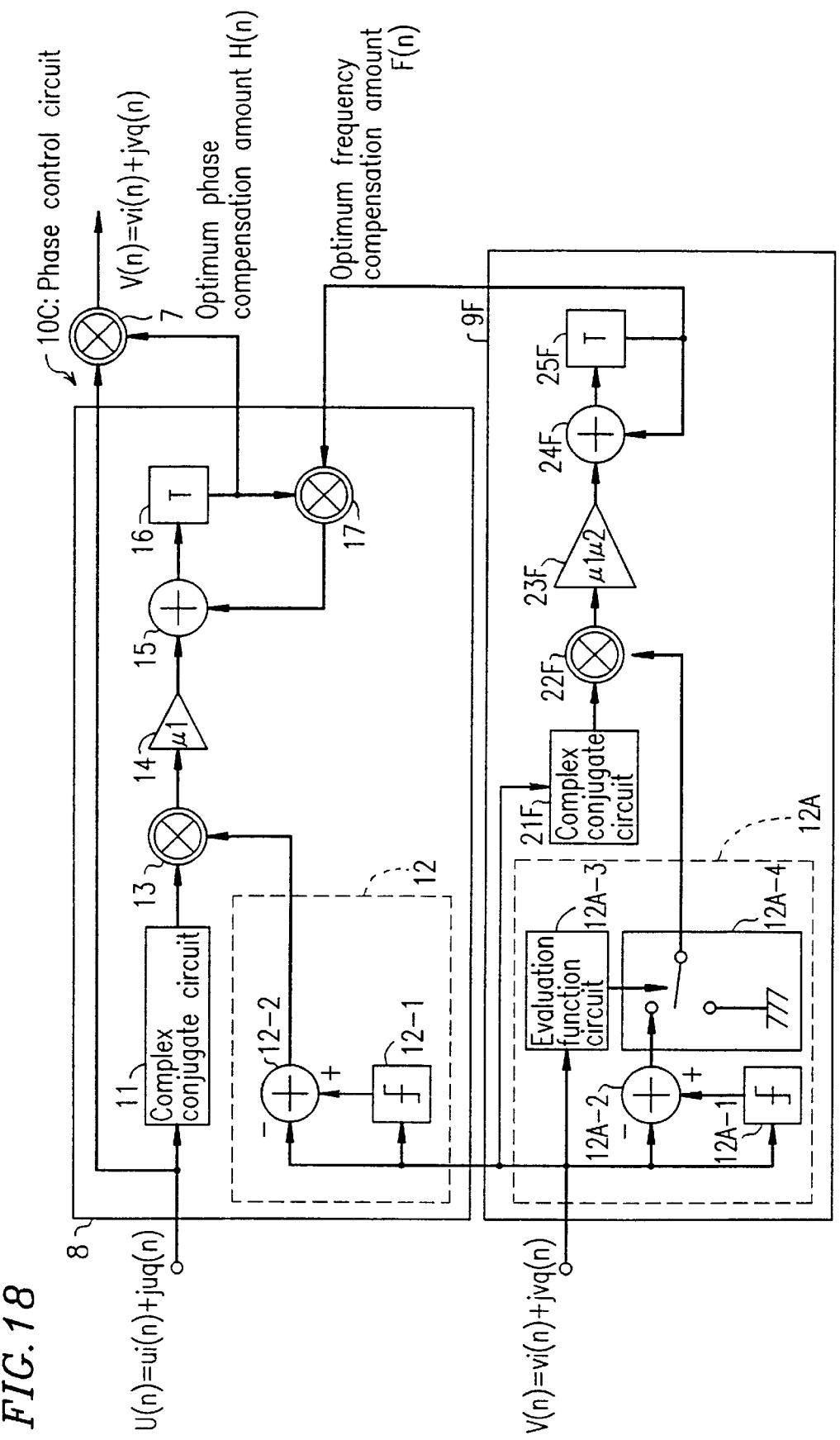
FIG. 18 is a block diagram showing another modification of the phase control circuit shown in FIG. 13.

In the eighth example, as shown in FIG. 13, the optimum phase estimation circuit 80 includes the phase error detection circuit 12A. Alternatively, the circuit configuration shown in FIG. 18 may be used, in which the optimum phase estimation circuit 8 includes the phase error detection circuit 12 and the phase shift estimation circuit (9F) includes the phase error detection circuit 12A. Still alternatively, a configuration in which the optimum phase estimation circuit (8) includes the phase error detection circuit 12A and the phase shift estimation circuit (9F) includes the phase error detection circuit 12 (not shown) may be used. Any of such phase error detection circuits receives a determined complex demodulated signal V(n) and outputs the complex error signal to the demodulated multiplier 13 or 22F.

Although not described in any of the examples, it is possible to use the RLS algorithm for the optimum phase estimation circuit and the LMS algorithm for the phase shift estimation circuit, or to use the LMS algorithm for the optimum phase estimation circuit and the RLS algorithm for the phase shift estimation circuit.

Although analog quadrature detection is performed in the above examples before processing by the phase control circuit, digital quadrature detection may also be used.

According to the present invention, the optimum phase compensation amount for the next processing is obtained based on a tentative complex demodulated signal, a determined complex demodulated signal, and an optimum frequency compensation amount; and the optimum frequency compensation amount for the next processing is obtained based on change in the optimum phase compensation amount during a predetermined cycle. Due to such a system, a demodulation circuit can be realized with a satisfactorily simple configuration. Since the optimum frequency compensation amount is obtained from the optimum phase compensation amount having a relatively small amplitude change, the size of the entire circuit is reduced. Furthermore, when the LMS algorithm is used, even under the existence of a frequency error, the pull-in time of the optimum frequency compensation amount is shortened by controlling the complex error signal representing the difference between the determined complex demodulated signal and the identification signal.

By performing weighting in consideration of the optimum frequency compensation amount, the range in which the frequency can be corrected can be enlarged. By providing a smoothing circuit for smoothing the frequency correction direction signal in the phase shift estimation circuit, estimation operation can be stabilized. By providing a smoothing circuit for smoothing the phase correction direction signal based on the optimum frequency compensation amount in the optimum phase estimation circuit, estimation operation can be stabilized.

Demodulation of a signal modulated by the M-ary QAM using the RLS algorithm eliminates the necessity of a circuit for normalizing a complex demodulated signal, an orthogonal coordinate—polar coordinate conversion circuit or a polar coordinate—orthogonal coordinate conversion circuit which is formed of a ROM or the like. Thus, the signal processing time is shortened and the size of the entire circuit can be reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A demodulation method for tentatively demodulating a modulated input signal by a signal having a fixed frequency to form a tentative complex demodulated signal and then generating a determined complex demodulated signal from the tentative complex demodulated signal, the method comprising:

step (a) of obtaining a determined complex demodulated signal by compensating for the tentative complex demodulated signal based on an optimum phase compensation amount;

step (b) of estimating an optimum frequency compensation amount based on a shift in the optimum phase compensation amount during a predetermined cycle; and step (c) of estimating an immediately subsequent optimum phase compensation amount to be used in the steps (a) and (b) performed in repetition, based on the tentative complex demodulated signal, the determined complex demodulated signal, and the optimum frequency compensation amount.

2. A demodulation method according to claim 1, wherein the step (c) includes:

step (h1) of obtaining a complex error signal which represents a distance between the determined complex demodulated signal obtained by the step (a) and a complex identification signal;

step (h2) of obtaining a phase correction direction signal which represents a correction direction of the optimum phase compensation amount, based on the complex error signal and the tentative complex demodulated signal;

step (h3) of performing weighting of the phase correction direction signal;

step (h4) of obtaining the tentative phase compensation amount based on the optimum frequency compensation amount estimated by the step (b) and the optimum phase compensation amount estimated by the step (c); and step (h5) of obtaining the immediately subsequent optimum phase compensation amount to be used in the steps (a) and (b) performed in repetition, based on the tentative phase compensation amount and the weighted phase correction direction signal.

3. A demodulation method according to claim 2, wherein the step (h1) includes:

step (i1) of obtaining the complex identification signal which is closest to the determined complex demodulated signal by identifying the determined complex demodulated signal obtained by the step (a);

step (i2) of obtaining a complex error signal which represents a distance between the determined complex demodulated signal and the complex identification signal;

step (i3) of determining whether or not each of a real part and an imaginary part of the complex error signal is required, based on the determined complex demodulated signal; and step (i4) of, when either one of the real part or the imaginary part is determined to be required, outputting the real part or the imaginary part which is determined to be required, and when either one of the real part or the imaginary part is determined not to be required, outputting zero in place of the real part or the imaginary part which is determined not to be required.

4. A demodulation method according to claim 1, wherein the step (b) includes:

step (k1) of obtaining a frequency correction direction signal which represents a correction direction of the optimum frequency compensation amount, based on the optimum phase compensation amounts estimated in repetition by the step (c) and the optimum frequency compensation amount estimated by the step (b);

step (k2) of performing weighting of the frequency correction direction signal; and step (k3) of estimating an optimum frequency compensation amount to be used in the step (c) by updating the optimum frequency compensation amount estimated by the step (b) based on the weighted frequency correction direction signal.

5. A demodulation method according to claim 4, wherein the step (k1) includes:

step (l1) of obtaining a complex multiplication value by performing complex multiplication of a first optimum phase compensation amount among the optimum phase compensation amounts estimated by the step (c) and the optimum frequency compensation amount estimated by the step (b);

step (l2) of obtaining a complex subtraction value by performing complex subtraction of the complex multiplication value from a second optimum phase compensation amount among the optimum phase compensation amounts estimated by the step (c), the second optimum phase compensation amounts being estimated later than the first optimum phase compensation amount; and step (l3) of obtaining a complex multiplication value by performing complex multiplication of the first optimum phase compensation amount and the complex subtraction value.

6. A demodulation method according to claim 4, wherein the step (k1) includes:

step (m1) of obtaining a complex division value by performing complex division of the second optimum phase compensation amount among the optimum phase compensation amounts estimated by the step (c) by the first optimum phase compensation amount which is estimated before the second optimum phase compensation amount by the step (c); and step (m2) of obtaining a complex subtraction value by performing complex subtraction of the optimum frequency compensation amount estimated by the step (b) from the complex division value.

7. A demodulation method according to claim 4, wherein the step (k1) includes:

step (n1) of obtaining an auto-correlation value by performing complex multiplication of the first optimum phase compensation amount estimated by the step (c) and the second optimum phase compensation amount estimated by the step (c) later than the first optimum phase compensation amount;

step (n2) of obtaining a square of a magnitude of the first optimum phase compensation amount;

step (n3) of obtaining a multiplication value of the square value and the optimum frequency compensation amount estimated by the step (b); and step (n4) of obtaining the multiplication value from the auto-correlation value obtained by the step (n1) by complex subtraction.

8. A demodulation method according to claim 4, wherein the step (k1) includes:

step (o1) of obtaining an auto-correlation value by performing complex multiplication of the optimum phase compensation amounts estimated in repetition by the step (c); and step (o2) of performing complex subtraction of the optimum frequency compensation amount estimated by the step (b) from the auto-correlation value.

9. A demodulation method according to claim 4, wherein the step (b) includes:

step (p1) of obtaining an auto-correlation value by performing complex multiplication of the optimum phase compensation amounts estimated in repetition by the step (c); and step (p2) of performing complex addition of the auto-correlation value and the optimum frequency compensation amount estimated by the step (b) which is weighted.

10. A demodulation method according to claim 2, wherein the step (h3) is the step of performing weighting based on the optimum frequency compensation amount.

11. A demodulation method according to claim 4, wherein the step (k1) includes step (r) of smoothing the frequency correction direction signal which represents the correction direction of the optimum frequency compensation amount.

12. A demodulation method according to claim 2, wherein the step (h3) includes step (t) of smoothing the phase correction direction signal which represents the correction direction of the optimum phase compensation amount based on the optimum frequency compensation amount.

13. A demodulation method according to claim 1, wherein the step (c) is performed based on the following expression:

$$\mu_1 E(n)U^*(n)+F(n)H(n)=H(n+1),$$

where $\mu_1$ is a step parameter,

E(n) is a complex error signal,

H(n) is the optimum phase compensation amount,

U(n) is the tentative complex demodulated signal,

U*(n) is a complex conjugate of U(n),

F(n) is the optimum frequency compensation amount, and

H(n+1) is the immediately subsequent optimum phase compensation amount to be used in the steps (a) and (b) performed in repetition.

14. A demodulation method according to claim 1, wherein the step (b) is performed based on the following expression:

$$\mu_2[H(n)-F(n)H(n-1)]H^*(n-1)+F(n)=F(n+1)$$

where $\mu_2$ is a step parameter,

H(n) and H(n−1) are optimum phase compensation amounts,

H*(n) is a complex conjugate of H(n),

F(n) is the optimum frequency compensation amount already estimated, and

F(n+1) is the optimum frequency compensation amount to be estimated.

15. A demodulation method for tentatively demodulating a modulated input signal by a signal having a fixed frequency to form a tentative complex demodulated signal and then generating a determined complex demodulated signal from the tentative complex demodulated signal, the method comprising:

step (a) of obtaining a determined complex demodulated signal by compensating for the tentative complex demodulated signal based on an optimum phase compensation amount;

step (d) of obtaining a complex error signal which represents a distance between the determined complex demodulated signal and a complex identification signal;

step (b) of estimating an optimum frequency compensation amount based on the determined complex demodulated signal and the complex error signal; and step (c) of estimating an immediately subsequent optimum phase compensation amount to be used in the step (a) performed in repetition, based on the tentative complex demodulated signal, the determined complex demodulated signal, and the optimum frequency compensation amount.

16. A demodulation method according to claim 15, wherein the step (c) includes:

step (h1) of obtaining the complex error signal which represents a distance between the determined complex demodulated signal obtained by the step (a) and a complex identification signal;

step (h2) of obtaining a phase correction direction signal which represents a correction direction of the optimum phase compensation amount, based on the complex error signal obtained by the step (h1) and the tentative complex demodulated signal;

step (h3) of performing weighting of the phase correction direction signal;

step (h4) of obtaining the tentative phase compensation amount based on the optimum frequency compensation amount estimated by the step (b) and the optimum phase compensation amount estimated by the step (c); and step (h5) of obtaining the immediately subsequent optimum phase compensation amount to be used in the step (a) performed in repetition, based on the tentative phase compensation amount and the weighted phase correction direction signal.

17. A demodulation method according to claim 15, wherein the step (d) includes:

step (i1) of obtaining the complex identification signal which is closest to the determined complex demodulated signal by identifying the determined complex demodulated signal;

step (i2) of obtaining a complex error signal which represents a distance between the determined complex demodulated signal and the complex identification signal;

step (i3) of determining whether or not each of a real part and an imaginary part of the complex error signal is required, based on the determined complex demodulated signal; and step (i4) of, when either one of the real part or the imaginary part is determined to be required, outputting the real part or the imaginary part which is determined to be required, and when either one of the real part or the imaginary part is determined not to be required, outputting zero in place of the real part or the imaginary part which is determined not to be required.

18. A demodulation method according to claim 16, wherein the step (h1) includes:

step (i1) of obtaining the complex identification signal which is closest to the determined complex demodulated signal by identifying the determined complex demodulated signal;

step (i2) of obtaining a complex error signal which represents a distance between the determined complex demodulated signal and the complex identification signal;

step (i3) of determining whether or not each of a real part and an imaginary part of the complex error signal is required, based on the determined complex demodulated signal; and step (i4) of, when either one of the real part or the imaginary part is determined to be required, outputting the real part or the imaginary part which is determined to be required, and when either one of the real part or the imaginary part is determined not to be required, outputting zero in place of the real part or the imaginary part which is determined not to be required.

19. A demodulation method according to claim 15, wherein the step (c) includes:

step (j1) of obtaining a complex identification signal which is closest to the determined complex demodulated signal by identifying the determined complex demodulated signal;

step (j2) of obtaining a cross-correlation value by performing complex multiplication of the tentative complex demodulated signal and the complex identification signal;

step (j3) of obtaining a complex addition value by performing complex addition of the cross-correlation value and the optimum phase compensation amount estimated by the step (c) which is weighted; and step (j4) of obtaining a complex multiplication value by performing complex multiplication of the complex addition value and the optimum frequency compensation amount estimated by the step (b).

20. A demodulation method according to claim 15, wherein the step (b) includes:

step (q1) of obtaining a frequency correction direction signal which represents the correction direction of the optimum frequency compensation amount based on the determined complex demodulated signal obtained by the step (a) and the complex error signal obtained by the step (d);

step (q2) of performing weighting of the frequency correction direction signal; and step (q3) of updating the optimum frequency compensation amount estimated by the step (b) based on the weighted frequency correction direction signal.

21. A demodulation method according to claim 16, wherein the step (h3) is the step of performing weighting based on the optimum frequency compensation amount.

22. A demodulation method according to claim 20, wherein the step (q2) is the step of performing weighting based on the optimum frequency compensation amount.

23. A demodulation method according to claim 20, wherein the step (q1) includes step (r) of smoothing the frequency correction direction signal which represents the correction direction of the optimum frequency compensation amount.

24. A demodulation method according to claim 16, wherein the step (h3) includes step (t) of smoothing the phase correction direction signal which represents the correction direction of the optimum phase compensation amount based on the optimum frequency compensation amount.

25. A demodulation method according to claim 15, wherein the step (c) is performed based on the following expression:

$\mu_1 E(n)U^*(n)+F(n)H(n)=H(n+1)$, where $\mu_1$ is a step parameter,
E(n) is a complex error signal,
H(n) is the optimum phase compensation amount,
U(n) is the tentative complex demodulated signal,
U*(n) is a complex conjugate of U(n),
F(n) is the optimum frequency compensation amount, and
H(n+1) is the immediately subsequent optimum phase compensation amount to be used in the step (a) performed in repetition.

26. A demodulation method according to claim 15, wherein the step (b) is performed based on the following expression:

$\mu_1\mu_2 E(n)U^*(n)H^*(n)+F(n)=F(n+1)$ where $\mu_1$ and $\mu_2$ are step parameters,
E(n) is a complex error signal,
H(n) is the optimum phase compensation amount,
U(n) is the tentative complex demodulated signal,
U*(n) is a complex conjugate of U(n),
H*(n) is a complex conjugate of H(n),
F(n) is the optimum frequency compensation amount already estimated, and F(n+1) is the optimum frequency compensation amount to be estimated.

27. A demodulation apparatus for tentatively demodulating a modulated input signal by a signal having a fixed frequency to form a tentative complex demodulated signal and then generating a determined complex demodulated signal from the tentative complex demodulated signal, the apparatus comprising:

means (A) for obtaining a determined complex demodulated signal by compensating for the tentative complex demodulated signal based on an optimum phase compensation amount;

means (B) for estimating an optimum frequency compensation amount based on a shift in the optimum phase compensation amount during a predetermined cycle; and means (C) for estimating an immediately subsequent optimum phase compensation amount to be used by means (A) and (B) in repetition, based on the tentative complex demodulated signal, the determined complex demodulated signal, and the optimum frequency compensation amount.

28. A demodulation apparatus according to claim 27, wherein the means (C) includes:

means (H1) for obtaining a complex error signal which represents a distance between the determined complex demodulated signal obtained by the means (A) and a complex identification signal;

means (H2) for obtaining a phase correction direction signal which represents a correction direction of the optimum phase compensation amount, based on the complex error signal and the tentative complex demodulated signal;

means (H3) for performing weighting of the phase correction direction signal;

means (H4) for obtaining the tentative phase compensation amount based on the optimum frequency compensation amount estimated by the means (B) and the optimum phase compensation amount estimated by the means (C); and means (H5) for obtaining the immediately subsequent optimum phase compensation amount to be used by the means (A) and (B) in repetition, based on the tentative phase compensation amount and the weighted phase correction direction signal.

29. A demodulation apparatus according to claim 28, wherein the means (H1) includes:

means (I1) for obtaining the complex identification signal which is closest to the determined complex demodulated signal by identifying the determined complex demodulated signal;

means (I2) for obtaining a complex error signal which represents a distance between the determined complex demodulated signal and the complex identification signal;

means (I3) for determining whether or not each of a real part and an imaginary part of the complex error signal is required, based on the determined complex demodulated signal; and means (I4) for, when either one of the real part or the imaginary part is determined to be required, outputting the real part or the imaginary part which is determined to be required, and when either one of the real part or the imaginary part is determined not to be required, outputting zero in place of the real part or the imaginary part which is determined not to be required.

30. A demodulation apparatus according to claim 27, wherein the means (B) includes:

means (K1) for obtaining a frequency correction direction signal which represents a correction direction of the optimum frequency compensation amount, based on the optimum phase compensation amounts estimated in repetition by the means (C) and the optimum frequency compensation amount estimated by the means (B);

means (K2) for performing weighting of the frequency correction direction signal; and means (K3) for estimating an optimum frequency compensation amount to be used by the means (C) by updating the optimum frequency compensation amount estimated by the means (B) based on the weighted frequency correction direction signal.

31. A demodulation apparatus according to claim 30, wherein the means (K1) includes:

means (L1) for obtaining a complex multiplication value by performing complex multiplication of a first optimum phase compensation amount among the optimum phase compensation amounts estimated by means (C) and the optimum frequency compensation amount estimated by the means (B);

means (L2) for obtaining a complex subtraction value by performing complex subtraction of the complex multiplication value from a second optimum phase compensation amount among the optimum phase compensation amounts estimated by the means (C), the second optimum phase compensation amounts being estimated later than the first optimum phase compensation amount; and means (L3) for obtaining a complex multiplication value by performing complex multiplication of the first optimum phase compensation amount and the complex subtraction value.

32. A demodulation apparatus according to claim 30, wherein the means (K1) includes:

means (M1) for obtaining a complex division value by performing complex division of the second optimum phase compensation amount among the optimum phase compensation amounts estimated by the means (C) by the first optimum phase compensation amount which is estimated before the second optimum phase compensation amount by the means (C); and means (M2) for obtaining a complex subtraction value by performing complex subtraction of the optimum frequency compensation amount estimated by the means (B) from the complex division value.

33. A demodulation apparatus according to claim 30, wherein the means (K1) includes:

means (N1) for obtaining an auto-correlation value by performing complex multiplication of the first optimum phase compensation amount estimated by the means (C) and the second optimum phase compensation amount estimated by the means (C) later than the first optimum phase compensation amount;

means (N2) for obtaining a square of a magnitude of the first optimum phase compensation amount;

means (N3) for obtaining a multiplication value of the square value and the optimum frequency compensation amount estimated by the means (B); and means (N4) for obtaining the multiplication value from the auto-correlation value obtained by the means (N1) by complex subtraction.

34. A demodulation apparatus according to claim 30, wherein the means (K1) includes:

means (O1) for obtaining an auto-correlation value by performing complex multiplication of the optimum phase compensation amounts estimated in repetition by the means (C); and means (O2) for performing complex subtraction of the optimum frequency compensation amount estimated by the means (B) from the auto-correlation value.

35. A demodulation apparatus according to claim 27, wherein the means (B) includes:

means (P1) for obtaining an auto-correlation value by performing complex multiplication of the optimum phase compensation amounts estimated in repetition by the means (C); and means (P2) for performing complex addition of the auto-correlation value and the optimum frequency compensation amount estimated by the means (B) which is weighted.

36. A demodulation apparatus according to claim 28, wherein the means (H3) performs weighting based on the optimum frequency compensation amount.

37. A demodulation apparatus according to claim 30, wherein the means (K1) includes means (R) for smoothing the frequency correction direction signal which represents the correction direction of the optimum frequency compensation amount.

38. A demodulation apparatus according to claim 28, wherein the means (H3) includes means (T) for smoothing the phase correction direction signal which represents the correction direction of the optimum phase compensation amount based on the optimum frequency compensation amount.

39. A demodulation apparatus for tentatively demodulating a modulated input signal by a signal having a fixed frequency to form a tentative complex demodulated signal and then generating a determined complex demodulated signal from the tentative complex demodulated signal, the apparatus comprising:

means (A) for obtaining a determined complex demodulated signal by compensating for the tentative complex demodulated signal based on an optimum phase compensation amount;

means (D) for obtaining a complex error signal which represents a distance between the determined complex demodulated signal and a complex identification signal;

means (B) for estimating an optimum frequency compensation amount based on the determined complex demodulated signal and the complex error signal; and means (C) for estimating an immediately subsequent optimum phase compensation amount to be used by the means (A) and (B) in repetition, based on the tentative complex demodulated signal, the determined complex demodulated signal, and the optimum frequency compensation amount.

40. A demodulation apparatus according to claim 39, wherein the means (C) includes:

means (H1) for obtaining a complex error signal which represents a distance between the determined complex demodulated signal obtained by the means (A) and a complex identification signal;

means (H2) for obtaining a phase correction direction signal which represents a correction direction of the optimum phase compensation amount, based on the complex error signal obtained by the means (H1) and the tentative complex demodulated signal;

means (H3) for performing weighting of the phase correction direction signal;

means (H4) for obtaining the tentative phase compensation amount based on the optimum frequency compensation amount estimated by the means (B) and the optimum phase compensation amount estimated by the means (C); and means (H5) for obtaining the immediately subsequent optimum phase compensation amount to be used by the means (A) in repetition, based on the tentative phase compensation amount and the weighted phase correction direction signal.

41. A demodulation apparatus according to claim 39, wherein the means (D) includes:

means (I1) for obtaining the complex identification signal which is closest to the determined complex demodulated signal by identifying the determined complex demodulated signal;

means (I2) for obtaining a complex error signal which represents a distance between the determined complex demodulated signal and the complex identification signal;

means (I3) for determining whether or not each of a real part and an imaginary part of the complex error signal is required, based on the determined complex demodulated signal; and means (I4) for, when either one of the real part or the imaginary part is determined to be required, outputting the real part or the imaginary part which is determined to be required, and when either one of the real part or the imaginary part is determined not to be required, outputting zero in place of the real part or the imaginary part which is determined not to be required.

42. A demodulation apparatus according to claim 39, wherein the means (C) includes:

means (J1) for obtaining a complex identification signal which is closest to the determined complex demodulated signal by identifying the determined complex demodulated signal;

means (J2) for obtaining a cross-correlation value by performing complex multiplication of the tentative complex demodulated signal and the complex identification signal;

means (J3) for obtaining a complex addition value by performing complex addition of the cross-correlation value and the optimum phase compensation amount estimated by the means (C) which is weighted; and means (J4) for obtaining a complex multiplication value by performing complex multiplication of the complex addition value and the optimum frequency compensation amount estimated by the means (B).

43. A demodulation apparatus according to claim 40, wherein the means (H1) includes:

means (I1) for obtaining the complex identification signal which is closest to the determined complex demodulated signal by identifying the determined complex demodulated signal;

means (I2) for obtaining a complex error signal which represents a distance between the determined complex demodulated signal and the complex identification signal;

means (I3) for determining whether or not each of a real part and an imaginary part of the complex error signal is required, based on the determined complex demodulated signal; and means (I4) for, when either one of the real part or the imaginary part is determined to be required, outputting the real part or the imaginary part which is determined to be required, and when either one of the real part or the imaginary part is determined not to be required, outputting zero in place of the real part or the imaginary part which is determined not to be required.

44. A demodulation apparatus according to claim 39, wherein the means (B) includes:

means (Q1) for obtaining a frequency correction direction signal which represents the correction direction of the optimum frequency compensation amount based on the determined complex demodulated signal obtained by the means (A) and the complex error signal obtained by the means (D);

means (Q2) for performing weighting of the frequency correction direction signal; and means (Q3) for updating the optimum frequency compensation amount estimated by the means (B) based on the weighted frequency correction direction signal.

45. A demodulation apparatus according to claim 40, wherein the means (H3) performs weighting based on the optimum frequency compensation amount.

46. A demodulation apparatus according to claim 44, wherein the means (Q2) performs weighting based on the optimum frequency compensation amount.

47. A demodulation apparatus according to claim 44, wherein the means (Q1) includes means (R) for smoothing the frequency correction direction signal which represents the correction direction of the optimum frequency compensation amount.

48. A demodulation apparatus according to claim 40, wherein the means (H3) includes means (T) for smoothing the phase correction direction signal which represents the correction direction of the optimum phase compensation amount based on the optimum frequency compensation amount.

* * * * *